United States Patent [19]
Mazaki et al.

[11] Patent Number: 5,883,685
[45] Date of Patent: Mar. 16, 1999

[54] COMPENSATING FILM FOR A LIQUID CRYSTAL DISPLAY AND AN OCB MODE LIQUID CRYSTAL DISPLAY INCORPORATING THE COMPENSATING FILM

[75] Inventors: Hitoshi Mazaki, Kawasaki; Yasushi Sato; Takehiro Toyooka, both of Yokohama, all of Japan

[73] Assignee: Nippon Oil Company, Limited, Tokyo, Japan

[21] Appl. No.: 776,448

[22] PCT Filed: May 27, 1996

[86] PCT No.: PCT/JP96/01420

§ 371 Date: Jan. 24, 1997

§ 102(e) Date: Jan. 24, 1997

[87] PCT Pub. No.: WO96/37804

PCT Pub. Date: Nov. 28, 1996

[30] Foreign Application Priority Data

May 26, 1995 [JP] Japan ..................................... 7-162748

[51] Int. Cl.⁶ ................................................. G02F 1/1335
[52] U.S. Cl. ............................................ 349/117; 349/118
[58] Field of Search ...................................... 349/117, 118

[56] References Cited

U.S. PATENT DOCUMENTS

| 4,430,650 | 2/1984 | Billard et al. | 349/182 |
| 5,184,237 | 2/1993 | Iimura et al. | 349/119 |
| 5,568,290 | 10/1996 | Nakamura et al. | 349/117 |

FOREIGN PATENT DOCUMENTS 8-50206A  2/1996  Japan .

OTHER PUBLICATIONS

Miyashita et al. "Wide viewing angle display mode for active matrix LCD using beind alignment liquid crystal", Proc. 13th IDRC (International Display Research Conference), Eurodisplay, Strasbourg, France, pp. 149–152, 1993.

Miyashita et al., "Wide–Viewing–Angle Display Mode Using Bend Alignment Liquid Crystal Cell", Japanese Journal of Applied Physics, vol. 34, Pt. 2, No. 2A, 1995.

Miyashita et al. (1995) "Wide–Viewing–Angle Display Mode Using Bend Alignment Liquid Crystal Cell", *Japanese Journal of Applied Physics* 34(2A): 177–179.

Primary Examiner—William L. Sikes
Assistant Examiner—Julie Ngo
Attorney, Agent, or Firm—Scully, Scott, Murphy & Presser

[57] ABSTRACT

As a compensator for use in an OCB mode liquid crystal display there is provided a compensating film capable of making color compensation and attaining such a viewing angle expansion as has not been attainable heretofore.

A compensating film for a liquid crystal display, constituted by at least one layer of a compensating film to be used in an OCB mode liquid crystal display, the compensating film being formed by a discotic liquid crystalline material having a fixed orientation form of a discotic liquid crystal, the compensating film being disposed between a driving liquid crystal cell and a pair of upper and lower polarizing plates, and the orientation form being a hybrid orientation in which the angle between discotic liquid crystal directors near the upper interface of the film and the film plane and the angle between discotic liquid crystal directors near the lower interface of the film and film plane are different from each other.

6 Claims, 20 Drawing Sheets

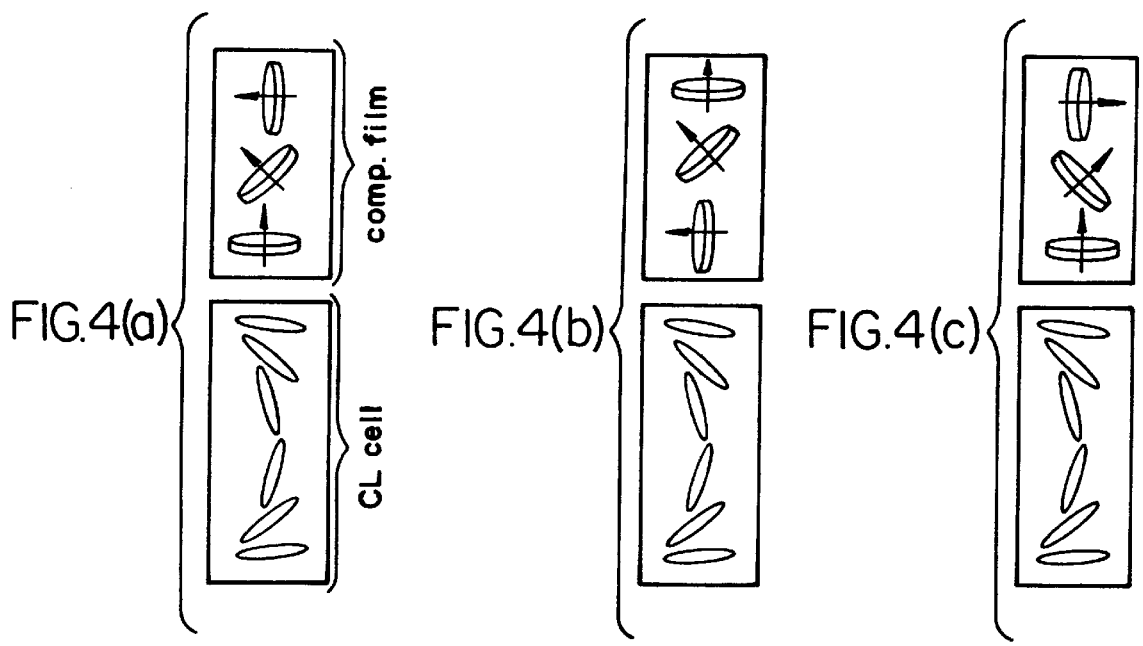
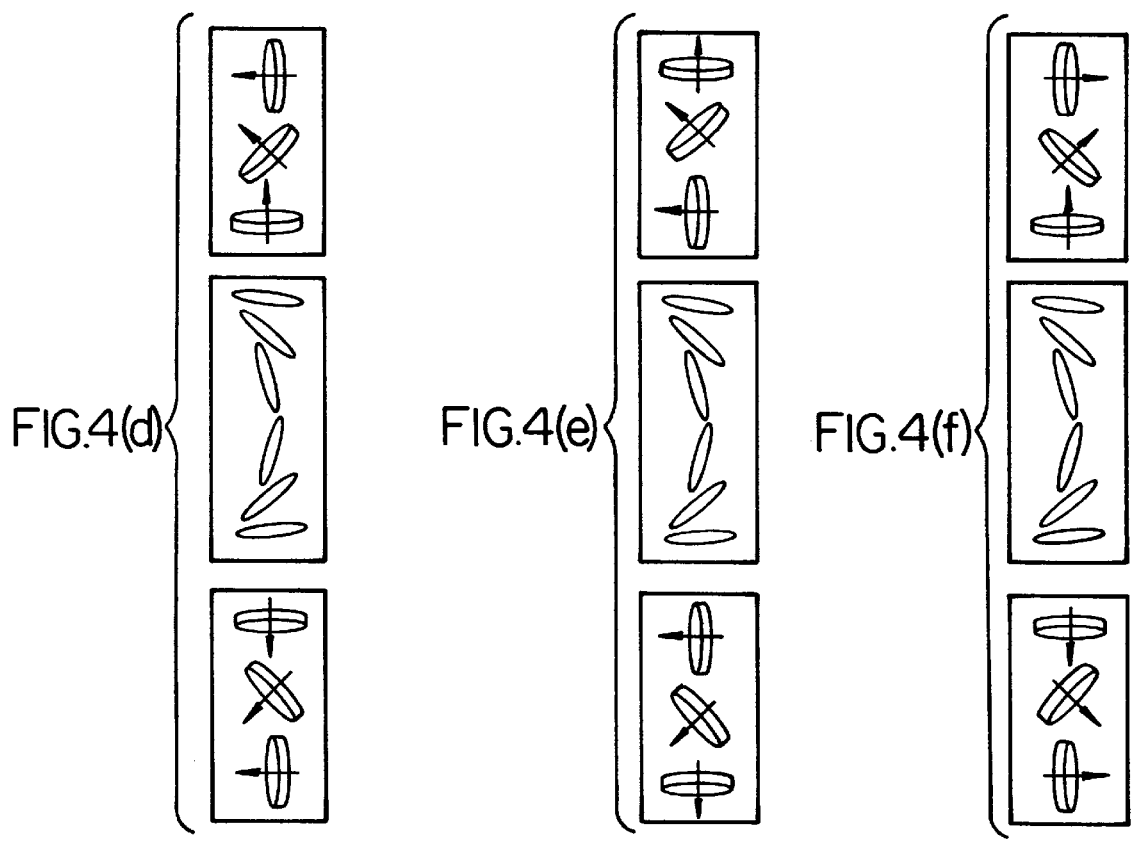

COMPENSATING FILM FOR A LIQUID CRYSTAL DISPLAY AND AN OCB MODE LIQUID CRYSTAL DISPLAY INCORPORATING THE COMPENSATING FILM

TECHNICAL FIELD OF THE INVENTION

The present invention relates to a novel compensator capable of making both color compensation and viewing angle compensation for a driving liquid crystal cell used in a liquid crystal display which is driven in an OCB mode. Further, the invention is concerned with an OCB mode liquid crystal display of a high contrast and a wide viewing angle, incorporating the said compensator.

PRIOR ART

An OCB (Optically Compensated Birefringence) mode liquid crystal display [T. Miyashita, P. Vetter, M. Suzuki, Y. Yamaguchi and T. Uchida: Eurodisply '93, p. 149 (1993), C-L.Kuo, T. Miyashita, M. Suzuki and T. Uchida: SID 94 DIGEST, p. 927 (1994)] utilizes a bend orientation of a nematic liquid crystal such as that shown in FIG. 1.

A feature of the OCB mode liquid crystal display is that the response thereof is high speed and that it can cope with moving pictures. Besides, it is possible that there will be attained a wider viewing angle than in other conventional liquid crystal displays, provided that an ideal compensating means is obtained. The reason is that unlike the conventional TN liquid crystal display which utilizes a twisted orientation, the driving liquid crystal cell used in the OCB mode liquid crystal display involves little twist of liquid crystal, that even if there is a twist of liquid crystal, the contribution thereof is relatively small and that therefore the analysis of behavior of light which travels through the liquid crystal is generally considered easier than in the case of TN liquid crystal. In these points the OCB mode liquid crystal display is expected to be promising as a liquid crystal display of high performance.

Practical application of the OCB mode liquid crystal display requires the use of compensators for making color compensation and viewing angle compensation.

The driving liquid crystal cell used in the OCB mode liquid crystal display makes a black-and-white display or a half tone display on the basis of a difference in the degree of bend orientation. However, whichever state may be, there occurs a retardation having a phase-lag axis in the x-direction in FIG. 1 when seen from the front. Consequently, it is impossible to shield the light and hence impossible to attain a satisfactory contrast ratio. For black display, therefore, it is necessary to use a color compensator capable of offsetting the retardation in a plane which the liquid crystal cell has at the time of black display.

Further, the OCB mode liquid crystal display, like other liquid crystal displays, employs a liquid crystal material having anisotropy and a polarizing plate and therefore involves the problem that its display performance is deteriorated when seen at an oblique angle even though a satisfactory display is obtained when seen from the front. Thus, for the improvement of performance it is required to use a viewing angle compensator.

In the OCB mode, in order to maintain the bend orientation stable, it is necessary that directors of liquid crystal in the driving liquid crystal cell be at a large angle on the average relative to an electrode substrate. An average refractive index distribution is large in the thickness direction of the cell and small in the in-plane direction. As the compensator, therefore, one capable of offsetting this anisotropy and having a refractive index smaller in the film thickness direction than in the in-plane direction, that is, having a so-called negative uniaxial structure, is considered effective.

From such a viewpoint, as a compensator capable of performing both color compensation and viewing angle compensation at a time, the use of a biaxial stretched film having a retardation in a plane and having a refractive index smaller in the thickness direction than in a plane has been proposed by the writers of the foregoing article. In the case of a biaxial stretched film, as mentioned also in the article of T. Uchida et al., a satisfactory compensation is not attained when seen from the yz plane in FIG. 1 although viewing angle compensation is effected to a satisfactory extent when seen from the zx plane in the same figure. This is because the directors of liquid crystal in the cell vary continuously in the film thickness direction and hence there occurs an optically rotatory dispersion of light taveling obliquely along the yz plane. On the other hand, the aforesaid biaxial stretched film cannot eliminate the influence of the optically rotatory dispersion because it does not undergo any change in refractive index in the thickness direction.

Therefore, in order to make satisfactory color compensation and viewing angle compensation at a time for the driving liquid crystal cell used in the OCB mode liquid crystal display, it is considered necessary to satisfy the condition that the refractive index should change in the thickness direction, in addition to the condition that there should be retardation in a plane and the condition that the refractive index in the thickness direction should be smaller than that in a plane. Heretofore, however, there has not been available any optical material or compensator having such a complicated refractive index structure.

OBJECTS OF THE INVENTION

The present invention solves the above-mentioned problems and provides, as a compensator in an OCB mode liquid crystal display, a compensating film capable of effecting not only color compensation but also the expansion of a viewing angle so far not attained and more particularly a compensaing film having a fixed hybrid orientation form of a discotic liquid crystal.

The present invention further provides an OCB mode liquid crystal display incorporating the compensating film therein.

THE PRESENT INVENTION

The present invention, in the first aspect thereof, relates to a compensating film for a liquid crystal display which film comprises at least one layer of a compensating film disposed between a driving liquid crystal cell and a pair of upper and lower polarizing plates, the compensating film being formed of a discotic liquid crystaline material having a fixed orientation form of a discotic liquid crystal. The orientation form is a hybrid orientation wherein the angle between directors of the discotic liquid crystal near the upper interface of the film and the film plane is different from the angle between directors of the discotic liquid crystal near the lower interface of the film and the film plane.

The present invention, in the second aspect thereof, relates to the compensating film for a liquid crystal display mentioned in the above first aspect wherein the hybrid orientation is such that the directors of the discotic liquid crystal are at an angle of between 60° and 90° relative to the film plane on one side of the film, while on the other side of the film the directors are at an angle of between 0° and 50° relative to the film plane.

The present invention, in the third aspect thereof, relates to an OCB mode liquid crystal display which incorporates therein at least one compensating film for a liquid crystal display mentioned in the above first or second aspect of the invention.

The present invention, in the fourth aspect thereof, relates to a compensating element comprising at least one compensating film mentioned in the first or second aspect of the invention and a substrate and wherein the angle between the directors of the discotic liquid crystal near the film interface on the substrate side and the film plane is in the range of between 0° and 50°.

The present invention, in the fifth aspect thereof, relates to a compensating element comprising a substrate and the compensating film mentioned in the above first or second aspect of the invention, the substrate not having substantially any anchoring effect for the discotic liquid crystal.

The present invention, in the sixth aspect thereof, relates to a compensating element comprising a substrate not having any alignment film and compensating film mentioned in the above first or second aspect of the invention.

Further, the present invention, in the seventh aspect thereof, relates to an OCB mode liquid crystal display having at least one compensating element mentioned in any of the above fourth to sixth aspect of the invention.

The present invention will be described in more detail hereinunder.

In general, the discotic liquid crystal is developed by molecules each having a disc-like mesogen of high flatness. The discotic liquid crystal is characteristic in that the refractive index in a very small area in the liquid crystal layer has a negative uniaxial property. As shown in FIG. 2, if refractive indices in a certain plane are equal (assumed to be "no"), the direction perpendicular to the plane is a director (a unit vector representing a local orientation direction of liquid crystal). The refractive index in the director direction is assumed to be "ne". There exists the relation of no>ne. The refractive index characteristic and hence optical characteristics of the resulting structure are determined depending on how the director in a very small area is arranged in the whole liquid crystal layer. When the director direction (angle) is the same throughout the whole of the liquid crystal layer, the direction corresponds to the optical axis of the entire liquid crystal layer.

Usually, when directors face in the same direction throughout the whole of a liquid crystal layer, the liquid crystal layer exhibits a negative uniaxial property. An orientation of a discotic liquid crystal obtained by a conventional method gives the negative uniaxial structure as shown in FIG. 3(a) or 3(b). The orientation shown in FIG. 3(a) is called a homeotropic orientation because all of discotic liquid crystal directors present in the liquid crystal layer are arranged in the normal to the substrate. The orientation shown in FIG. 3(b) is a tilt orientation wherein all of discotic liquid crystal directors present in the liquid crystal layer are tilted at a certain angle from the normal of the substrate. In the tilt orientation, an optical axis of the entire liquid crystal layer is present in the tilted direction.

The orientation form of the compensating film according to the present invention is entirely different from the above mentioned negative uniaxial structure including the homeotropic orientation and tilt orientation. The compensating film according to the present invention is a single-layer film wherein an optical axis of the entire film is not existent and wherein the angle between discotic liquid crystal directors and the film plane is different between the portion near the upper interface of the film and the portion near the lower interface of the film. More particularly, the angle between the directors and the film plane is different at various portions in the film thickness direction. In the compensating film according to the present invention, moreover, the directions obtained when the discotic liquid crystal directors are projected in the film plane (director directions) are almost the same throughout the entire liquid crystal layer, namely, throughout the compensating film. Now that the director angle is different between the portion near the upper interface of the film and the portion near the lower interface of the film and that the director directions face in one direction, the film is presumed to present a unique orientation such that the angle between the discotic liquid crystal directors and the film plane varies almost continuously in the film thickness direction, as shown in FIG. 2(c).

In a rod-like nematic liquid crystal, the orientation which presents such a continuous change in the director angle in the film thickness direction is called a hybrid orientation. In view of this point, the orientation form of the compensating film according to the present invention will also be designated hybrid orientation hereinafter.

In order to attain a color compensation effect for the driving liquid crystal cell used in an OCB mode liquid crystal display, it is required that a retardation be present when seen from the front. In this connection, the homeotropic orientation shown in FIG. 3(a) is inappropriate because there is no refractive index anisotropy when seen from the front.

Further, in order to effect a satisfactory viewing angle compensation it is necessary that there occur an optically rotatory dispersion against an obliquely taveling light. In this point the orientations shown in FIGS. 3(a) and (b) are inappropriate because there is no structural change in the film thickness direction.

Thus, in order to make both color compensation and a wide range of viewing angle compensation for the driving liquid crystal cell of OCB mode, the hybrid orientation shown in FIG. 3(c) is most suitable. As mentioned previously, the compensating film according to the present invention forms such an orientation as shown in FIG. 3(c). From this point it is seen that the compensating film according to the present invention can effect satisfactory color compensation and viewing angle compensation for the driving liquid crystal cell of OCB mode.

In the present invention, an anglar range of the hybrid orientation in the film thickness direction is usually between 60° and 90° in the vicinity of either the upper interface or the lower interface of the film and between 0° and 50° in the vicinity of the opposite interface in terms of an absolute value of a minimum angle between the discotic liquid crystal director and the film plane, namely an angle obtained by (90°-a°) wherein "a" is an angle between the discotic liquid crystal director and the normal line to the film plane which is not an obtuse angle (i.e. within the range of from 0° to 90°). More preferably, the absolute value of one angle is between 80° and 90° and that of the other angle is between 0° and 30°.

Now, a description will be given of the discotic liquid crystalline material used in the present invention. The said material is constituted by a discotic liquid crystalline material alone or a composition containing at least one such liquid crystalline compound.

By C. Destrade et al. discotic liquid crystals are classified according to their molecular orientation orders into ND phase (discotic nematic phase), Dho phase (hexagonal ordered columnar phase), Dhd phase (hexagonal disordered columnar phase), Drd phase (rectangular disordered columnar phase), and Dob phase (oblique columnar phase) [C. Destrade et al., Mol. Cryst. Liq. Cryst. 106, 121 (1984)]. The molecular orientation order is not specially limited in the present invention, but from the standpoint of easiness of orientation it is preferable to use a material having at least ND phase which is the lowest in orientation order. Particularly preferred is a material which has ND phase alone as the only liquid crystal phase.

The discotic liquid crystalline material used in the present invention preferably does not exhibit transition from liquid crystal phase to crystal phase at the time of fixing its orientation form so that the orientation form in the state of liquid crystal may be fixed without impairment. Moreover, it is desirable that the discotic liquid crystalline material when formed into film can maintain the orientation form under the conditions of practical use and can be handled in the same manner as a solid. Most typically and preferably, the "fixed" state as referred to herein indicates an amorphous glassy state in which the liquid crystal orientation in the liquid crystal state is frozen. However, no limitation is placed thereon. That is, the fixed state in question indicates a state in which under the conditions of practical use of the compensating film of the present invention, more specifically in the temperature range usually from 0° to 50° C., more severely from −30° C. to 70° C., the fixed orientation form can be retained stably without fluidity of the film and without a change in the orientation form caused by an external field or force. In view of the above points it is preferably that the discotic liquid crystalline material used in the present invention possesses any of the following properties.

① At a lower temperature region than the state of liquid crystalline material has only a glassy phase and does not have a crystalline phase. As the temperature drops from the state of liquid crystal, the material is fixed into the glassy state.

② The material has a crystalline phase at a lower temperature region than the state of liquid crystal and has a glassy phase at a lower temperature region than the crystalline phase. As the temperature drops form the state of liquid crystal, a crystal phase does not appear (due to supercooling of crystal phase or due to monotropicity involving crystallization only during the rise of temperature), but the material is fixed into the glassy state.

③ The material has a crystal phase at a lower temperature region than the state of the liquid crystal, but at a still lower temprature region the material does not exhibit a clear glass transition, and when the temperatue drops from the state of liquid crystal, there does not appear a crystalline phase (due to supercooling of crystalline phase or due to monotropicity involving crystallization only during the rise of temperature). At a still lower temperature than the melting point, which is observed upon re-heating after fixing, the material is extremely limited in its molecular fluidity and can be regarded as a solid material in practical use.

④ At a lower temperature region than the state of liquid crystal a clear transition to crystal phase or to glassy state is observed neither during the rise of temperature nor during the fall of temperature. There is no fluidity in the working temprature range of the film in question, and even when an external force such as shear or an external field is applied to the film, the orientation form does not change.

Of the above propertis, more preferable ones are ① and ②, and the most preferred is ①. Also as to ③ and ④, both properties are applicable to practical use without any trouble, provided it is necessary to make sure carefully that there will be no possibility of occurrence of orientation disorder under the working conditions of practical use of the film. More specifically, usually in the temperature range from 0° to 50° C., if the orientation form is not disordered under forced application of shear for example, there is no problem. On the other hand, if the orientation form is disordered due to shear for example, the inherent optical performance is lost, and no matter what treatment may be conducted subsequently, it is difficult to restore the original orientation form, thus posing a serious problem in practical use.

It is desirable that the discotic liquid crystalline material used in the present invention possess any of the foregoing properties and exhibit a good domain uniformity. If the domain uniformity is bad, the resulting structure will be a polydomain structure, in which light is scattered due to an orientation defect at the boundary of domains. Deterioration in the transmittance of the film will also result. Thus, a poor domain uniformity is not desirable.

Description is now directed to disotic liquid crystalline compounds each employable as the liquid crystalline material in question. These compounds are each composed principally of a disc-shaped central portion (discogen) essential for developing a discotic liquid crystal phase and substituent groups necessary for stabilizing the liquid crystal phase. Monofunctional ones are preferred as the said substituent groups, but even a compound obtained by using bifunctional substituent groups and partially coupling discogens with each other, allowing oligomerization or polymerization to take place, is also employable preferably as the liquid crystalline material in the present invention.

The following are molecular structures of discotic liquid crytalline compounds employable in the present invention:

Hereinafter, the molecule structures of the discotic liquid crystalline compounds used in the present invention are illustratec concretely:

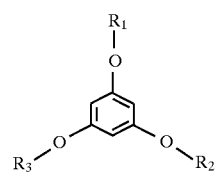

[Structural formula 1]

wherein $R_1$, $R_2$ and $R_3$ are each independently a monofunctional or bifunctional substituent group selected from the following groups:

Monofunctional substituent groups:

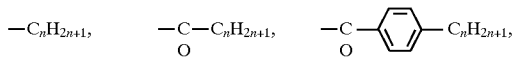

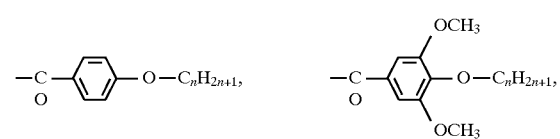

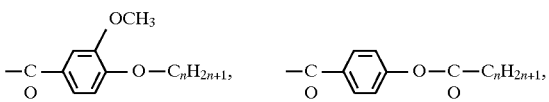

-continued

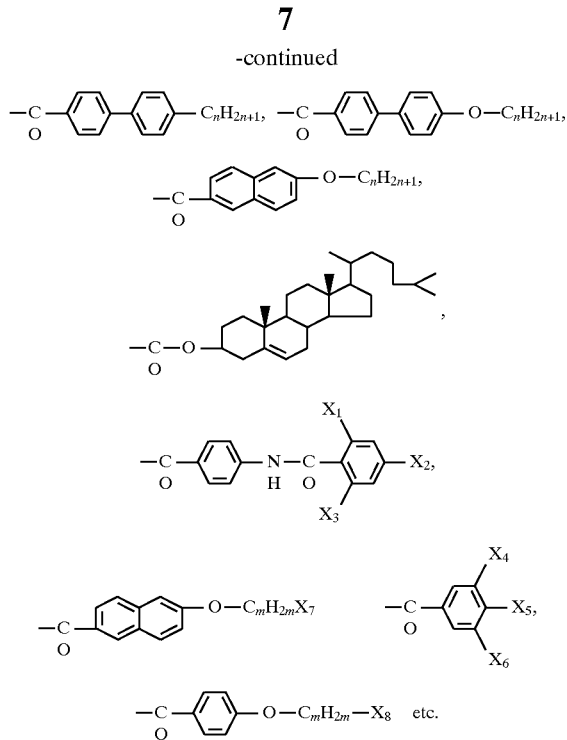

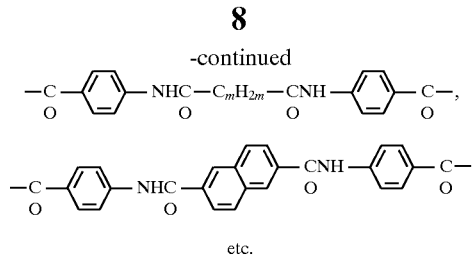

etc.

wherein $C_mH_{2m}$ is a linear or branched alkylene chain, and m is an integer of 2–16, more preferably 4–12.

Examples of the concrete structures:

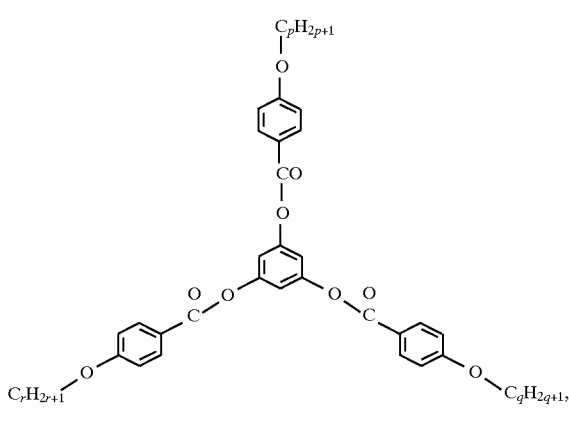

wherein p, q and r are each an integer of 1–18, preferably 3–14.

wherein $C_nH_{2n+1}$ is a linear or branched alkyl group, and n is an integer of 1–18, preferably 3–14, $X_1$–$X_8$ are each independently H—, F—, Cl—, Br—, $C_lH_{2l+1}$, $C_lH_{2l+1}O$—, $C_6H_5$—, $C_6H_5CO$— or $C_6H_5O$—, $C_lH_{2l+1}$ is a linear or branched alkyl groups, l is an integer of 1–18, preferably 1–10, $C_mH_{2m}$ is a linear or branched alkylene chain and m is an integer of 1–6, preferably 2–10.

Bifunctional substituent groups:

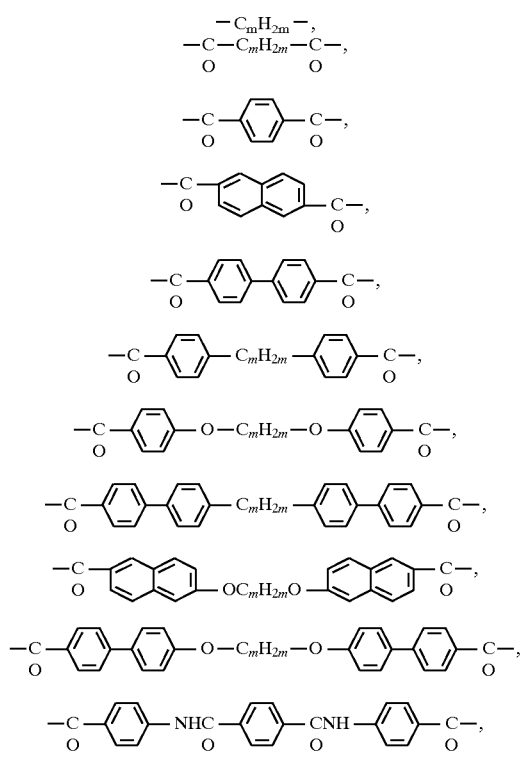

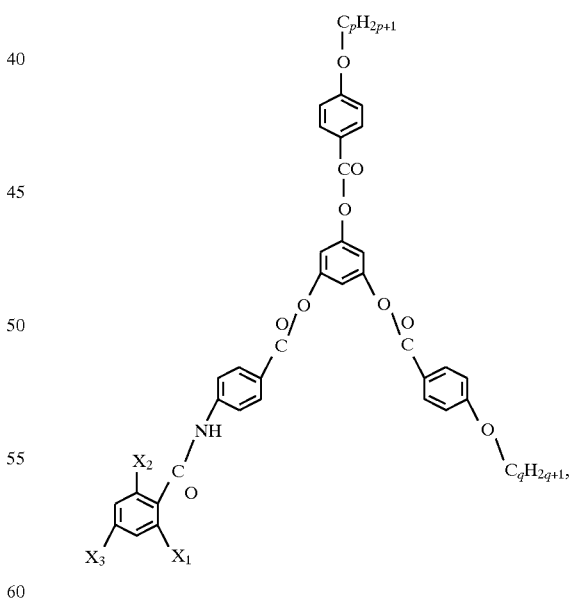

wherein p and q are each an integer of 1–18, preferably 3–14, $X_1$, $X_2$ and $X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

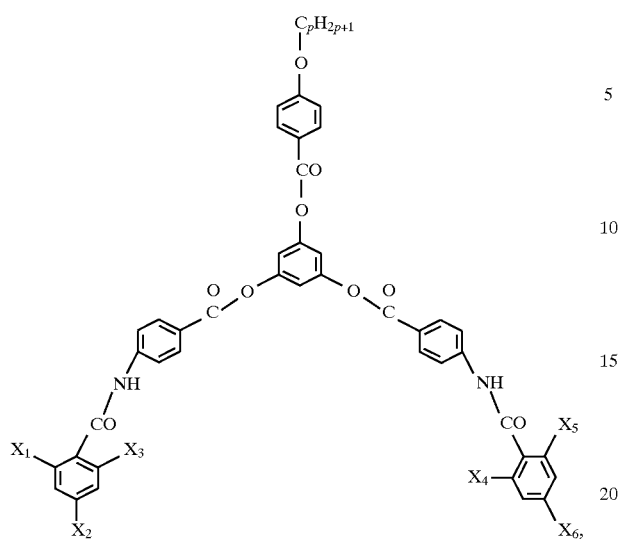

wherein p is an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl, and l is an integer of 1–18, preferably 1–10.

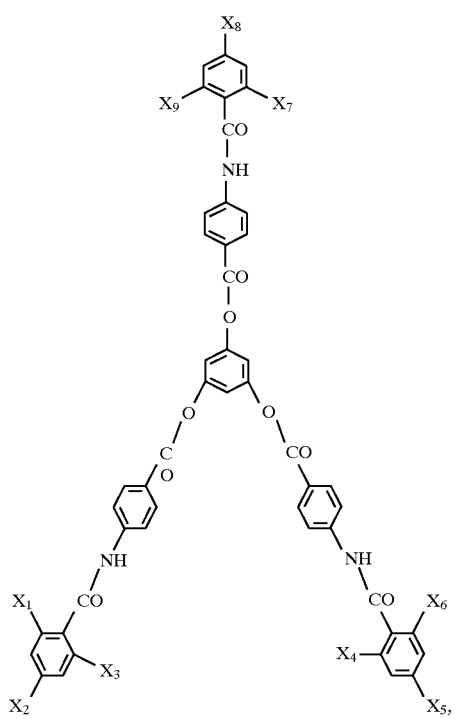

wherein $X_1$–$X_9$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

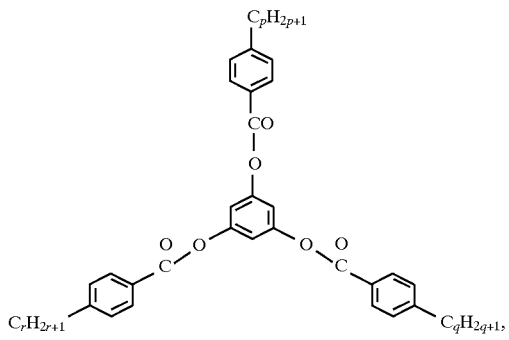

wherein p, q and r are each an integer of 1–18, preferably 3–14.

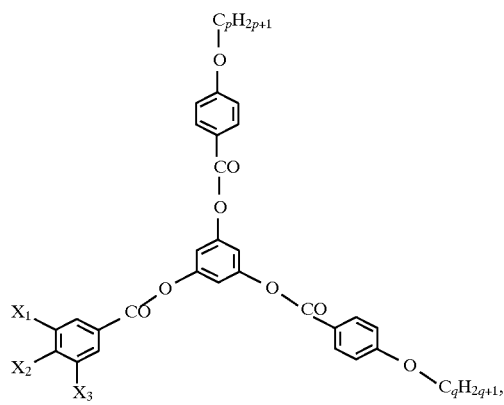

wherein p, q are each an integer of 1–18, preferably 3–14. $X_1$ and $X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

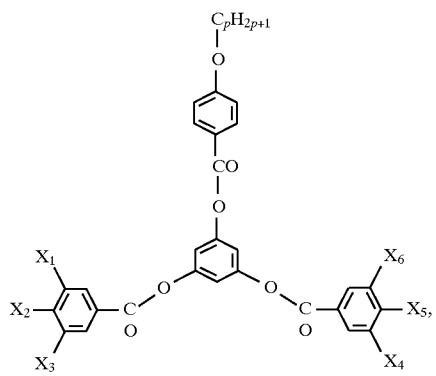

wherein p is an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

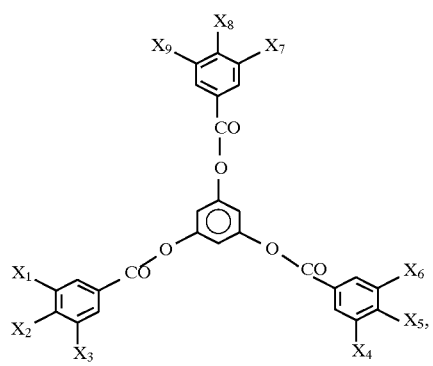

wherein $X_1$–$X_9$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

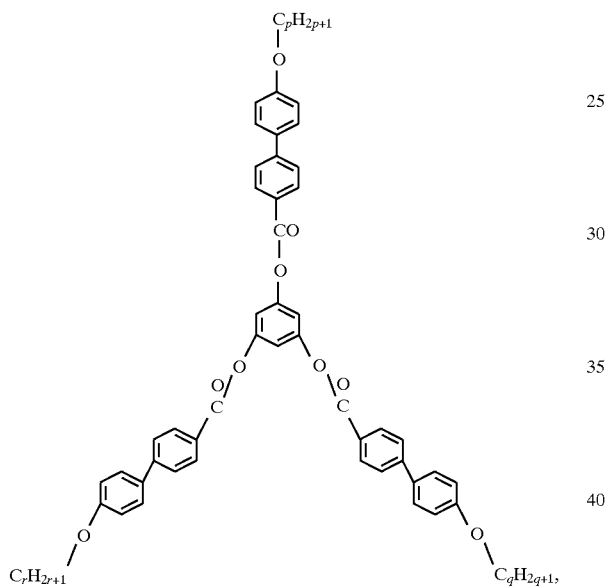

wherein p, q and r are each an integer of 1–18, preferably 3–14.

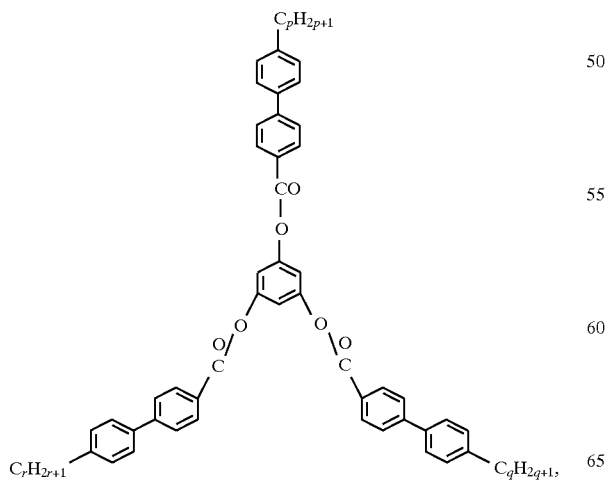

wherein p, q and r are each an integer of 1–18, preferably 3–14.

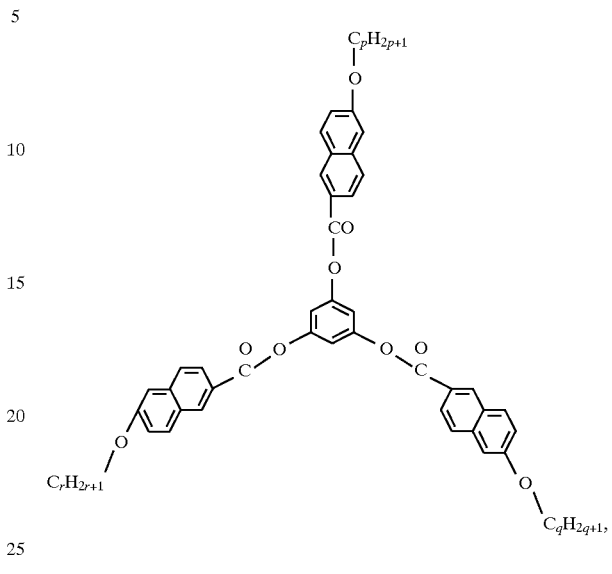

wherein p, q and r are each an integer of 1–18, preferably 3–14.

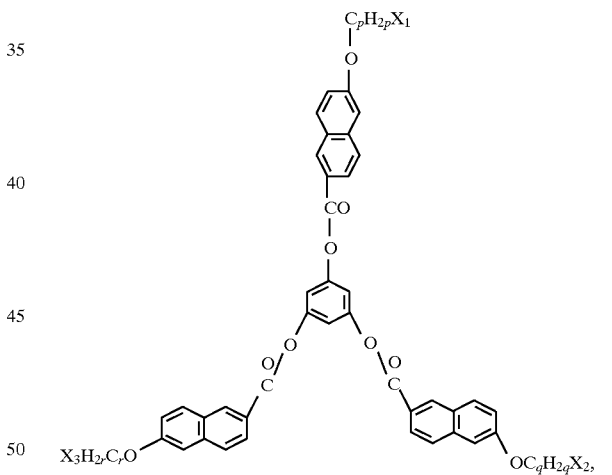

wherein p, q and r are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

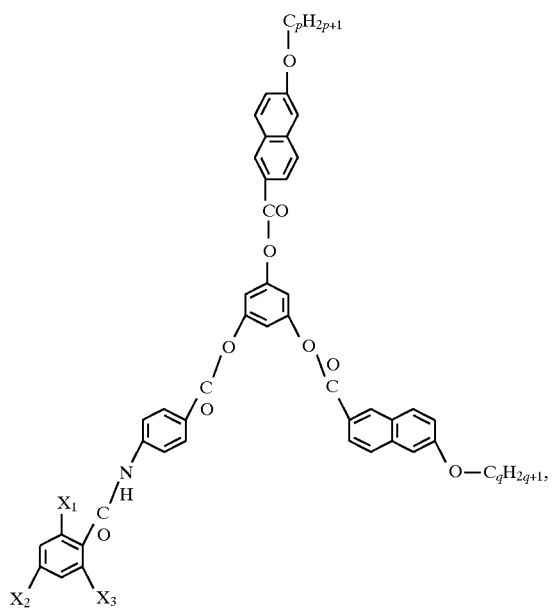

wherein p and q are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

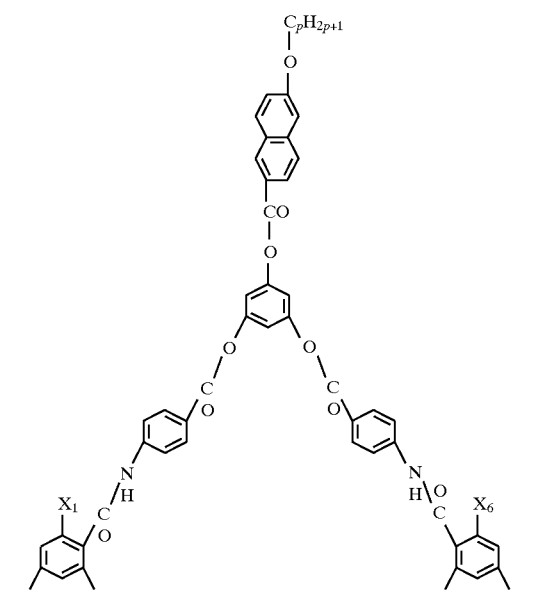

wherein p is an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Polymer represented by

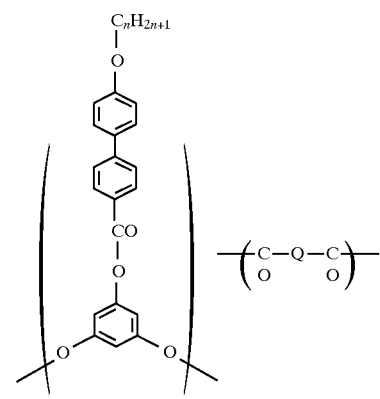

wherein Q is

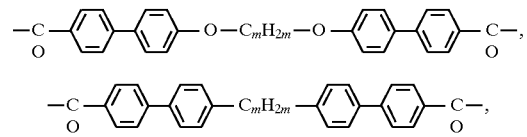

wherein n is an integer of 1–18, preferably 3–14, m is an integer of 2–16, more preferably 4–12 and the average molecular weight is 4,000–100,000.

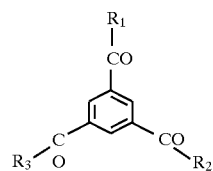

[Structural formula 2]

wherein $R_1$, $R_2$ and $R_3$ are each a monofunctional or bifunctional substituent group.

Monofunctional groups:

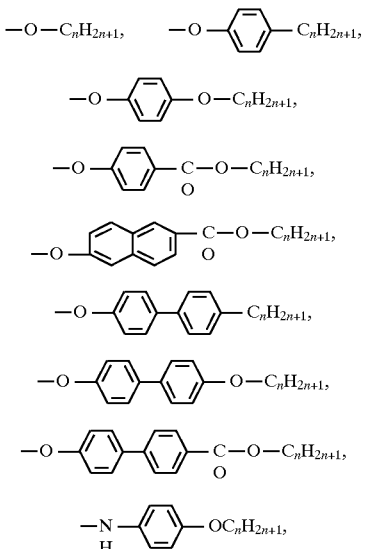

-continued
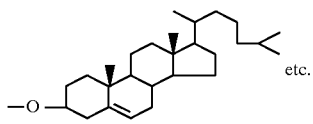
etc.
wherein $C_nH_{2n+1}$ is a linear or branched alkyl gorup, and n is an integer of 1–18, preferably 3–14.
Bifunctional groups:
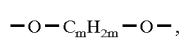
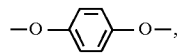
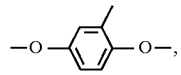
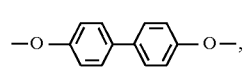
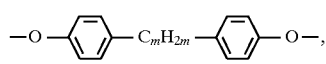
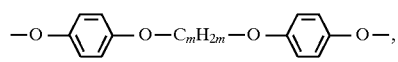
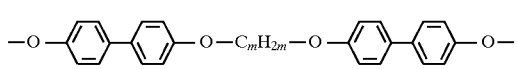
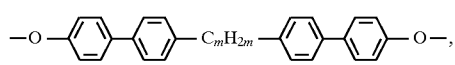
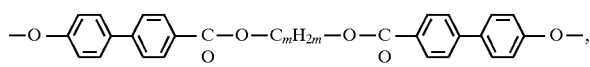
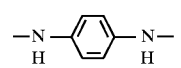
etc.
wherein $C_mH_{2m}$ is a linear or branched alkylene chain, and m is an integer of 2–16, preferably 4–12.
Examples of the concrete structures:
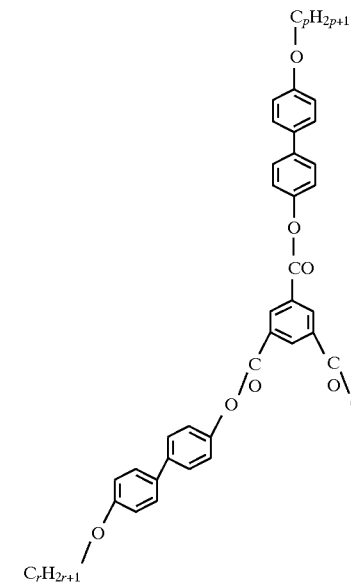
wherein p, q and r are each an integer of 1–18, preferably 3–14.
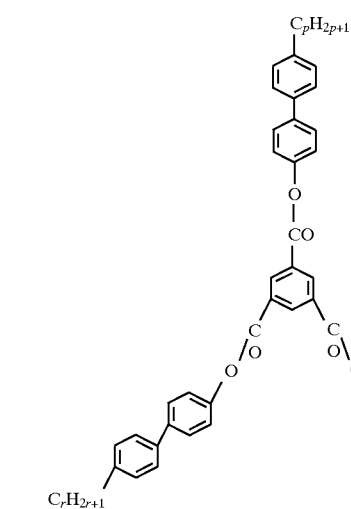
wherein p, q and r are each an integer of 1–18, preferably 3–14.

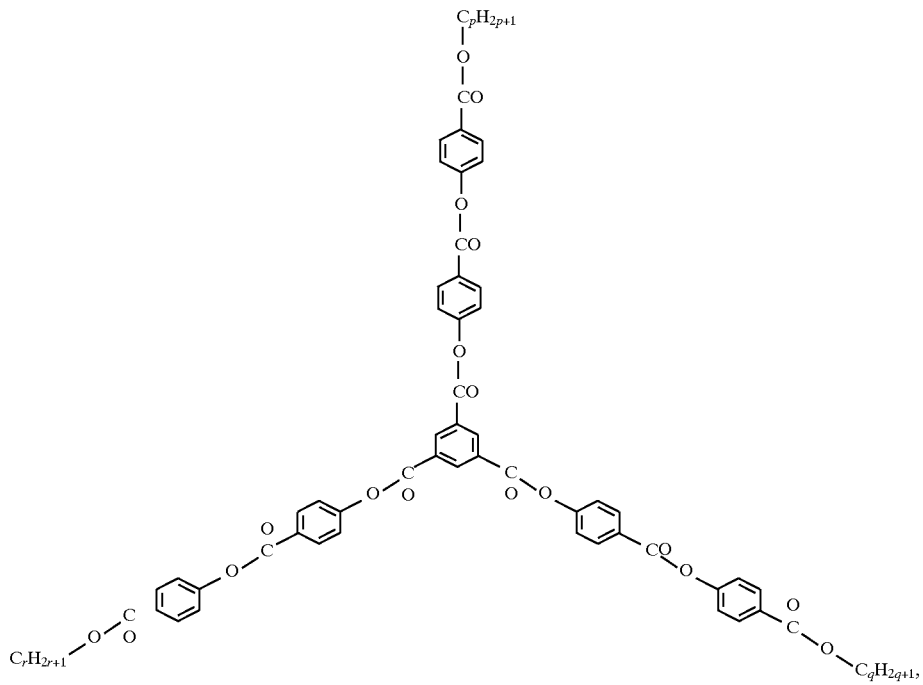
wherein p, q and r are each an integer of 1–18, preferably 3–14.
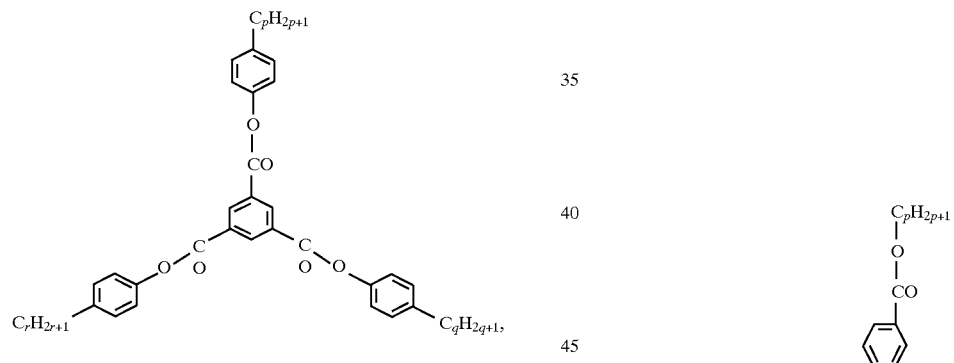
wherein p, q and r are each an integer of 1–18, preferably 3–14.
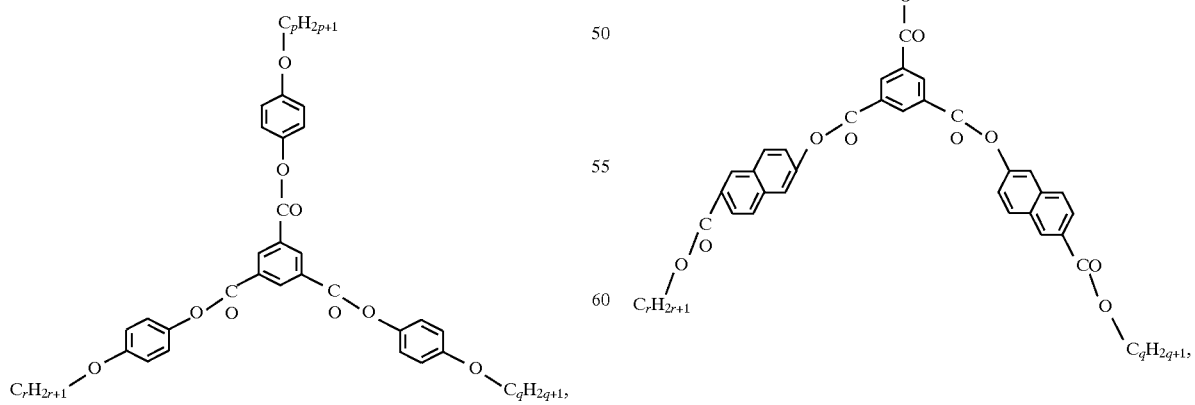
wherein p, q and r are each an integer of 1–18, preferably 3–14.
wherein p, q and r are each an integer of 1–18, preferably 3–14.

Polymer represented by

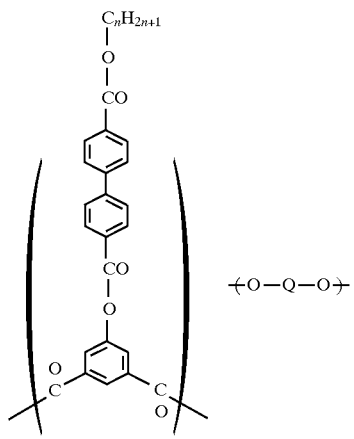

wherein the average molecular weight is 4,000–100,000 and Q is

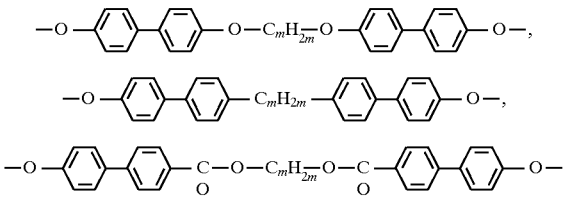

etc.

wherein n is an integer of 1–18, preferably 3–14, and m is an integer of 2–16, preferably 4–12.

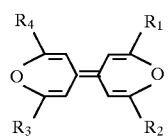 [Structural formula 3]

wherein $R_1$, $R_2$, $R_3$ and $R_4$ are each a monofunctional or bifunctional substituent group selected from the following groups:

Monofunctional substituent groups:

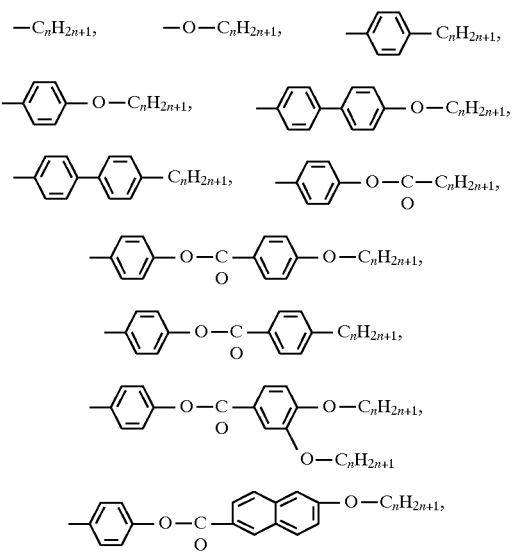

-continued

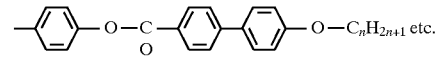 etc.

wherein n is an integer of 1–18, preferably 3–14, and m is an integer of 2–16, preferably 4–12.

Bifunctional substituent groups:

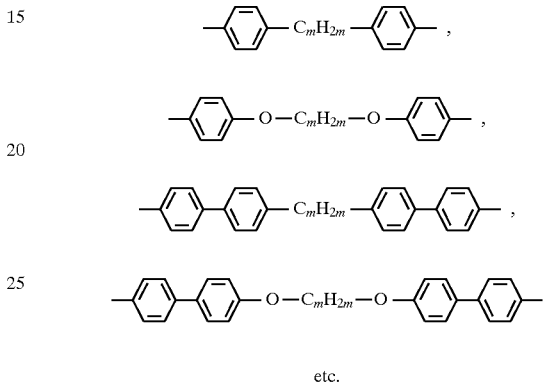

etc.

wherein $C_mH_{2m}$ is a linear or branched alkylene chain, and m is an integer of 2–16, preferably 4–12. Examples of the concrete structures:

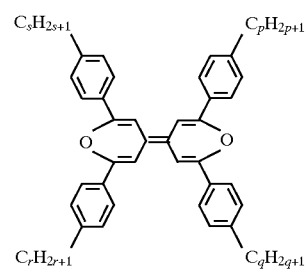

wherein p, q, r and s are each an integer of 1–18, preferably 3–14.

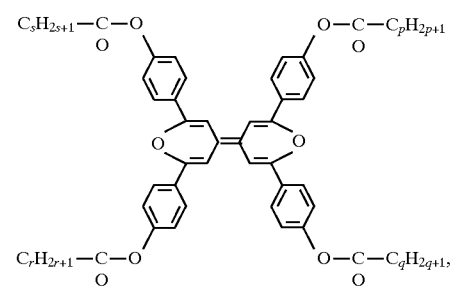

wherein p, q, r and s are each an integer of 1–18, preferably 3–14.

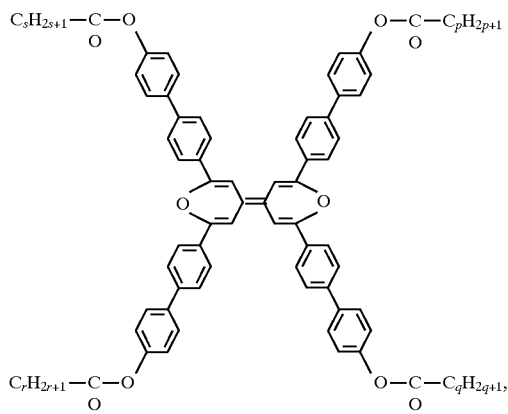

wherein p, q, r and s are each an integer of 1–18, preferably 3–14.

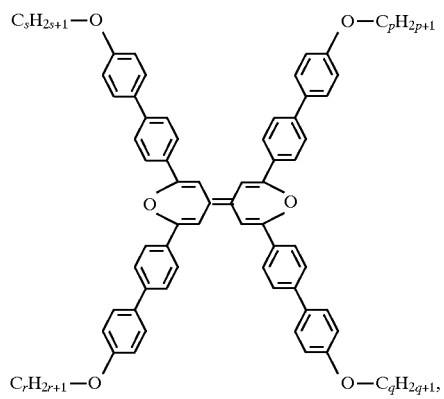

wherein p, q, r and s are each an integer of 1–18, preferably 3–14.

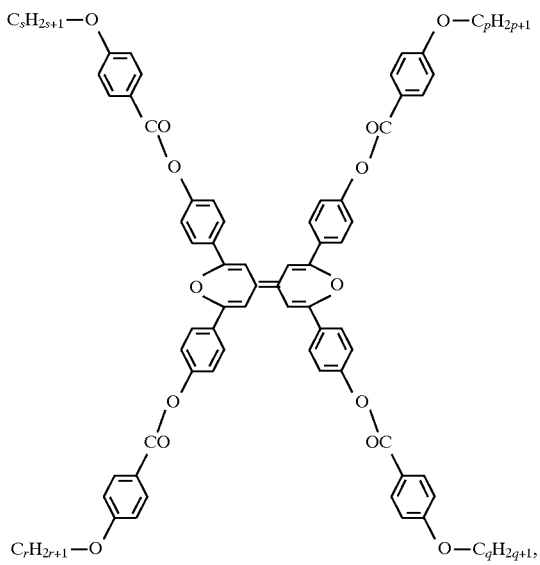

wherein p, q, r and s are each an integer of 1–18, preferably 3–14.

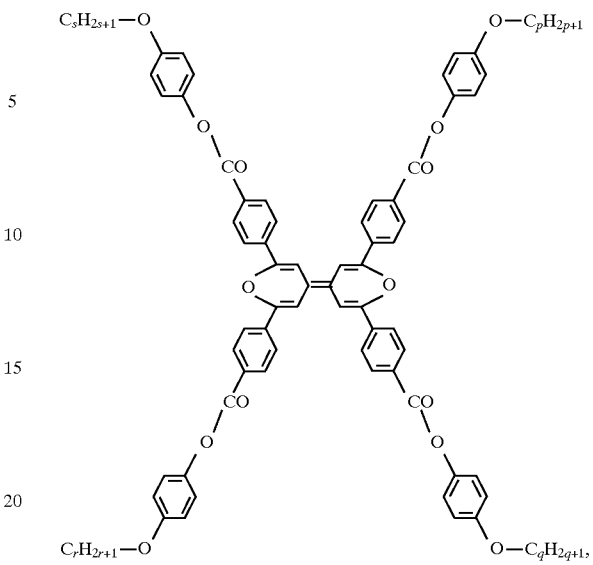

wherein p, q, r and s are each an integer of 1–18, preferably 3–14.

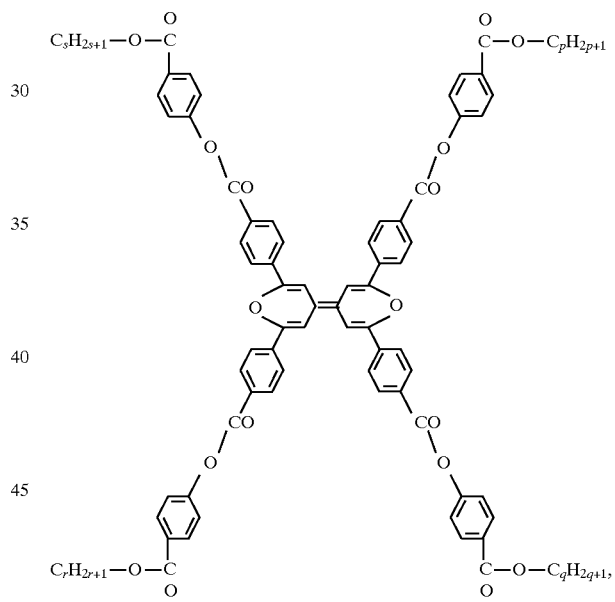

wherein p, q, r and s are each an integer of 1–18, preferably 3–14.

[Structural formula 4]

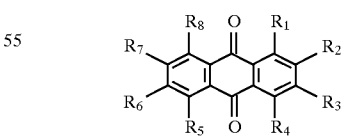

wherein $R_1$–$R_8$ are each independently a monofunctional or bifunctional substituent group selected from the following groups:

Monofunctional substituent groups:

—H (at most 4),

-continued $-C_nH_{2n+1},\quad -O-C_nH_{2n+1},\quad -O-\underset{O}{\underset{\|}{C}}-C_nH_{2n+1},$ $-O-\underset{O}{\underset{\|}{C}}-\!\!\!\!\bigcirc\!\!\!\!-C_nH_{2n+1},\quad -O-\underset{O}{\underset{\|}{C}}-\!\!\!\!\bigcirc\!\!\!\!-O-C_nH_{2n+1},$ $-O-\underset{O}{\underset{\|}{C}}-\!\!\!\!\bigcirc\!\!\!\!-\!\!\!\!\bigcirc\!\!\!\!-O-C_nH_{2n+1},$ $-O-\underset{O}{\underset{\|}{C}}-\!\!\!\!\bigcirc\!\!\!\!-\!\!\!\!\bigcirc\!\!\!\!-C_nH_{2n+1},$ $-O-\underset{O}{\underset{\|}{C}}-\text{naphthyl}-O-C_nH_{2n+1},$ $-O-\underset{O}{\underset{\|}{C}}-\!\!\!\!\bigcirc\!\!\!\!\overset{O-C_nH_{2n+1}}{\underset{O-C_nH_{2n+1}}{}}$ etc.

wherein $C_nH_{2n+1}$ is a linear or branched alkyl group, and n is an integer of 1–18, preferably 3–14.

Bifunctional substituent groups:

$-O-\underset{O}{\underset{\|}{C}}-C_mH_{2m}-\underset{O}{\underset{\|}{C}}-O-,$ $-O-C_mH_{2m}-O-,$ $-O-\underset{O}{\underset{\|}{C}}-\!\!\!\!\bigcirc\!\!\!\!-\underset{O}{\underset{\|}{C}}-O-,$ $-O-\underset{O}{\underset{\|}{C}}-\text{naphthyl}-\underset{O}{\underset{\|}{C}}-O-,$ $-O-\underset{O}{\underset{\|}{C}}-\!\!\!\!\bigcirc\!\!\!\!-\!\!\!\!\bigcirc\!\!\!\!-\underset{O}{\underset{\|}{C}}-O-$ etc.

wherein $C_mH_{2m}$ is a linear or branched alkylene chain, and m is an integer of 2–16, preferably 4–12.

Examples of the concrete structures:

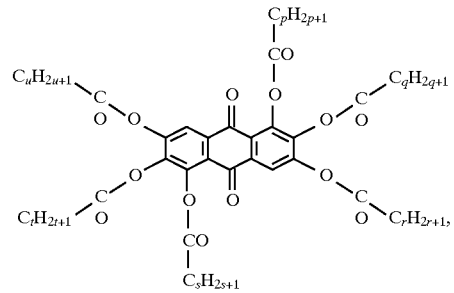

wherein p, q, r, s, t, u, v and w are each an integer of 1–18, preferably 3–14.

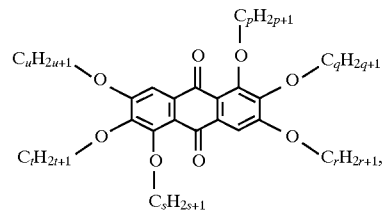

wherein p, q, r, s, t, and u are each an integer of 1–18, preferably 3–14.

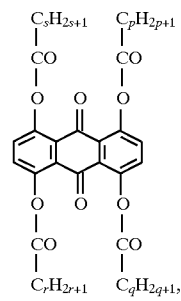

wherein p, q, r, s, t and u are each an integer of 1–18, preferably 3–14.

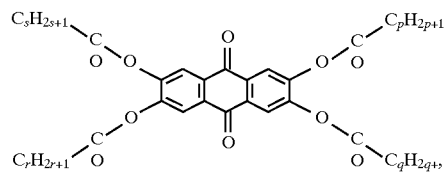

wherein p, q, r, and s are each an integer of 1–18, preferably 3–14.

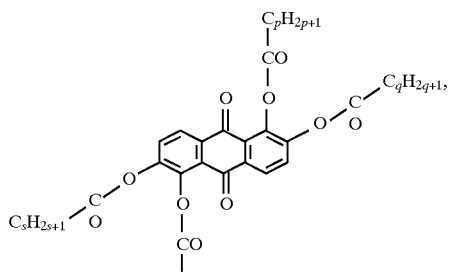

wherein p, q, r, and s are each an integer of 1–18, preferably 3–14.

wherein p, q, r, and s are each an integer of 1–18, preferably 3–14.
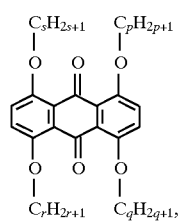
wherein p, q, r, and s are each an integer of 1–18, preferably 3–14.
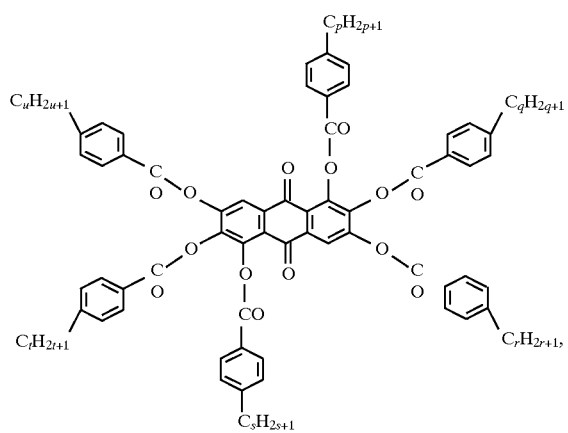
wherein p, q, r, s, t and u are each an integer of 1–18, preferably 3–14.
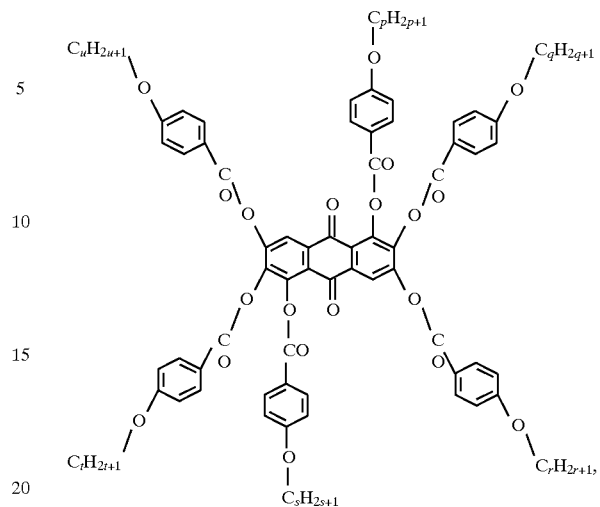
wherein p, q, r, s, t and u are each an integer of 1–18, preferably 3–14.
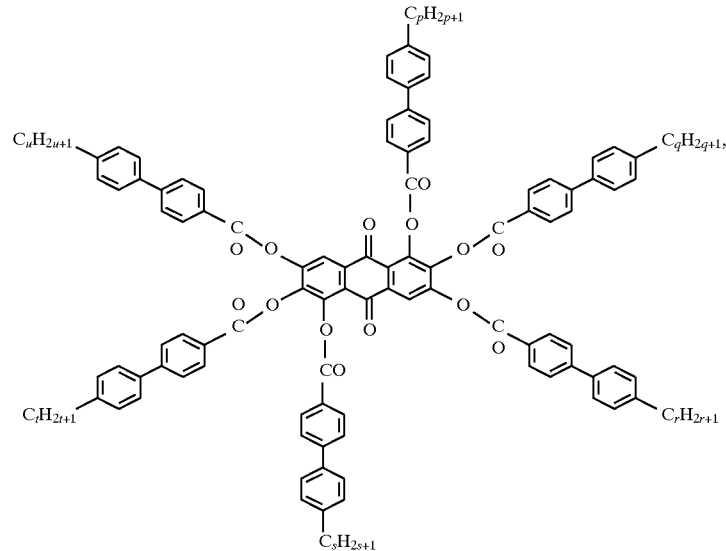
wherein p, q, r, s, t and u are each an integer of 1–18, preferably 3–14.

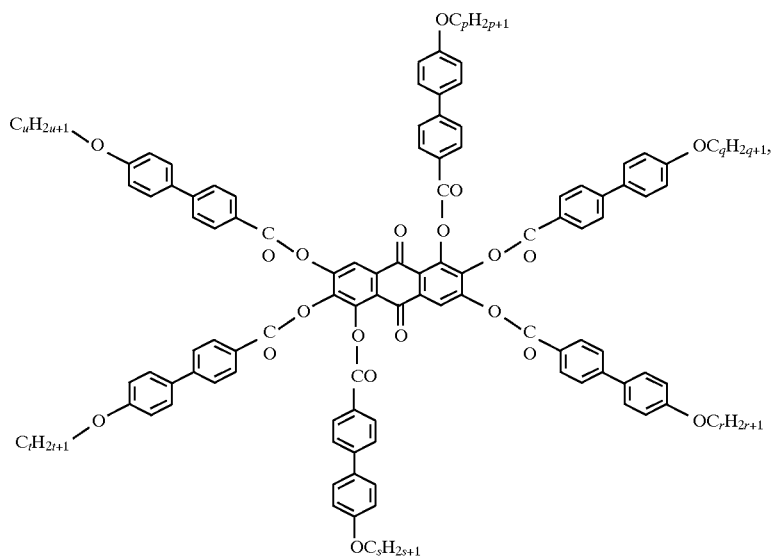
wherein p, q, r, s, t and u are each an integer of 1–18, preferably 3–14.
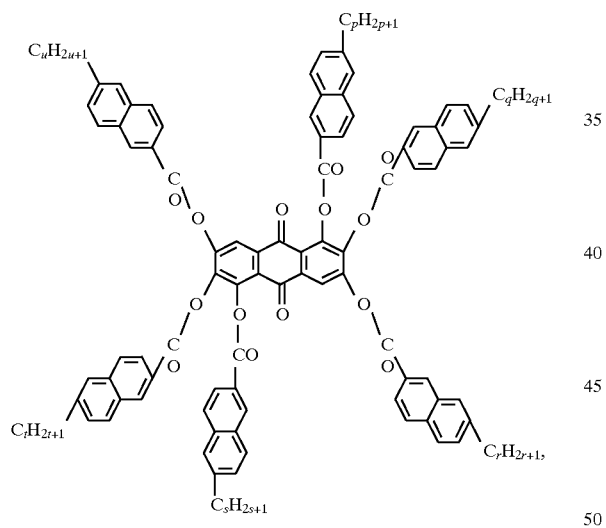
wherein p, q, r, s, t and u are each an integer of 1–18, preferably 3–14.

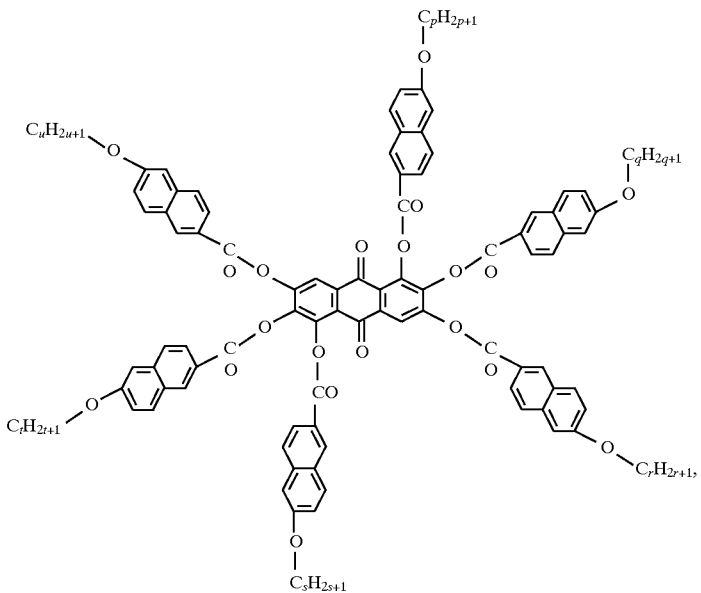
(25)
wherein p, q, r, s, t and u are each an integer of 1–18, preferably 3–14.
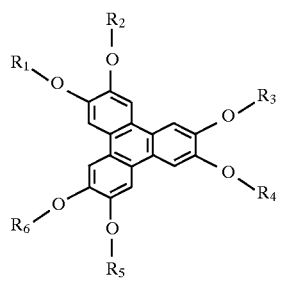
[Structural formula 5] (30)
wherein $R_1$–$R_6$ are each a monofunctional or bifunctional substituent group selected from the following groups:
Monofunctional substituent groups:
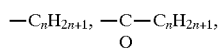
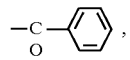
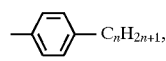
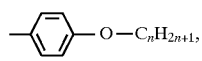
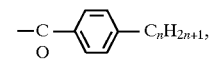
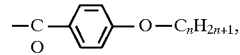
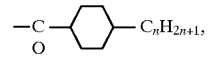
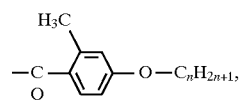
-continued
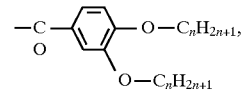
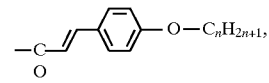
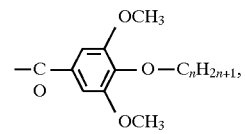
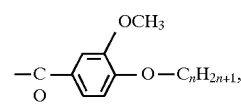
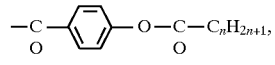
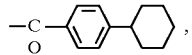
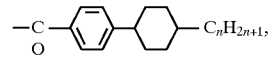
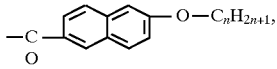
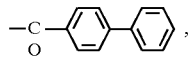
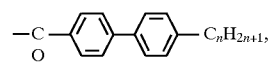
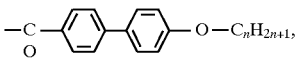

-continued

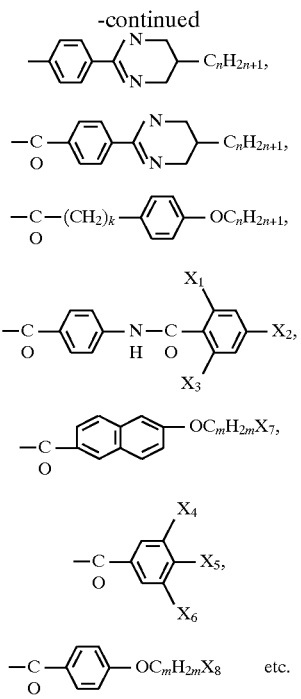

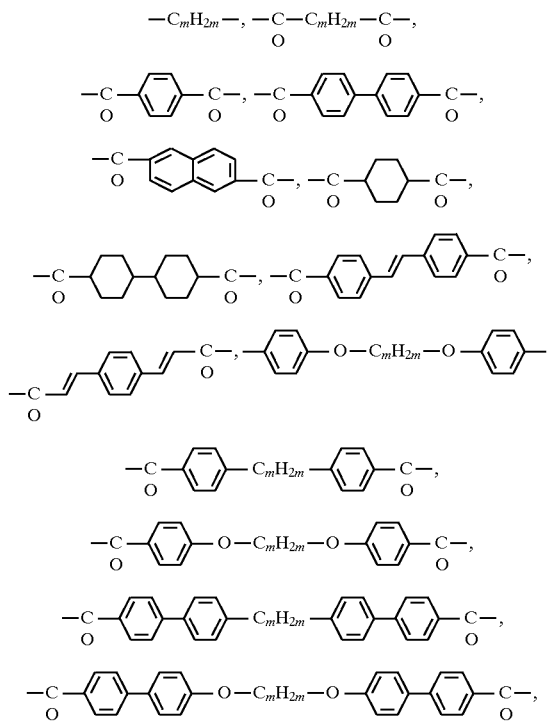

wherein $C_nH_{2n+1}$ is a linear or branched alkyl group, n is an integer of 1–18, preferably 3–14, $X_1$–$X_8$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10, $C_mH_{2m}$ is a linear or branched alkylene group, and m is an integer of 1–16, preferably 2–10.

Bifunctional substituent groups:

-continued

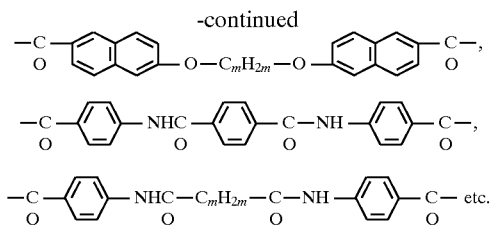

wherein $C_mH_{2m}$ is a linear or branched alkylene group, and m is an integer of 2–16, preferably 4–12. Examples of the concrete structures:

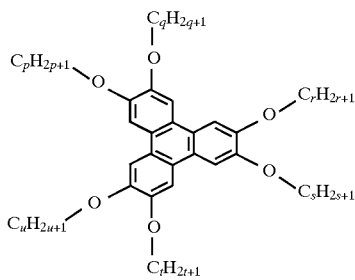

wherein p, q, r, s, t and u are each an integer of 1–18, preferably 3–14.

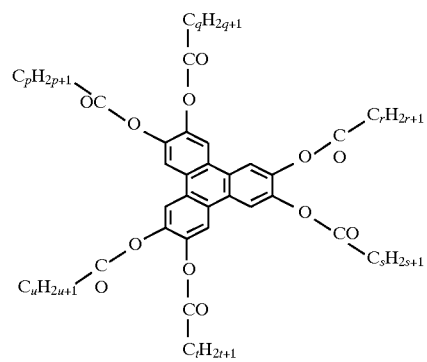

wherein p, q, r, s, t and u are each an integer of 1–18, preferably 3–14.

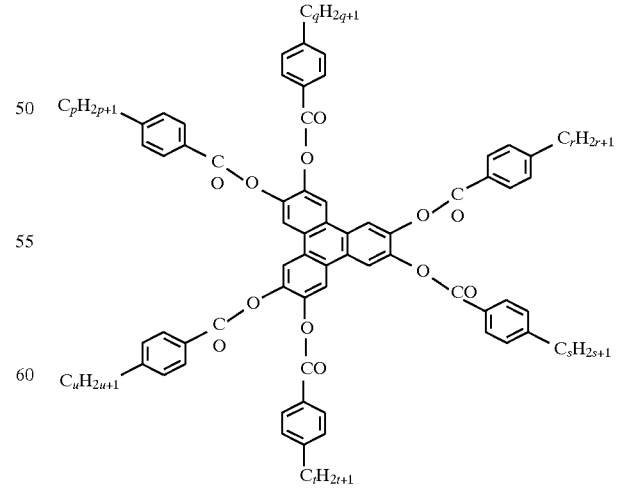

wherein p, q, r, s, t and u are each an integer of 1–18, preferably 3–14.

33

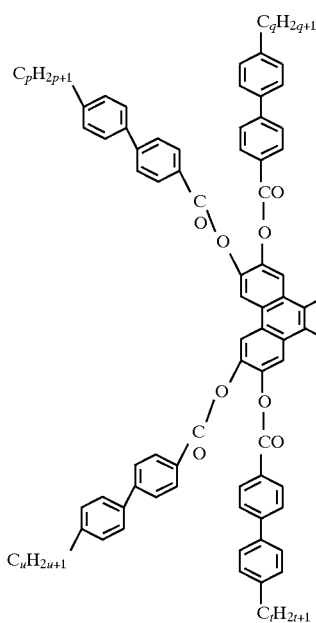

wherein p, q, r, s, t and u are each an integer of 1–18, preferably 3–14.

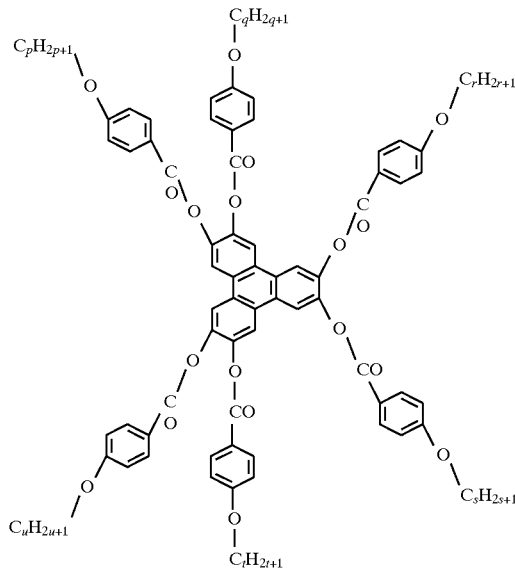

wherein p, q, r, s, t and u are each an integer of 1–18, preferably 3–14.

34

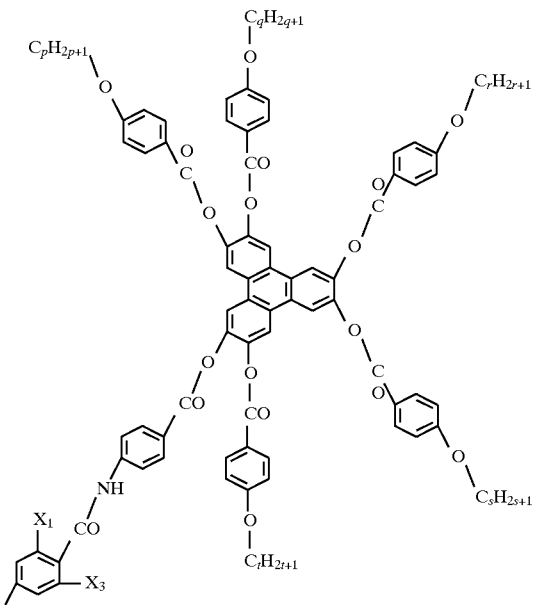

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

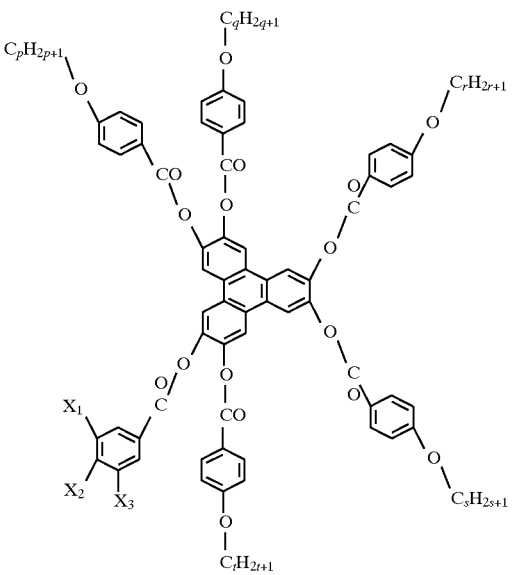

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10
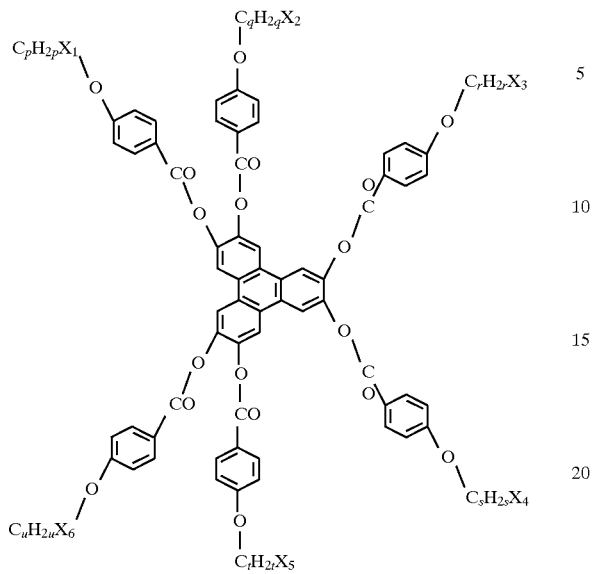
wherein p, q, r, s, t and u are each an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.
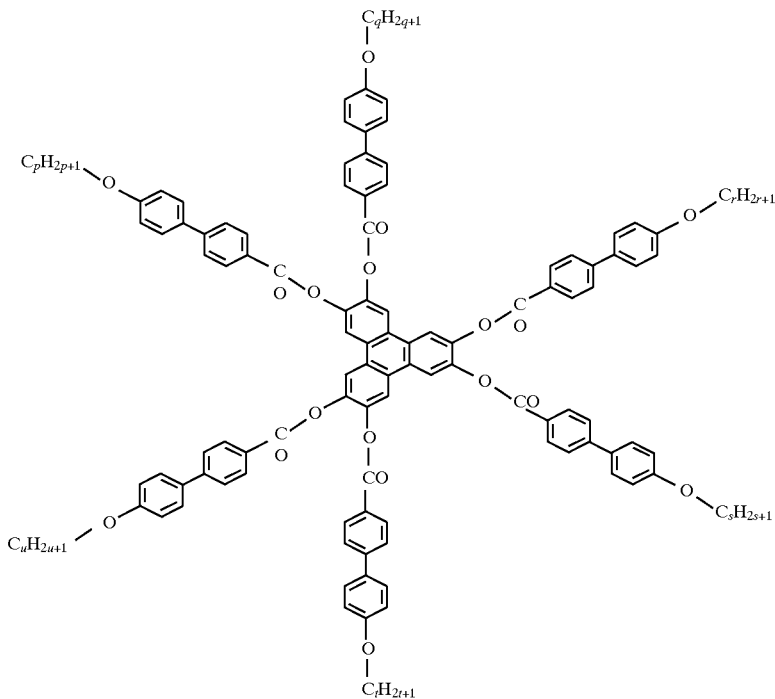
wherein p, q, r, s, t and u are each an integer of 1–18, preferably 3–14.

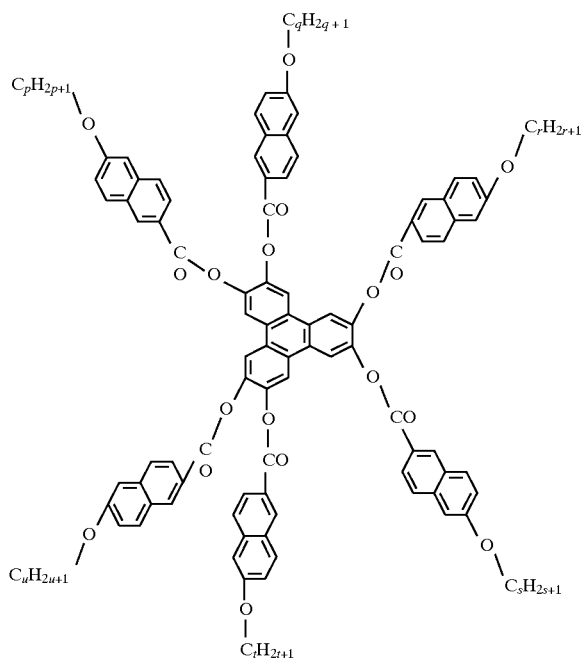
wherein p, q, r, s, t and u are each an integer of 1–18, preferably 3–14.
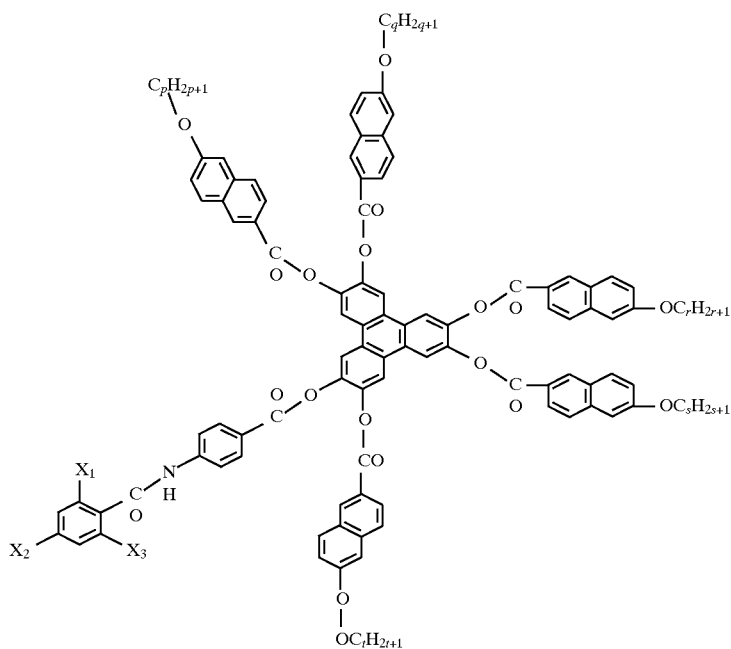
wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

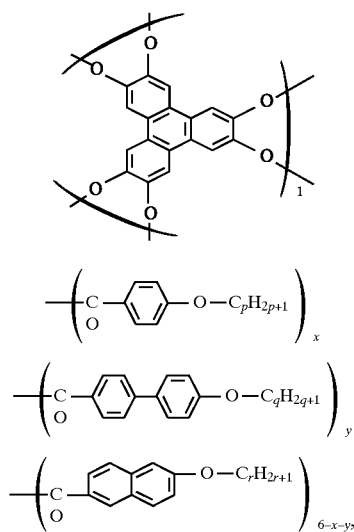

wherein $0 \leq x \leq 6$, $0 \leq y \leq 6$ in the molar ratio, and p, q, r are each an integer of 1–18, preferably 3–14.

Composition of the following:

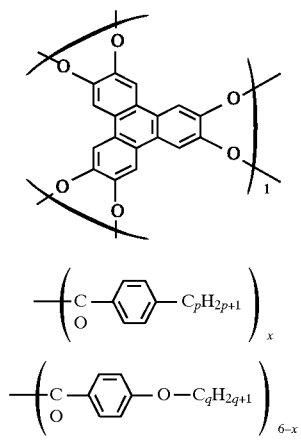

wherein $0 \leq x \leq 6$ in the molar ratio, and p, q are each an integer of 1–18, preferably 3–14.

Composition of the following:

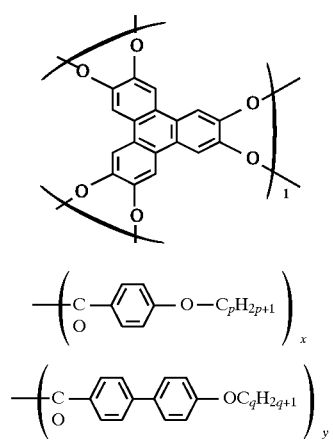

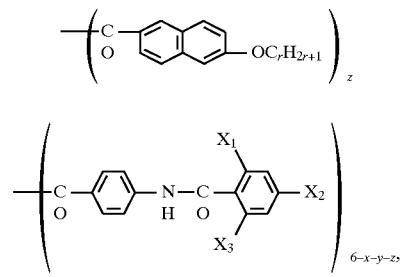

wherein $0 \leq x \leq 6$, $0 \leq y \leq 6$, $0 \leq z \leq 6$ in the molar ratio, p, q, and r are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

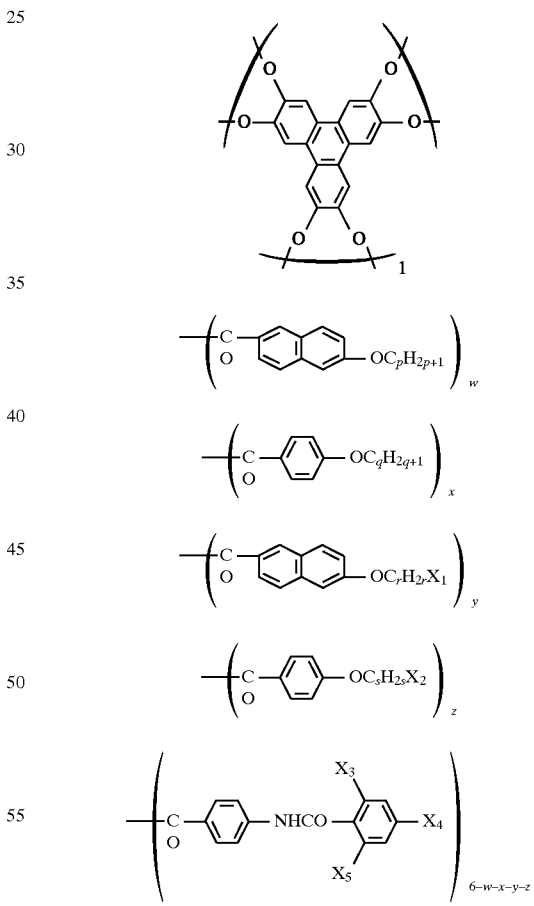

wherein $0 \leq w \leq 6$, $0 \leq x \leq 6$, $0 \leq y \leq 6$, $0 \leq z \leq 6$ in the molar ratio, p, q, r and s are each an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

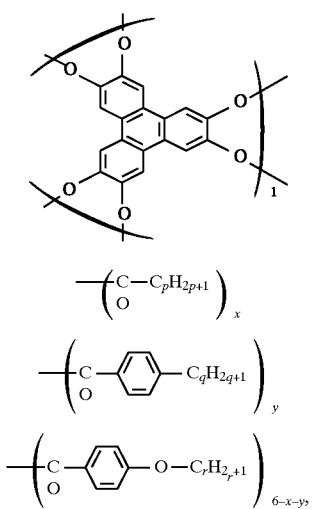

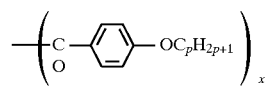

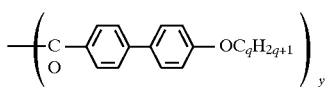

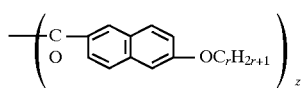

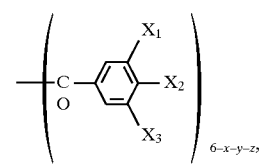

wherein $0 \leq x \leq 6$, $0 \leq y \leq 6$ in the molar ratio, p, q and r are each an integer of 1–18, preferably 3–14.

Composition of the following:

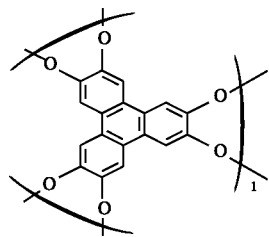

wherein $0 \leq x \leq 6$, $0 \leq y \leq 6$, $0 \leq z \leq 6$ in the molar ratio, p, q and r are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

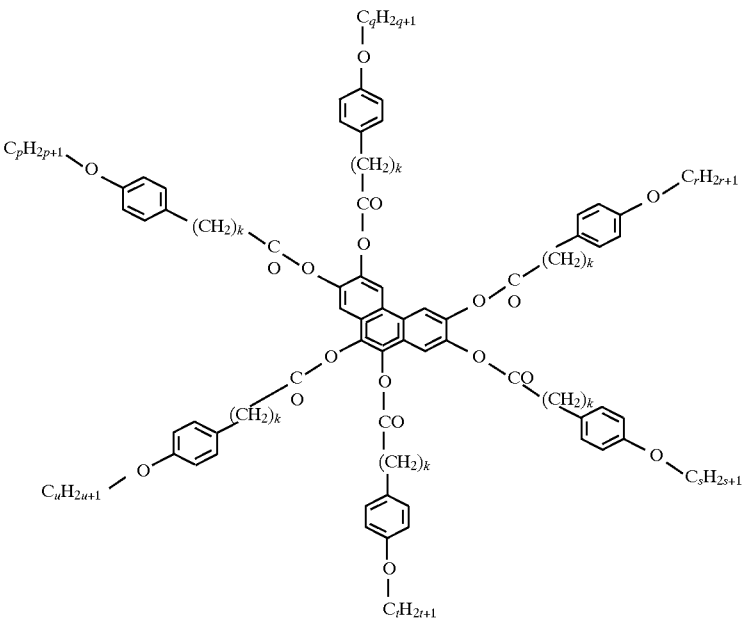

wherein p, q, r, s, t, u, v and w are each an integer of 1–18, preferably 5–14, and k is 1, 2 or 3.
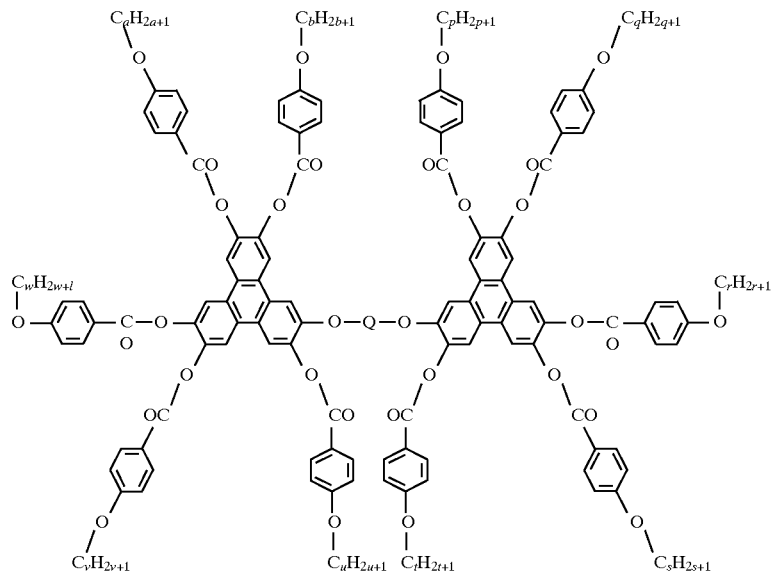
wherein p, q, r, s, t, u, v, w, a and b are each an integer of 1–18, preferably 3–14, and Q is the following:
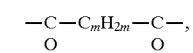
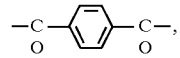
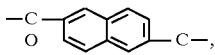
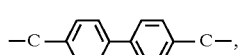
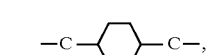
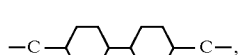
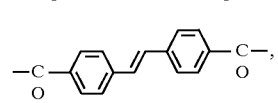
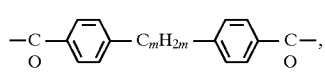
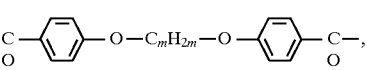
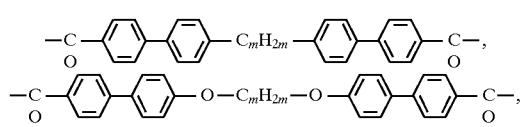
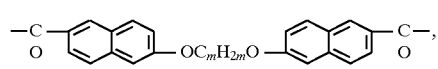
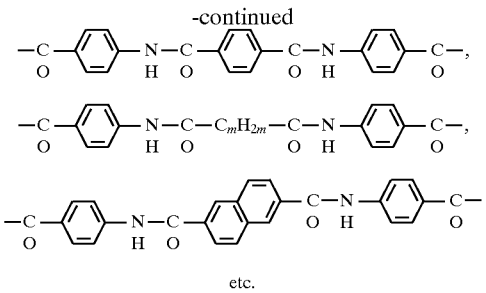
etc.
wherein m is an integer of 2–16.
Preferable Q:
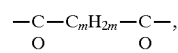
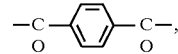
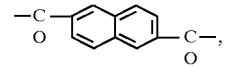
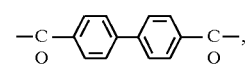
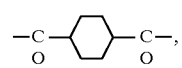
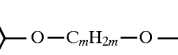
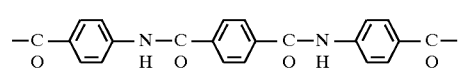
etc.
wherein m is an integer of 2–18, more preferably 4–12.

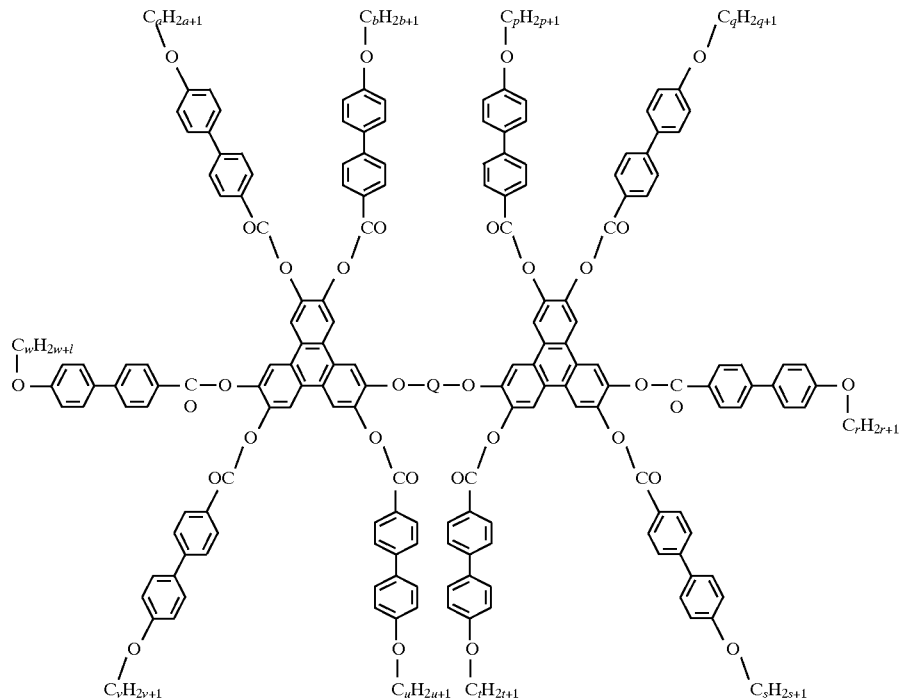
wherein p, q, r, s, t, u, v, w, a and b are each an integer of 1–18, preferably 3–14.
Q is the following:
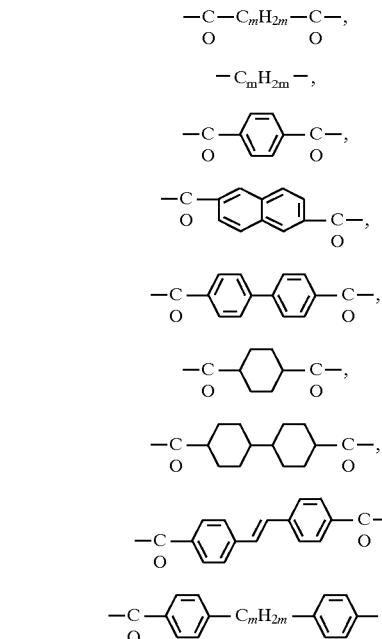
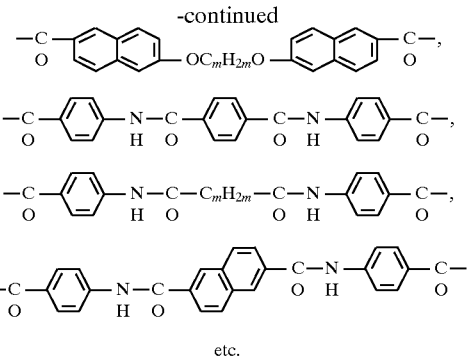
wherein m is an integer of 2–16.
Preferable Q:
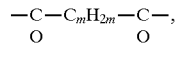
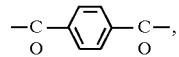
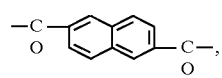
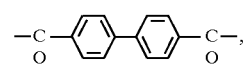
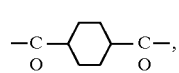

-continued
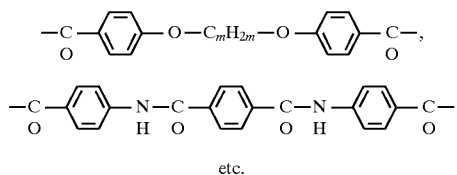
etc.
wherein m is an integer of 2–16, more preferably 4–12.
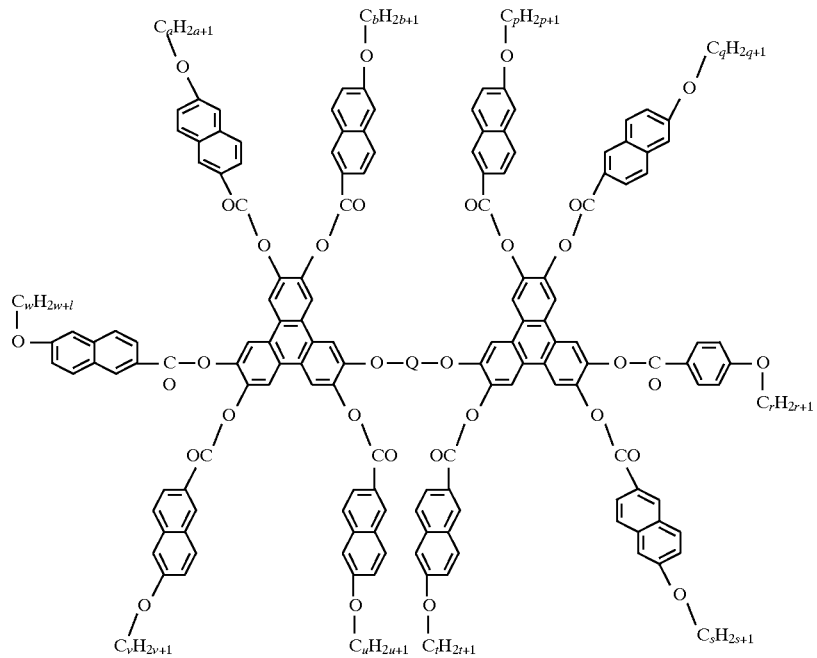
wherein p, q, r, s, t, u, v, w, a and b are each an integer of 1–18, preferably 3–14.
Q is the following:
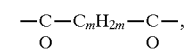
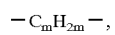
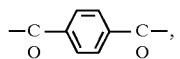
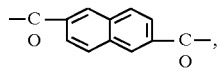
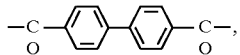
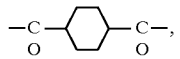
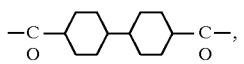
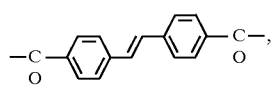
-continued
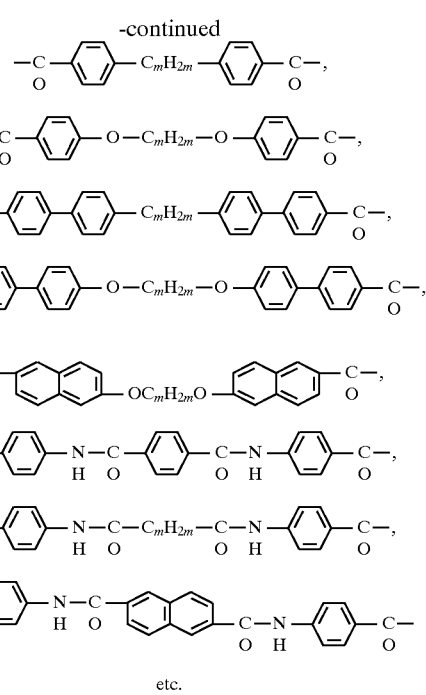
etc.
wherein m is an integer of 2–16.

Preferable Q:

−C−C$_m$H$_{2m}$−C−,
 ‖        ‖
 O        O

−C−C$_6$H$_4$−C−,
 ‖        ‖
 O        O

−C−(naphthalene)−C−,
 ‖              ‖
 O              O

−C−C$_6$H$_4$−C$_6$H$_4$−C−,
 ‖                    ‖
 O                    O

−C−(cyclohexyl)−C−,
 ‖             ‖
 O             O

−C−C$_6$H$_4$−O−C$_m$H$_{2m}$−O−C$_6$H$_4$−C−,
 ‖                                  ‖
 O                                  O

−C−C$_6$H$_4$−N−C−C$_6$H$_4$−C−N−C$_6$H$_4$−C−
 ‖         |  ‖        ‖  |          ‖
 O         H  O        O  H          O etc.

−C−C$_m$H$_{2m}$−C−,
 ‖            ‖
 O            O

−C$_m$H$_{2m}$−,

−C−C$_6$H$_4$−C−,
 ‖        ‖
 O        O

−C−(naphthalene)−C−,
 ‖              ‖
 O              O

−C−C$_6$H$_4$−C$_6$H$_4$−C−,
 ‖                    ‖
 O                    O

−C−(cyclohexyl)−C−,
 ‖             ‖
 O             O

−C−(bicyclohexyl)−C−,
 ‖               ‖
 O               O

−C−C$_6$H$_4$−CH=CH−C$_6$H$_4$−C−,
 ‖                           ‖
 O                           O

−C−C$_6$H$_4$−C$_m$H$_{2m}$−C$_6$H$_4$−C−,
 ‖                                ‖
 O                                O

−C−C$_6$H$_4$−O−C$_m$H$_{2m}$−O−C$_6$H$_4$−C−,
 ‖                                  ‖
 O                                  O wherein m is an integer of 2–16, preferably 4–12.

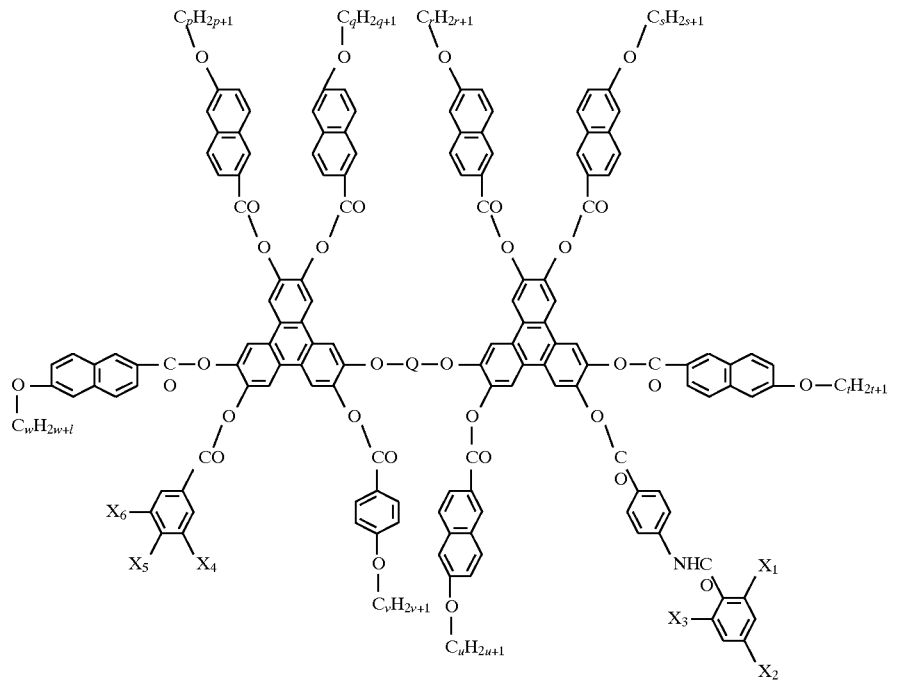

wherein p, q, r, s, t, u, v and w are each an integer of 1–18, preferably 3–14 X$_1$–X$_6$ are each independently H—, F—, Cl—, Br—, C$_l$H$_{2l+1}$, C$_l$H$_{2l+1}$O—, C$_6$H$_5$—, C$_6$H$_5$CO— or C$_6$H$_5$O—, where C$_l$H$_{2l+1}$ is a linear or branched alkyl group, and l is an integer of 1–18, preferably 1–10.

-continued
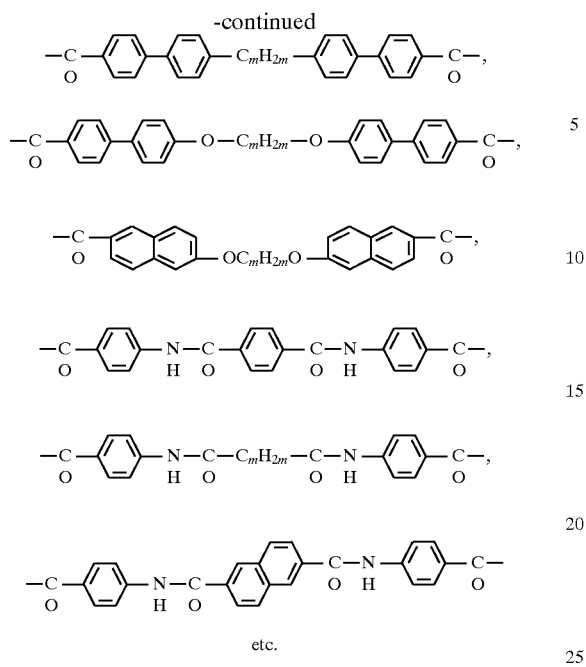
wherein m is an integer of 2–16.
-continued
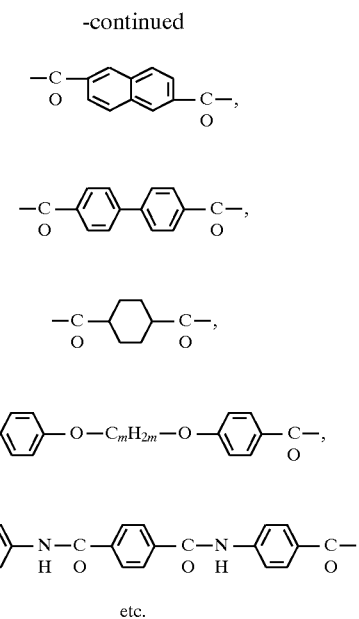
wherein m is an integer of 2–16, preferably 4–12.
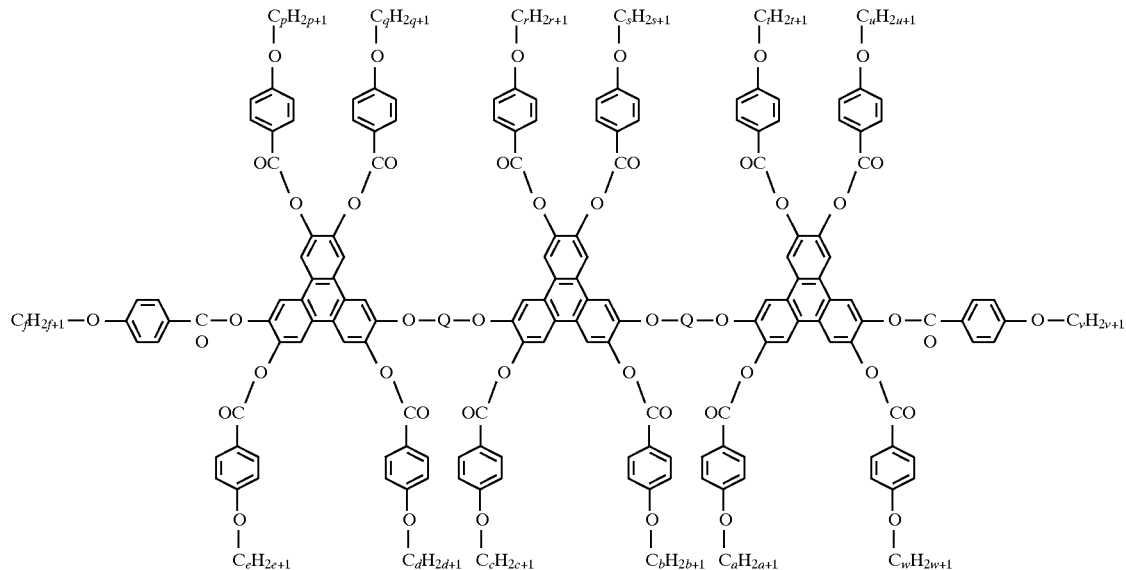
wherein p, q, r, s, t, u, v, w, a, b, c, d, e and f are each an integer of 1–18, preferably 3–14.
Q is the following:
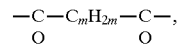
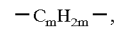
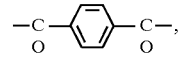
Preferable Q:
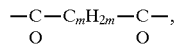
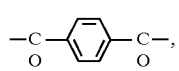

-continued
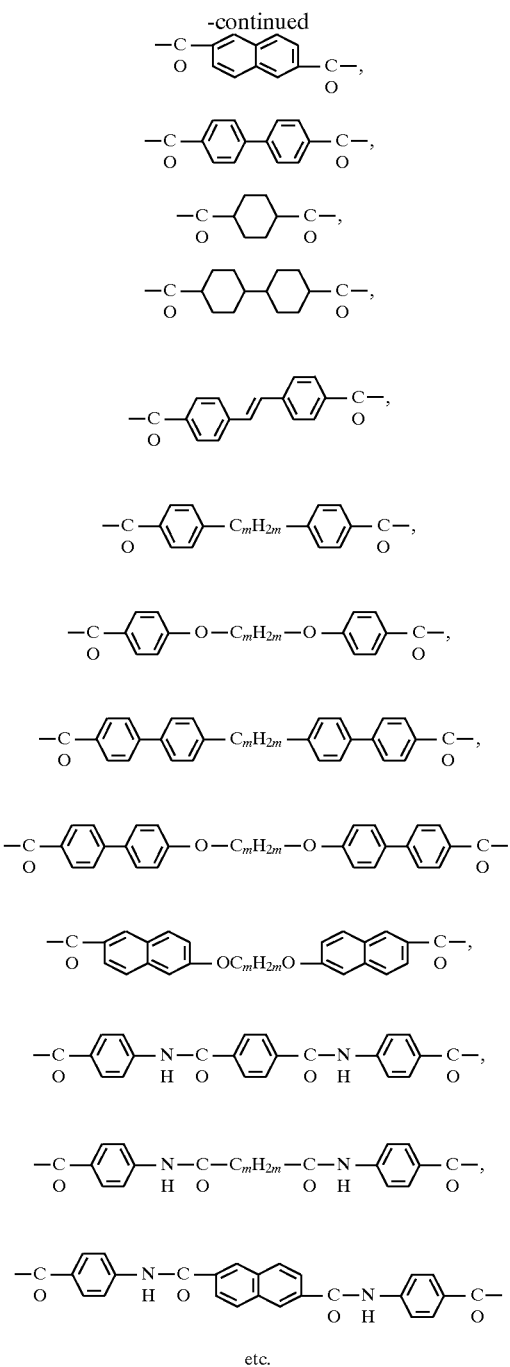
etc.
wherein m is an integer of 2–16.
Preferable Q:
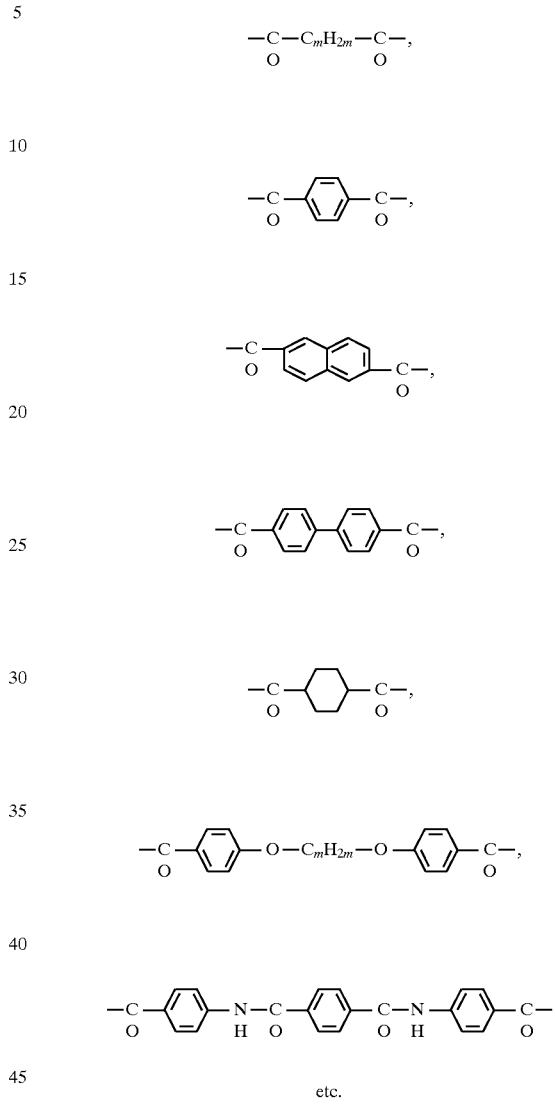
etc.
wherein m is an integer of 2–16, preferably 4–12.

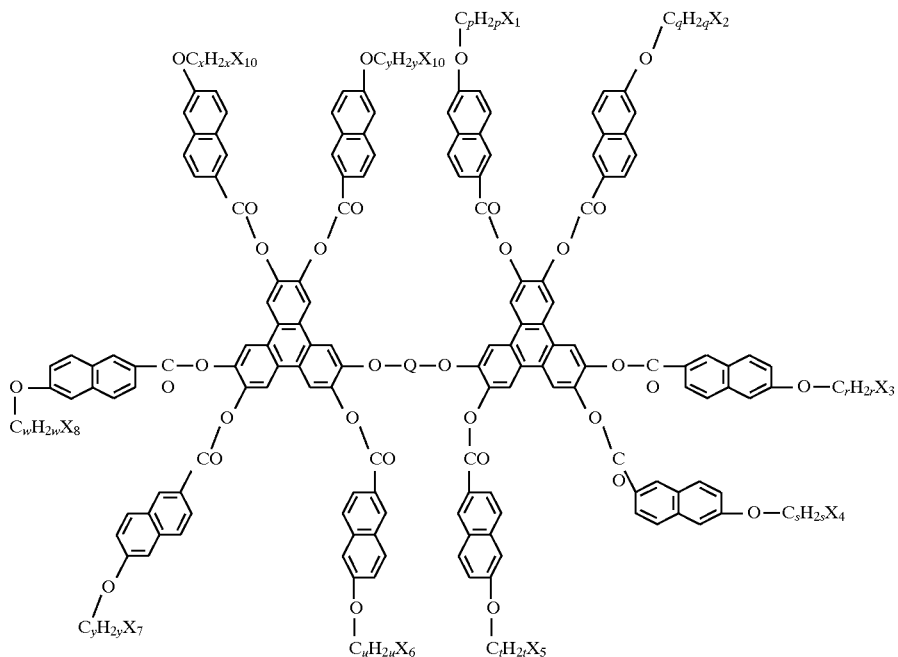
wherein p, q, r, s, t, u, v, w, x and y are each an integer of 1–18, preferably 3–14, $X_1$–$X_{10}$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.
Q is the following:
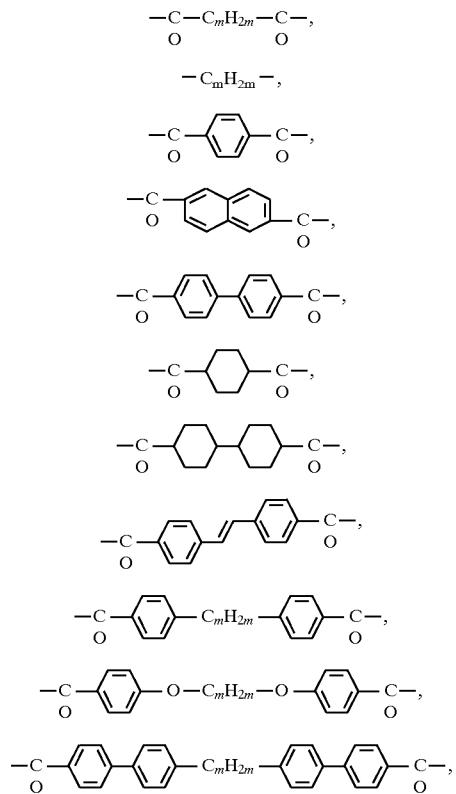
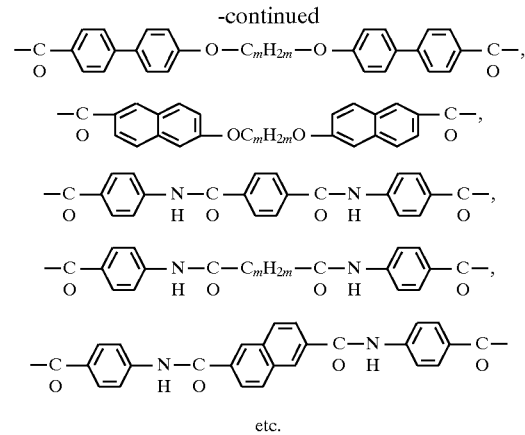
etc.
wherein m is an integer of 2–16.
Preferable Q:
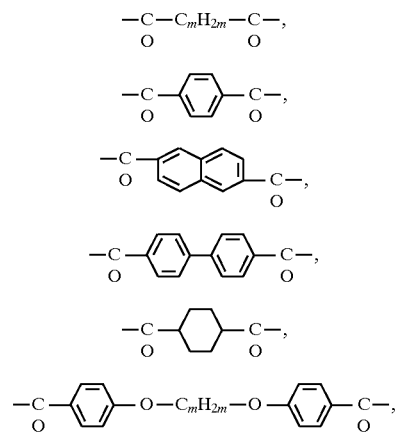

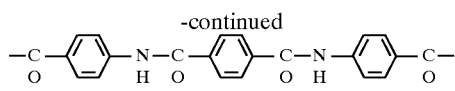
etc.
wherein m is an integer of 2–16, preferably 4–12.
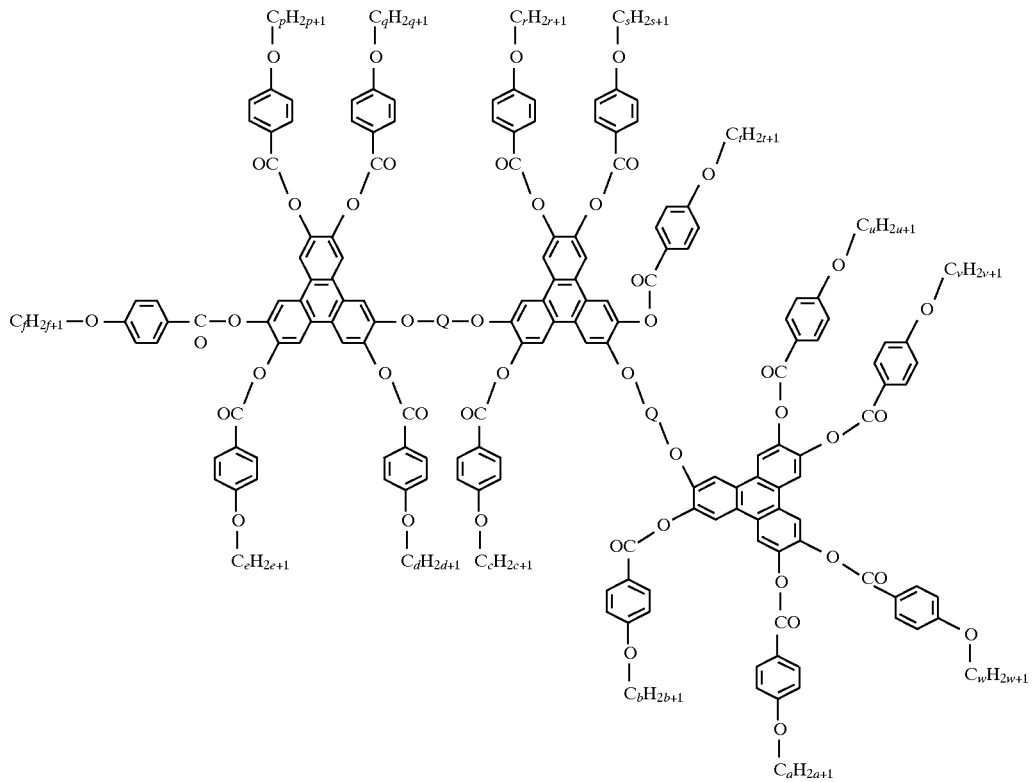
wherein p, q, r, s, t, u, v, w, a, b, c, d, e and f are each an integer of 1–18, preferably 3–14.
Q is the following:
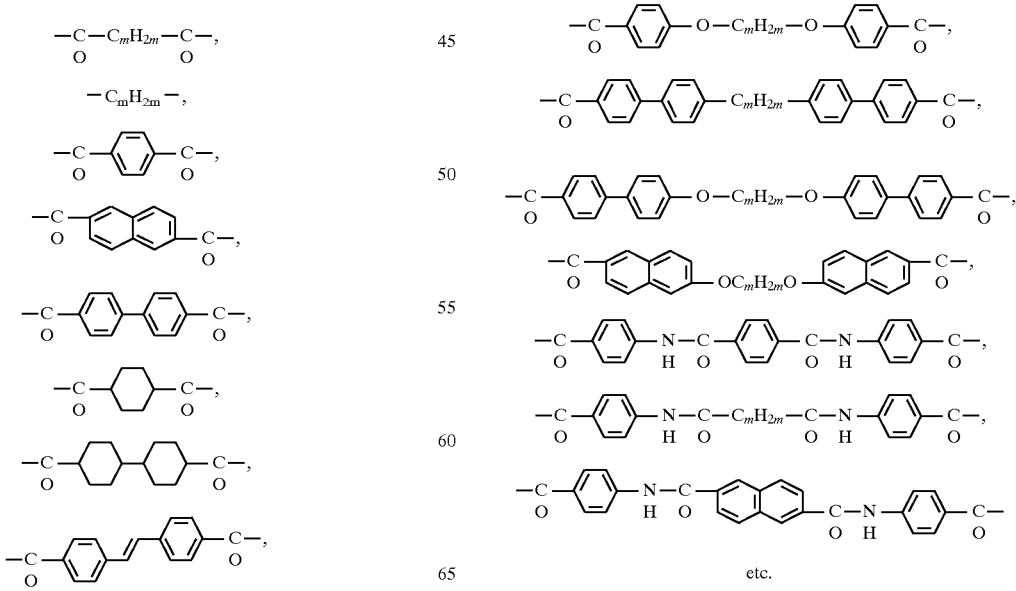
etc.
wherein m is an integer of 2–16.

Preferable Q:
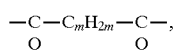
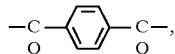
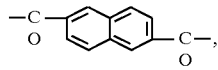
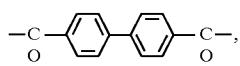
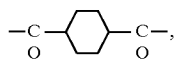
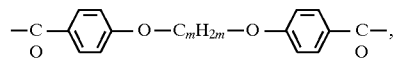
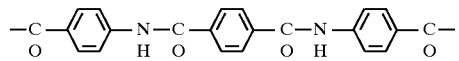
etc.
wherein m is an integer of 2–16, preferably 4–12.
Polymer represented by the following:
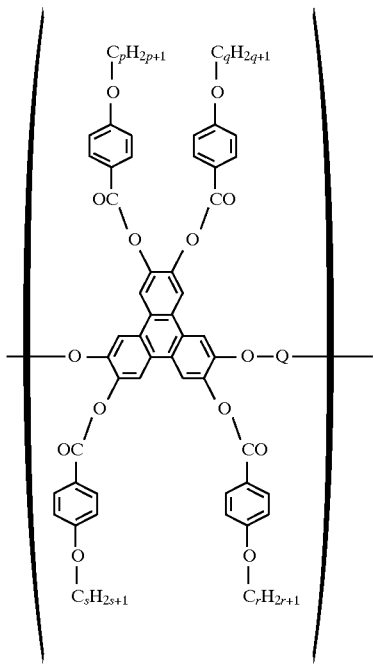
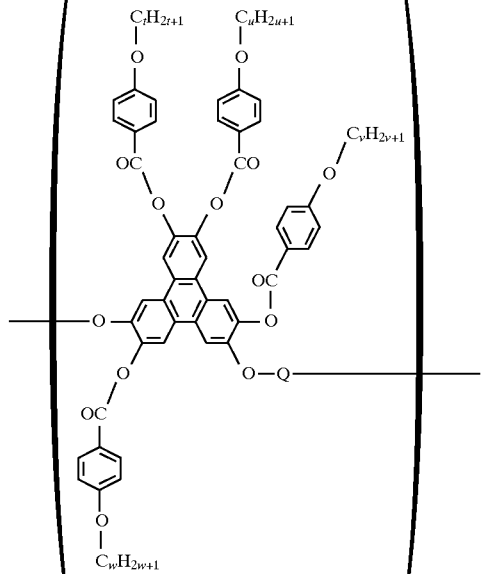
wherein p, q, r, s, t, U, V and w are each an integer of 1–18, preferably 3–14, and the average molecular weight is 5,000–100,000.
Q is the following:
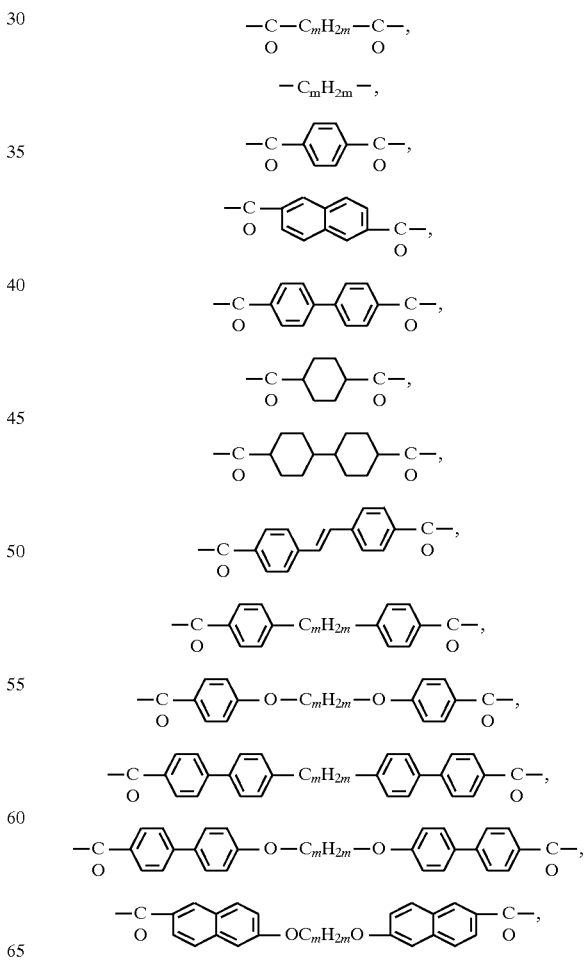

-continued
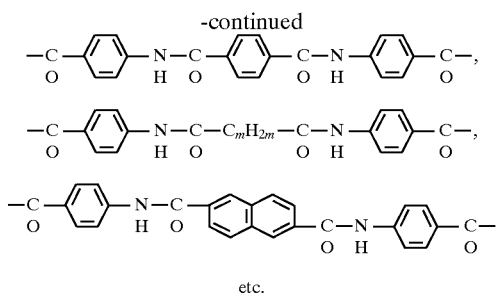
etc.
wherein m is an integer of 2–16.
Preferable Q:
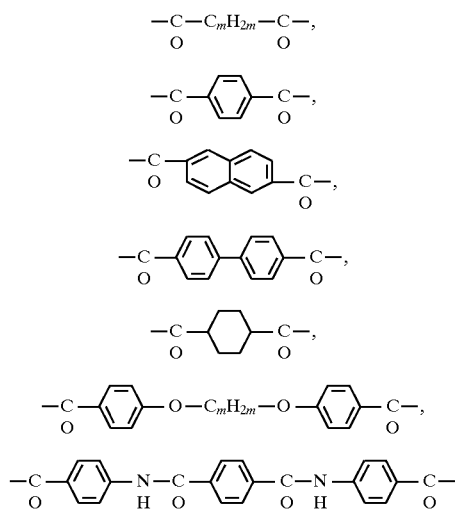
etc.
wherein m is an integer of 2–16, preferably 4–12.
[Structural formula 6]
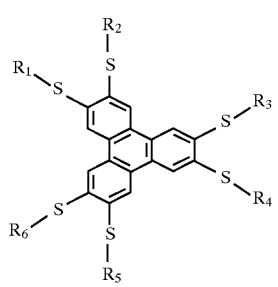
wherein $R_1$–$R_6$ are each a monofunctional or bifunctional substituent group selected from the following:
Mono functional substituent groups:
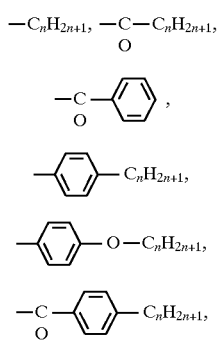
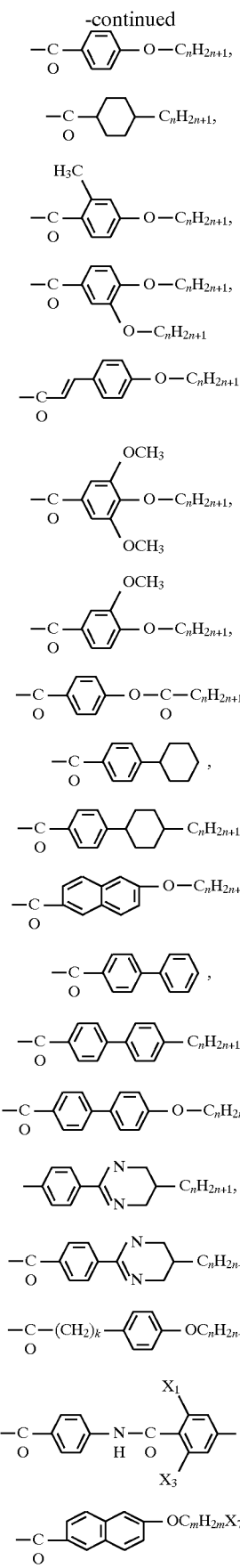

-continued

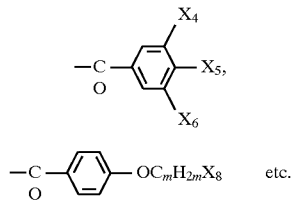

wherein $C_nH_{2n+1}$ is a linear or branched alkyl group, n is an integer of 1–18, preferably 3–14, $X_1$–$X_8$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, l is an integer of 1–18, preferably 1–10, $C_mH_{2m}$ is a linear or branched alkylene chain, and m is an integer of 1–18, preferably 2–10.

Bifunctional substituent groups:

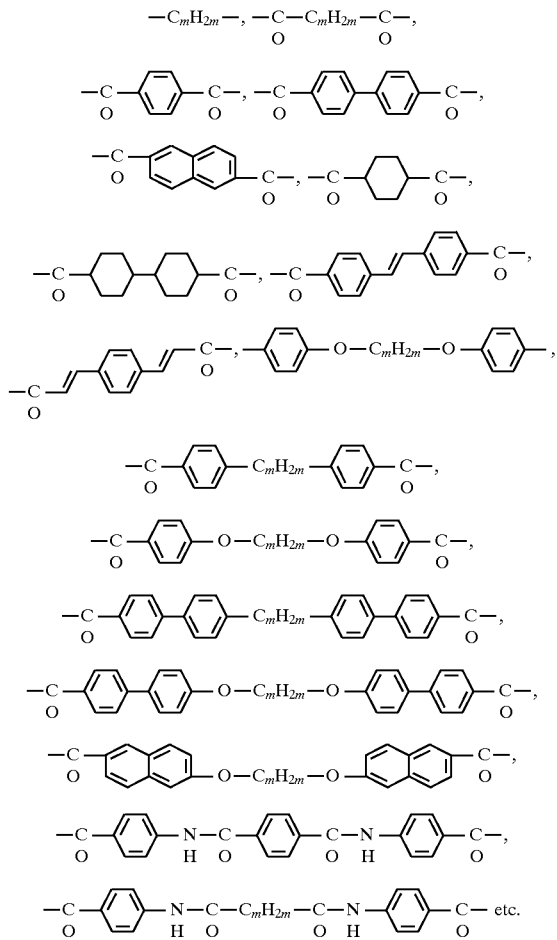

wherein $C_mH_{2m}$ is a linear or branched alkylene group, and m is an integer of 2–16, preferably 4–12.

Examples of the concrete structures:

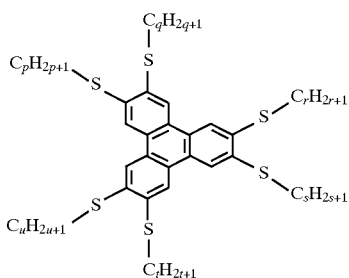

wherein p, q, r, s, t and u are each an integer of 1–18, preferably 3–14.

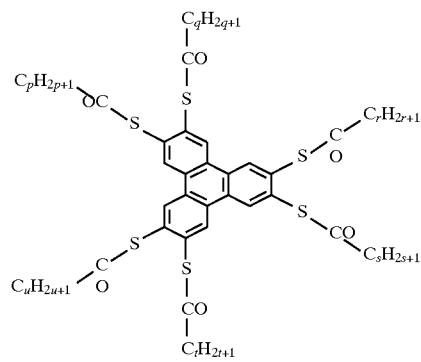

wherein p, q, r, s, t and u are each an integer of 1–18, preferably 3–14.

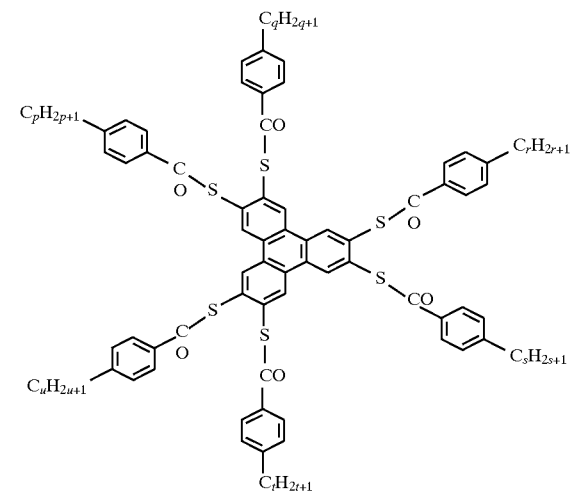

wherein p, q, r, s, t and u are each an integer of 1–18, preferably 3–14.

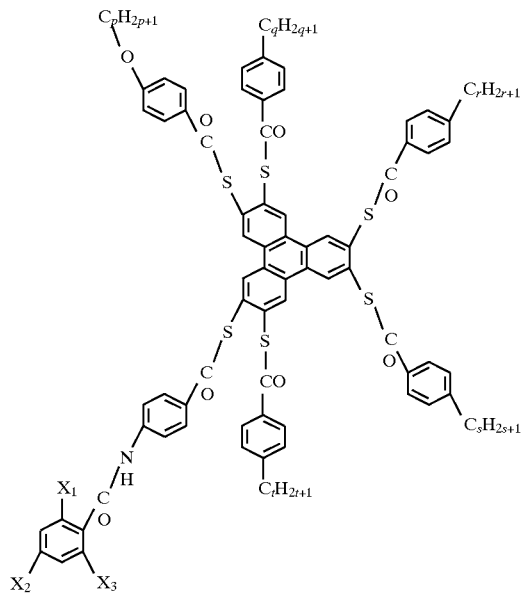

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

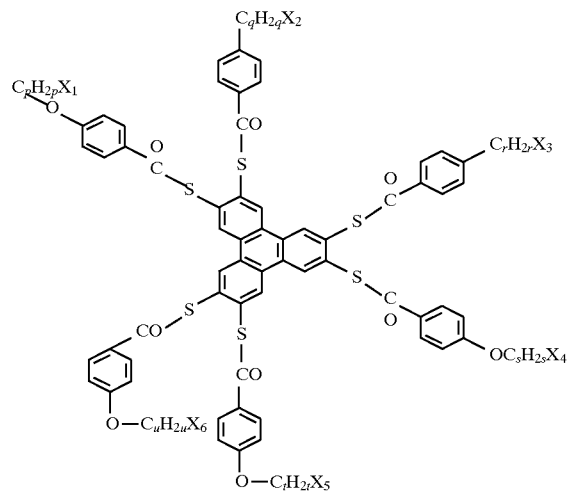

wherein p, q, r, s, t and u are each an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

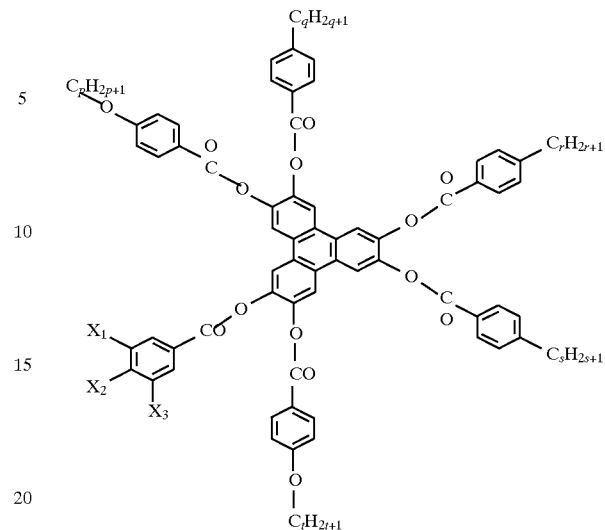

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

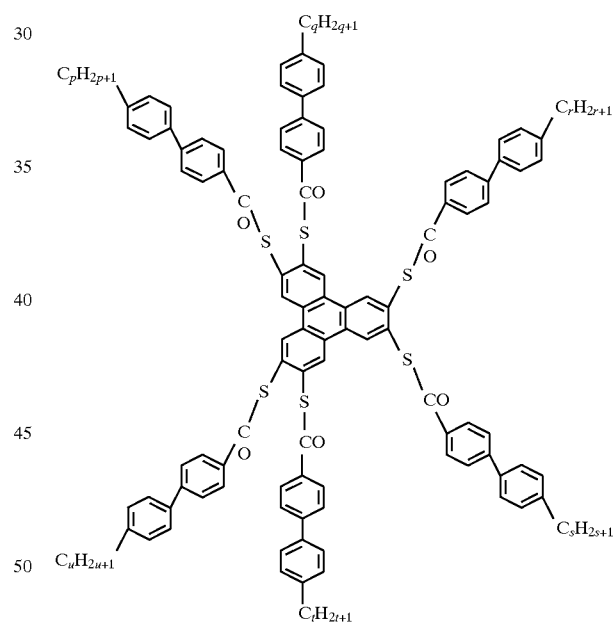

wherein p, q, r, s, t and u are each an integer of 1–18, preferably 3–14.

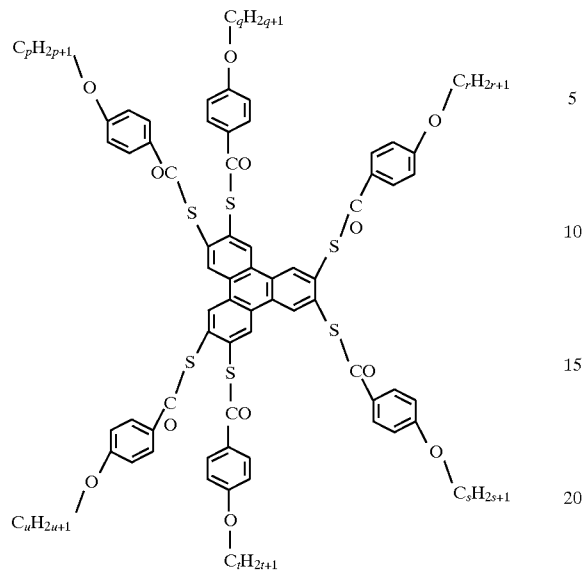
wherein p, q, r, s, t and u are each an integer of 1–18, preferably 3–14.
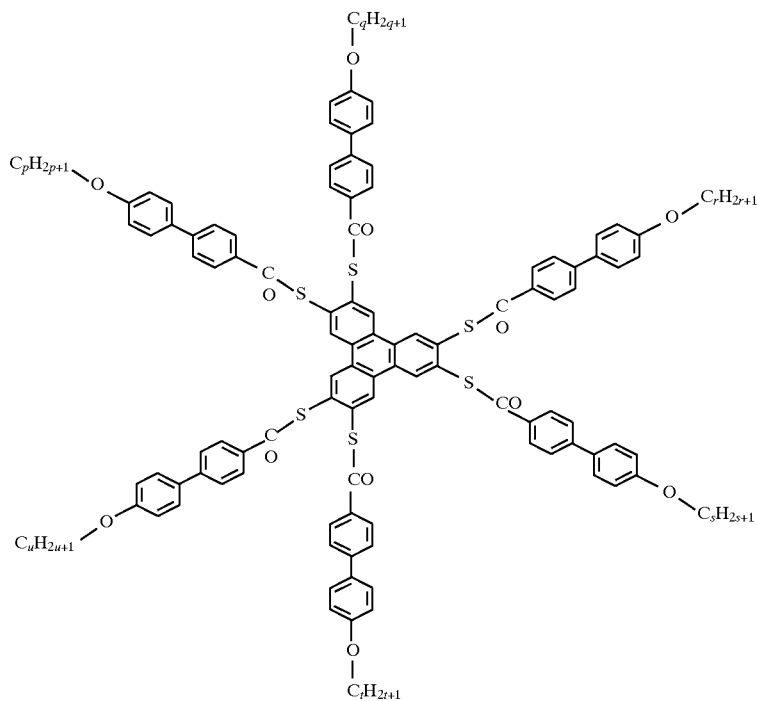
wherein p, q, r, s, t and u are each an integer of 1–18, preferably 3–14.

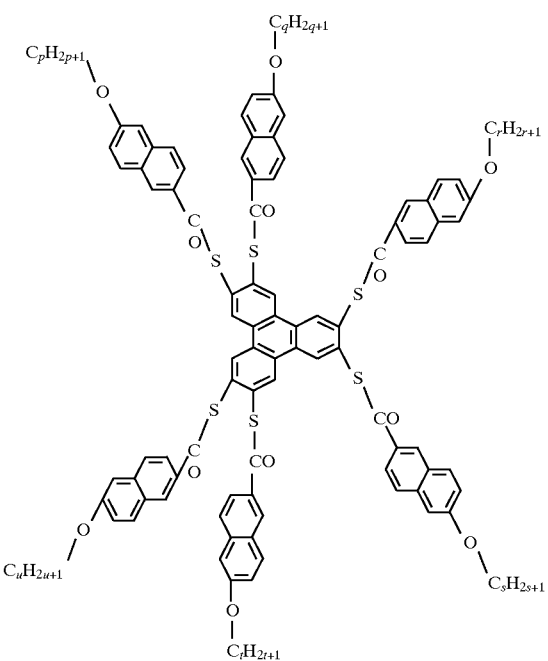

wherein p, q, r, s, t and u are each an integer of 1–18, preferably 3–14.

Composition of the following:

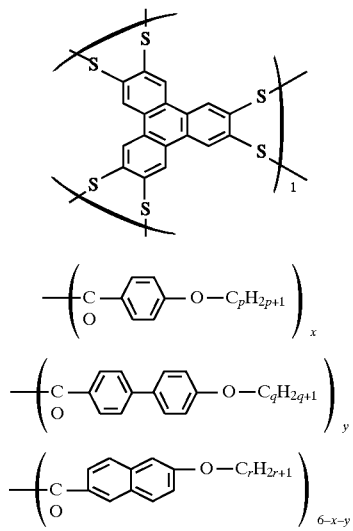

wherein $0 \leq x \leq 6$, $0 \leq y \leq 6$ in the molar ratio, and p, q and r are each an integer of 1–18, preferably 3–14.

Composition of the following:

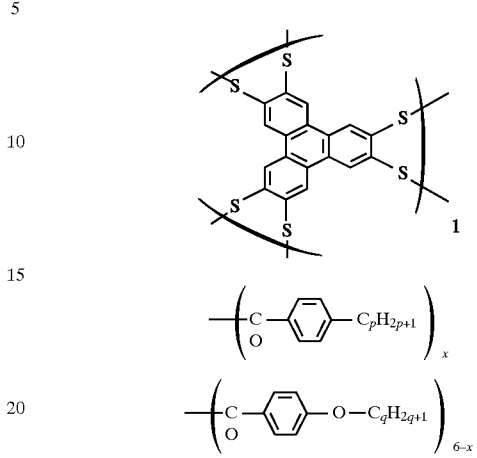

wherein $0 \leq x \leq 6$ in the molar ratio, and p and q are each an integer of 1–18, preferably 3–14.

Composition of the following:

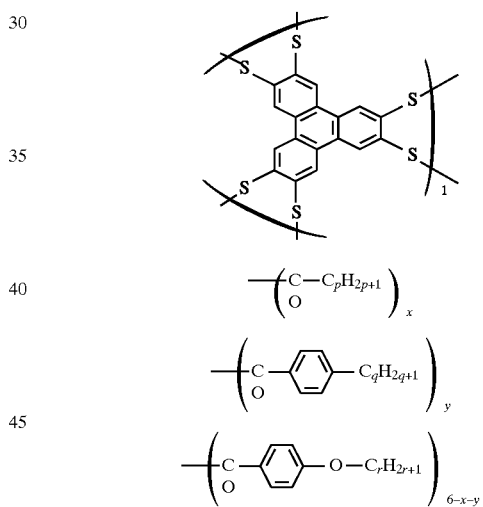

wherein $0 \leq x \leq 6$, $0 \leq y \leq 6$ in the molar ratio, and p, q and r are each an integer of 1–18, preferably 3–14.

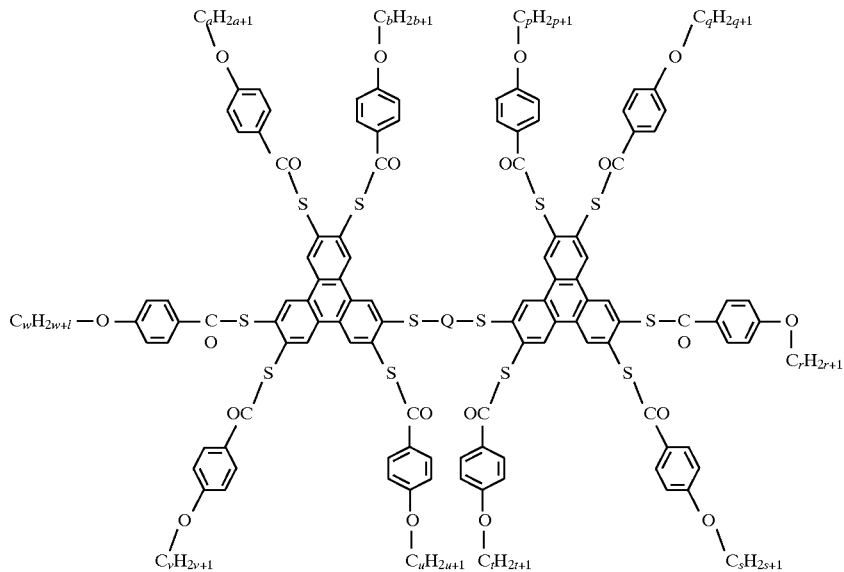
wherein p, q, r, s, t, u, v, w, a and b are each an integer of 1–18, preferably 3–14.
Q is the following:
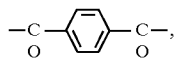
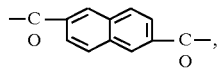
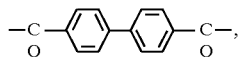
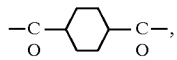
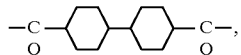
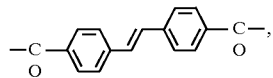
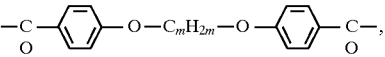
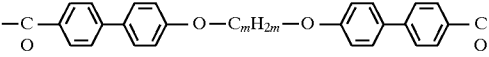
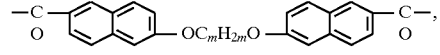
-continued
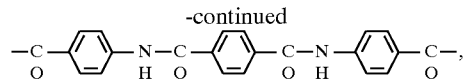
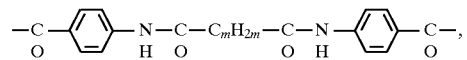
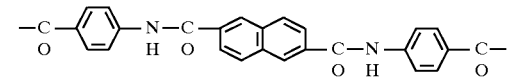
etc.
wherein m is an integer of 2–16.
Preferable Q:
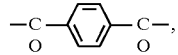
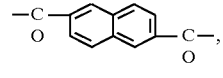
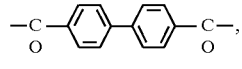
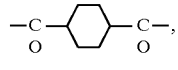
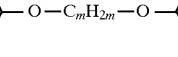
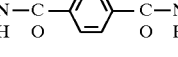
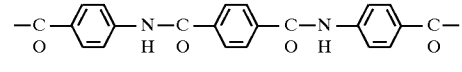
etc.
wherein m is an integer of 2–16, preferably 4–12.

Polymer represented by the following:
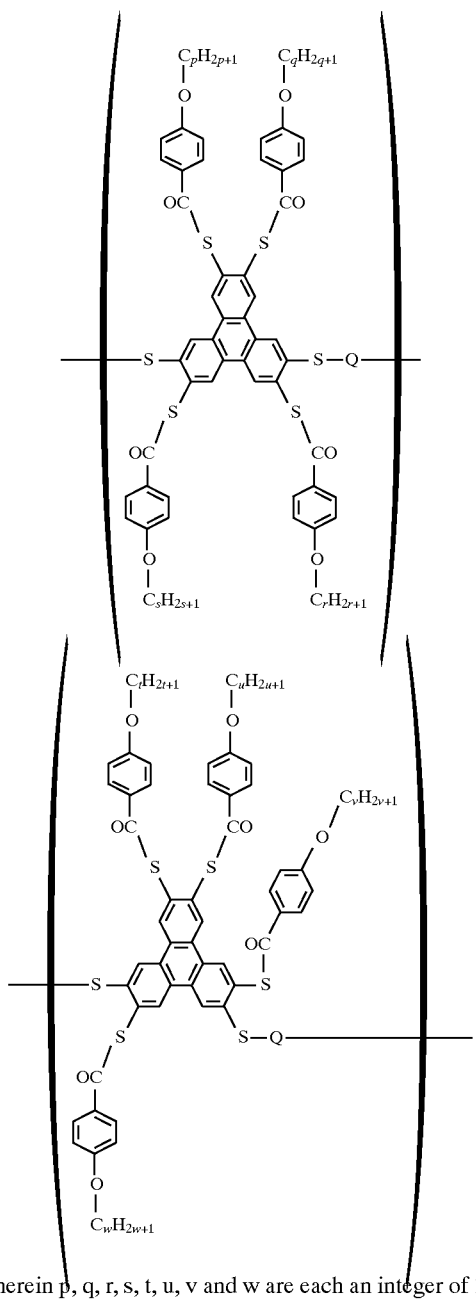
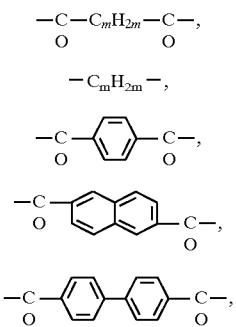
wherein p, q, r, s, t, u, v and w are each an integer of 1–18, preferably 3–14, and the average molecular weight is 5,000–100,000.
Q is the following:
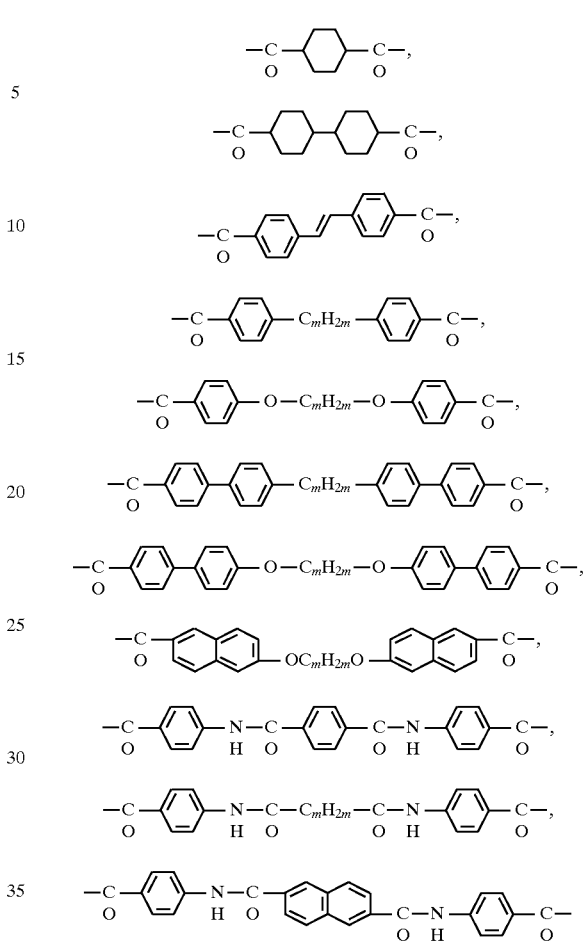
wherein m is an integer of 2–16.
Preferable Q:
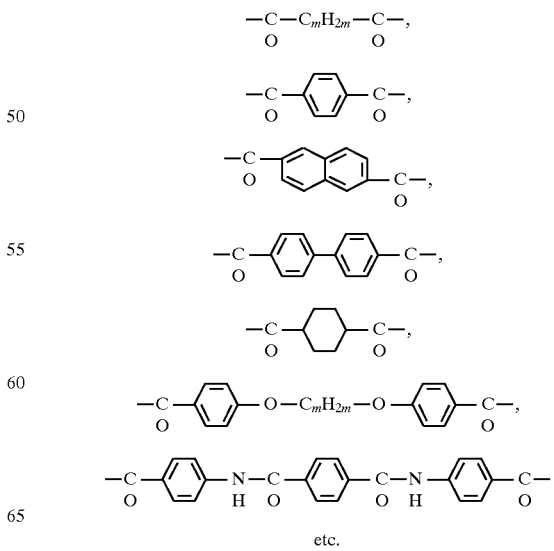
etc.

wherein m is an integer of 2–16, preferably 4–12.
[Structural formula 7]
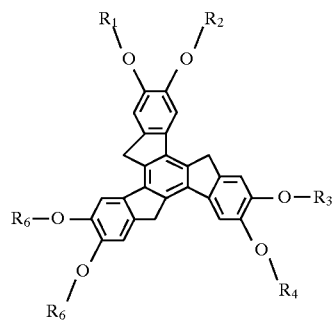
wherein $R_1$–$R_6$ are each a monofunctional or bifunctional substituent group selected from the following groups:
Mono functional substituent groups:
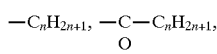
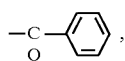
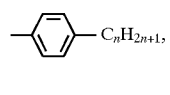
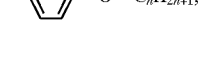
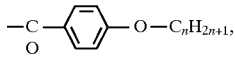
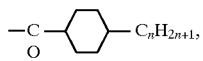
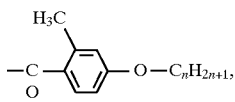
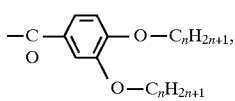
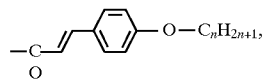
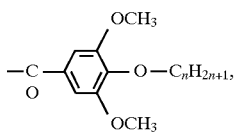
-continued
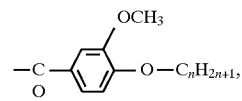
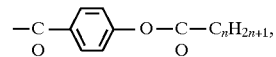
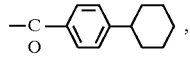
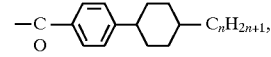
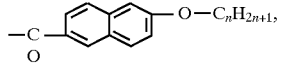
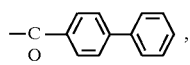
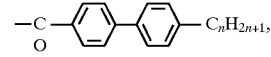
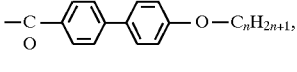
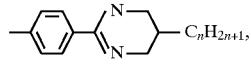
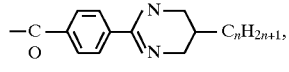
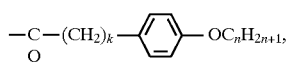
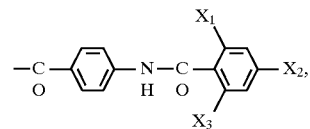
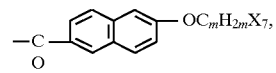
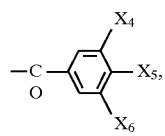

-continued

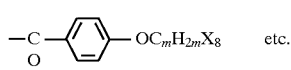 etc.

wherein $C_nH_{2n+1}$ is a linear or branched alkyl group, n is an integer of 1–18, preferably 3–14, $X_1$–$X_8$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10, $C_mH_{2m}$ is a linear or branched alkylene chain, and m is an integer of 1–16, preferably 2–10.

Bifunctional substituent groups:

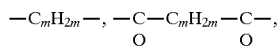
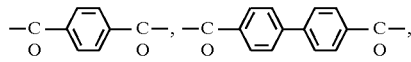
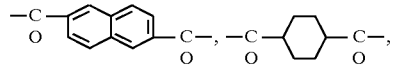
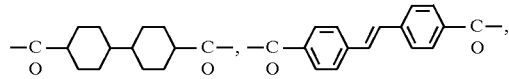
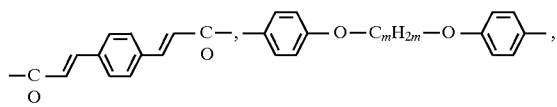
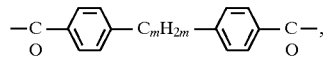
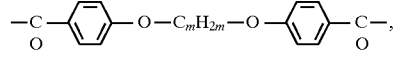
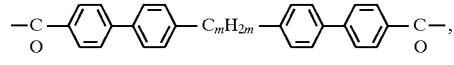
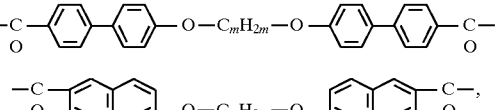
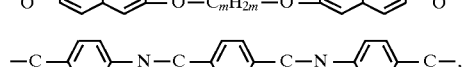

-continued

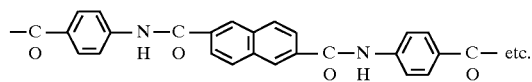

wherein $C_mH_{2m}$ is a linear or branched alkylene chain, and m is an integer of 2–16, preferably 4–12.

Examples of the concrete structures:

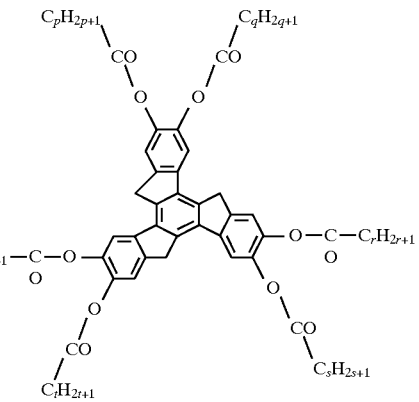

wherein p, q, r, s, t and u are each an integer of 1–18, preferably 3–14.

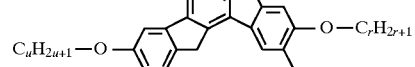

wherein p, q, r, s, t and u are each an integer of 1–18, preferably 3–14.

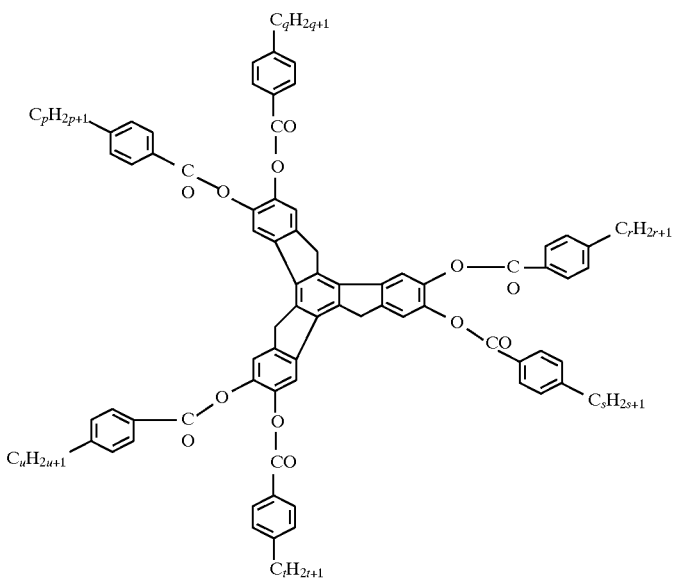

wherein p, q, r, s, t and u are each an integer of 1–18, preferably 3–14.

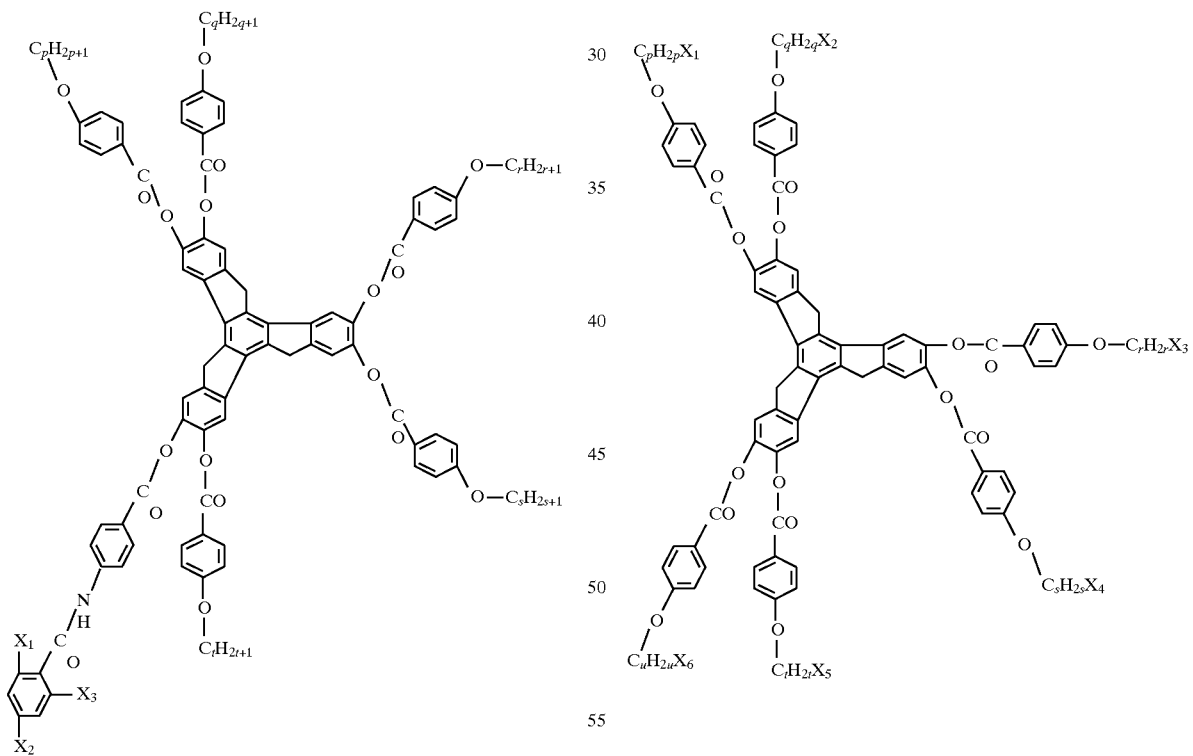

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

wherein p, q, r, s, t and u are each an integer of 1–18, prefetably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

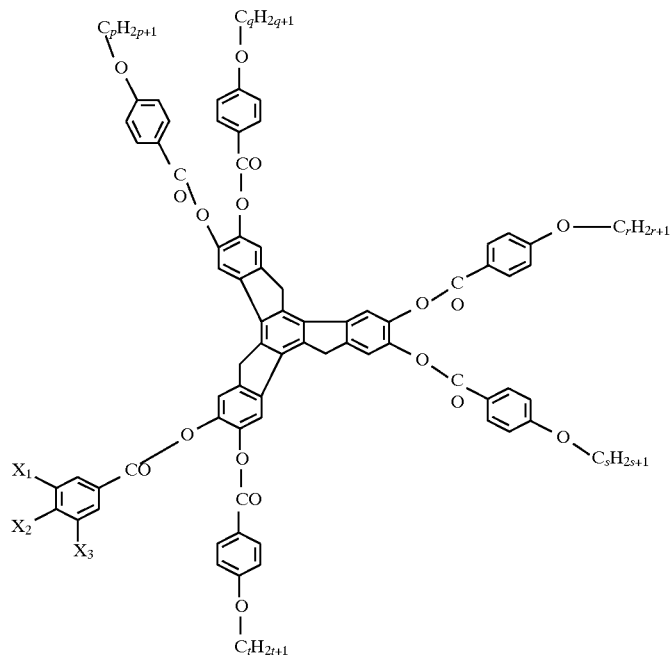
wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.
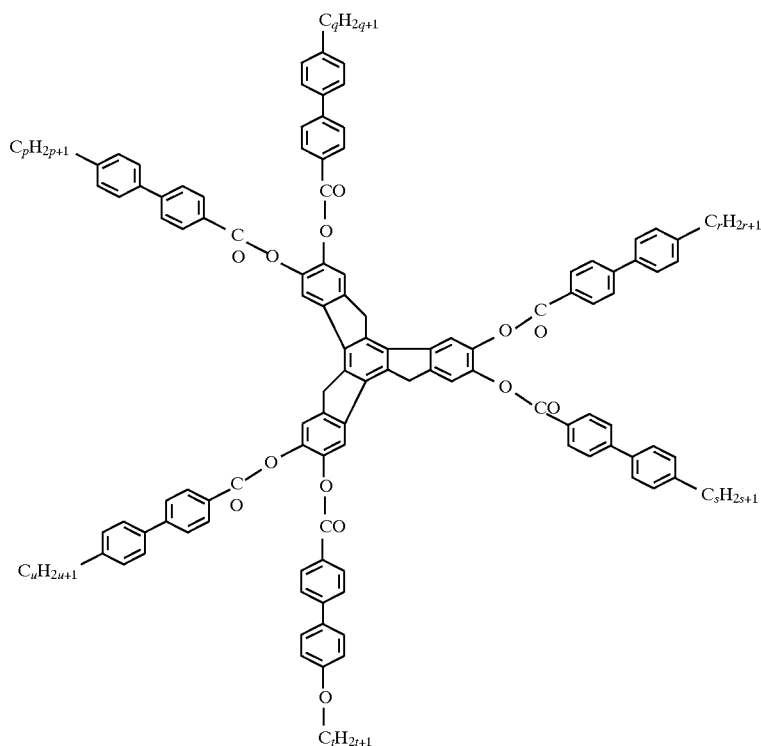
wherein p, q, r, s, t and u are each an integer of 1–18, preferably 3–14.

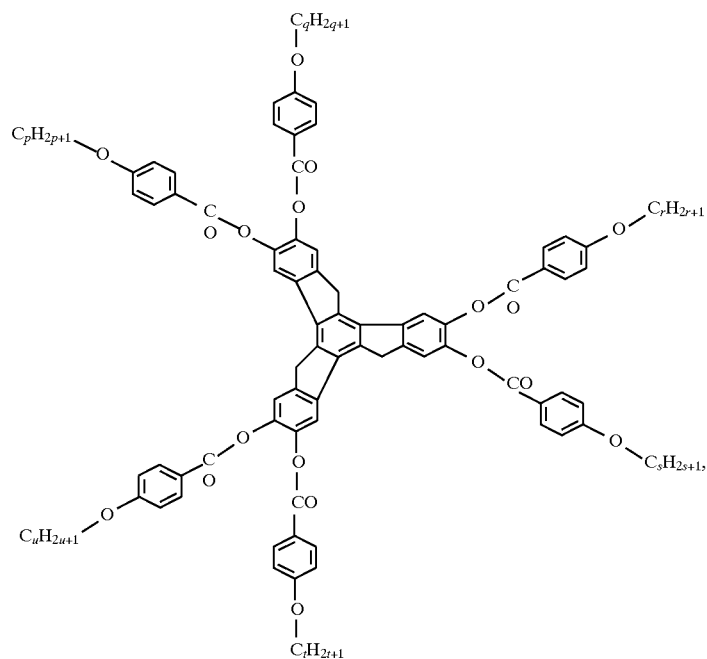
wherein p, q, r, s, t and u are each an integer of 1–18, preferably 3–14.
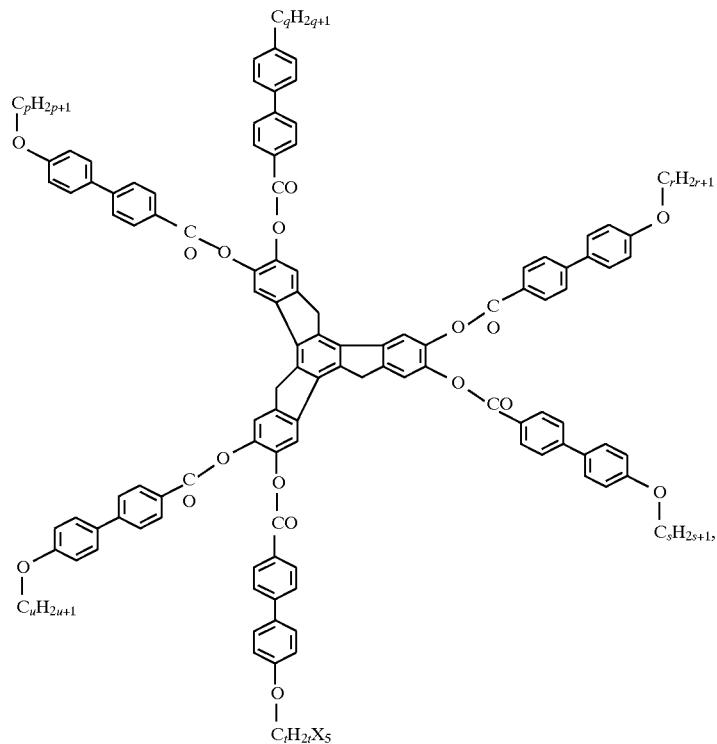
wherein p, q, r, s, t and u are each an integer of 1–18, preferably 3–14.

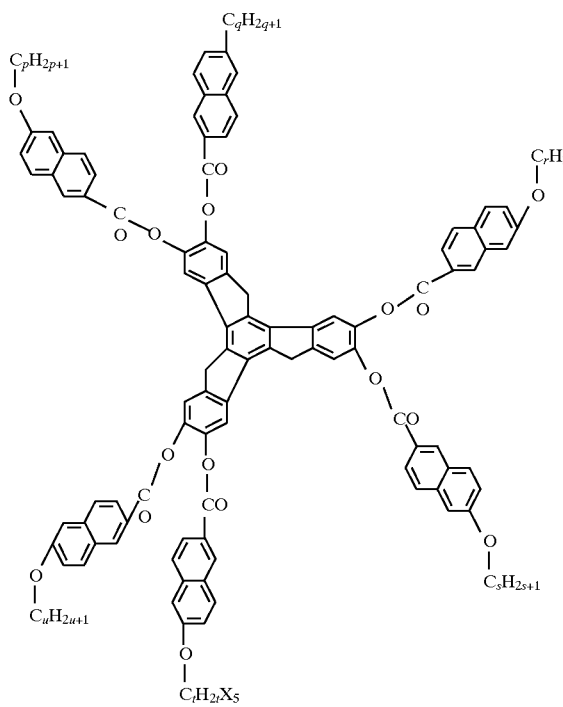

wherein p, q, r, s, t and u are each an integer of 1–18, preferably 3–14.

Composition of the following:

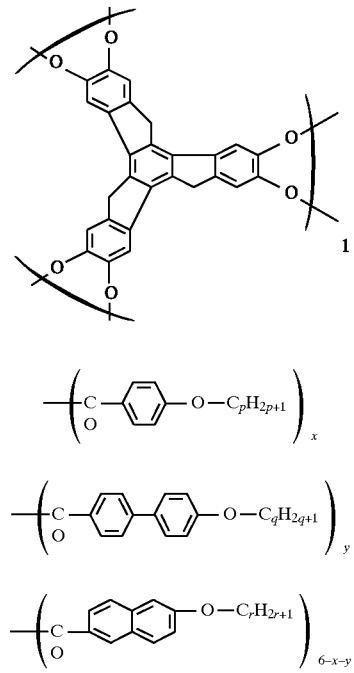

wherein $0 \leq x \leq 6$, $0 \leq y \leq 6$ in the molar ratio, and p, q and r are each an integer of 1–18, preferably 3–14.

Composition of the following:

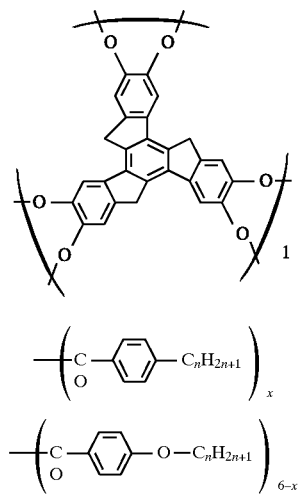

wherein $0 \leq x \leq 6$ in the molar ratio, and p, q and r are each an integer of 1–18, preferably 3–14.

Composition of the following:

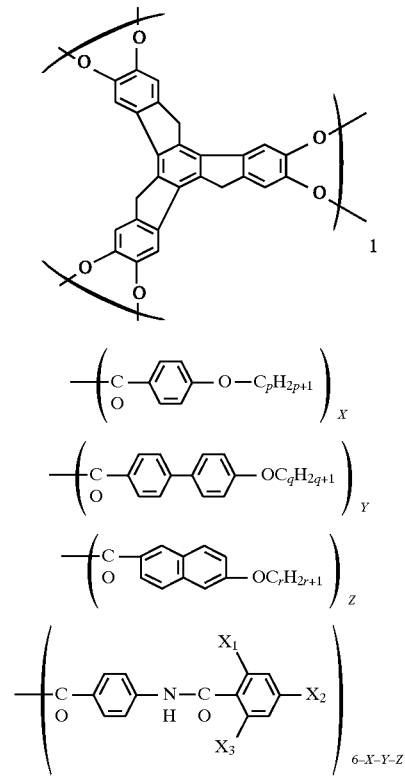

wherein $0 \leq x \leq 6$, $0 \leq y \leq 6$, $0 \leq z \leq 6$ in the molar ratio, and p, q and r are each an integer of 1–18, preferably 3–14, $X_1$–$X_3$ are each independently H—, F—, Cl—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

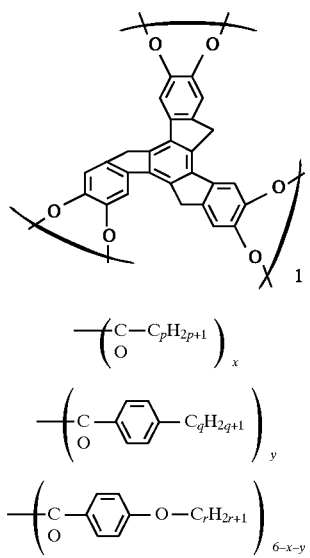

wherein $0 \leq x \leq 6$, $0 \leq y \leq 6$ in the molar ratio, and p, q and r are each an integer of 1–18, preferably 3–14.

Composition of the following:

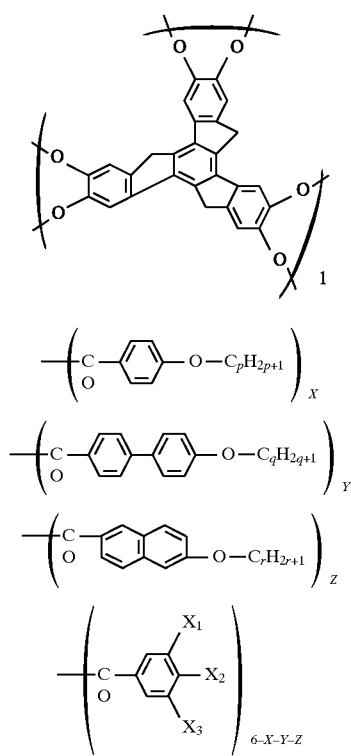

wherein $0 \leq x \leq 6$, $0 \leq y \leq 6$, $0 \leq z \leq 6$ in the molar ratio, and p, q and r are each an integer of 1–18, preferably 3–14, p, q and r are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

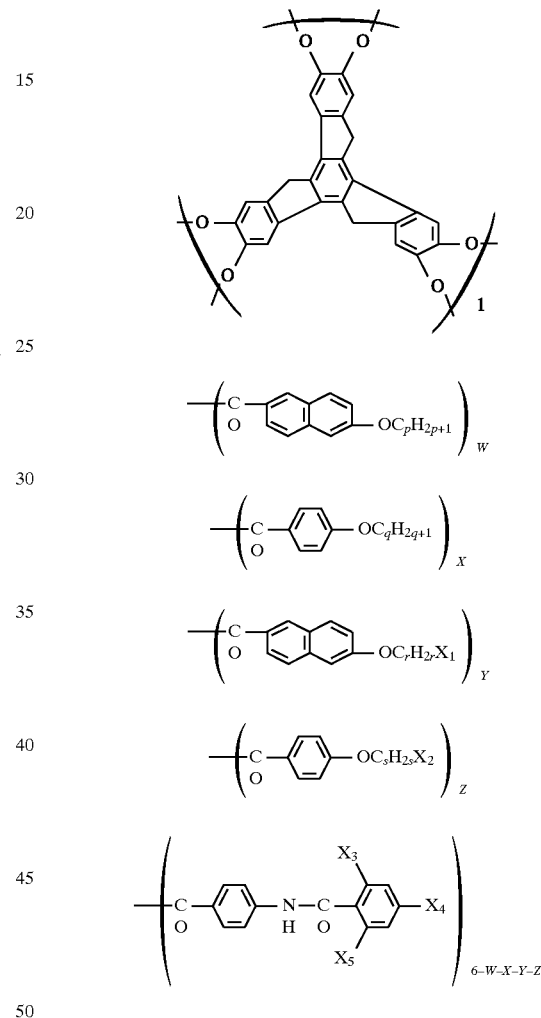

wherein $0 \leq x \leq 6$, $0 \leq y \leq 6$, $0 \leq z \leq 6$ in the molar ratio, p, q, r and s are each an integer of 1–18, preferably 3–14, $X_1$–$X_5$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

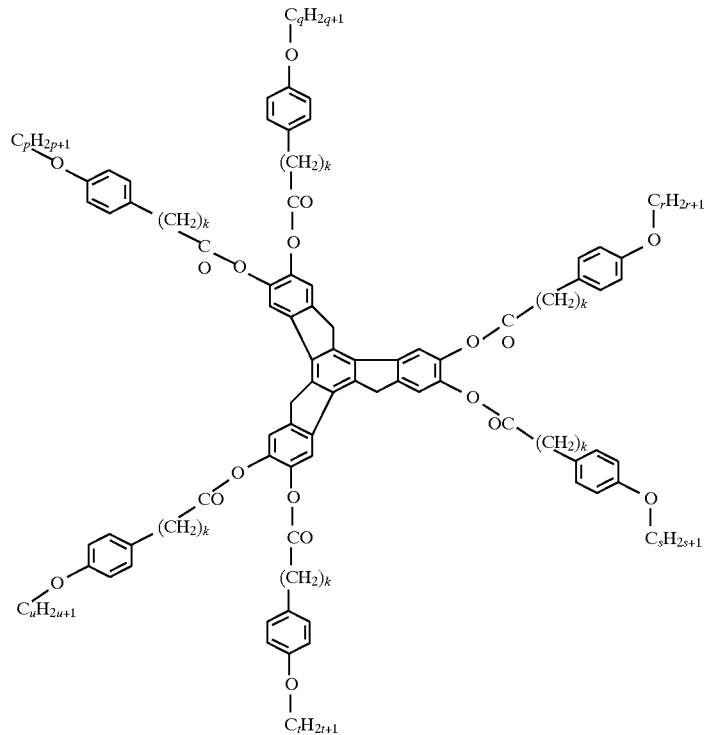
wherein p, q, r, s, t, u, v and w are each an integer of 3–18, preferably 5–14, k is 1, 2 or 3.
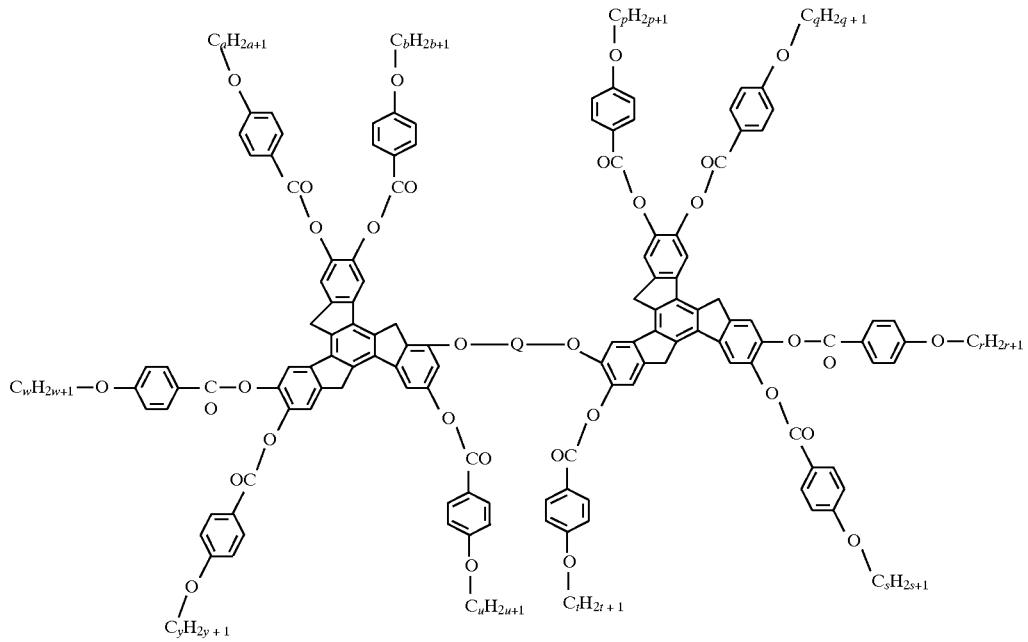
wherein p, q, r, s, t, u, v, w, a and b are each an integer of 1–18, preferably 3–14.
Q is the following:
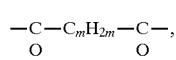
-continued
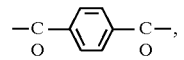

-continued
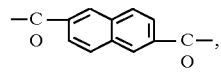
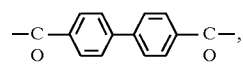
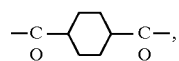
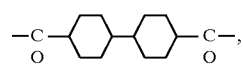
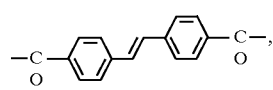
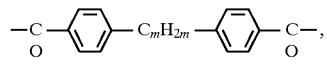
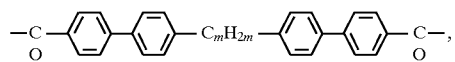
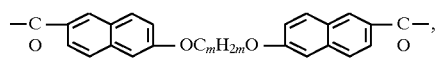
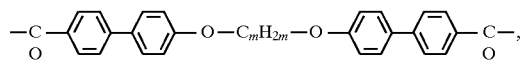
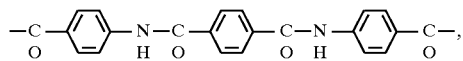
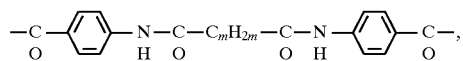
-continued
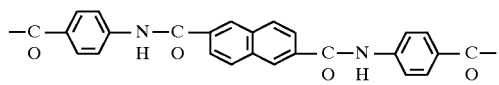
etc.
wherein m is an integer of 2–16.
Preferable Q:
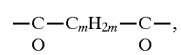
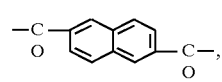
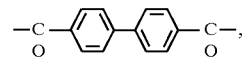
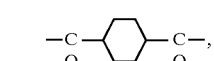
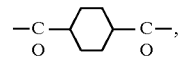
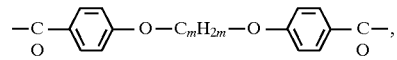
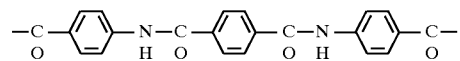
etc.
wherein m is an integer of 2–16, preferably 4–12.

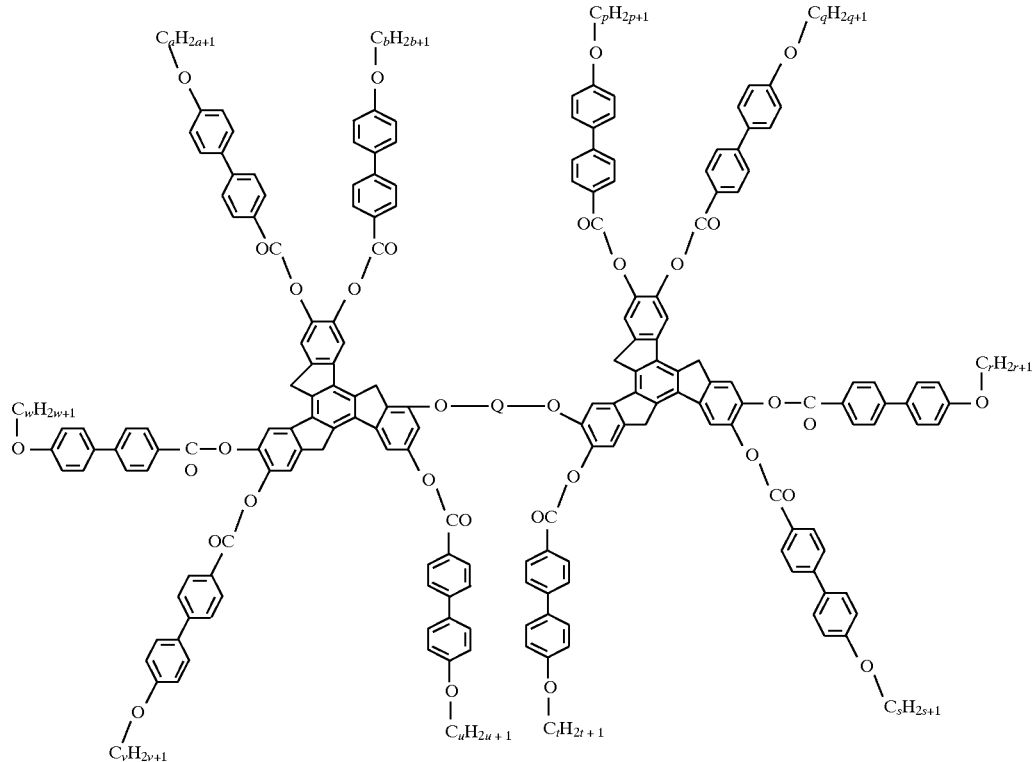
wherein p, q, r, s, t, u, v, w, a and b are each an integer of 1–18, preferably 3–14.
Q is the following:
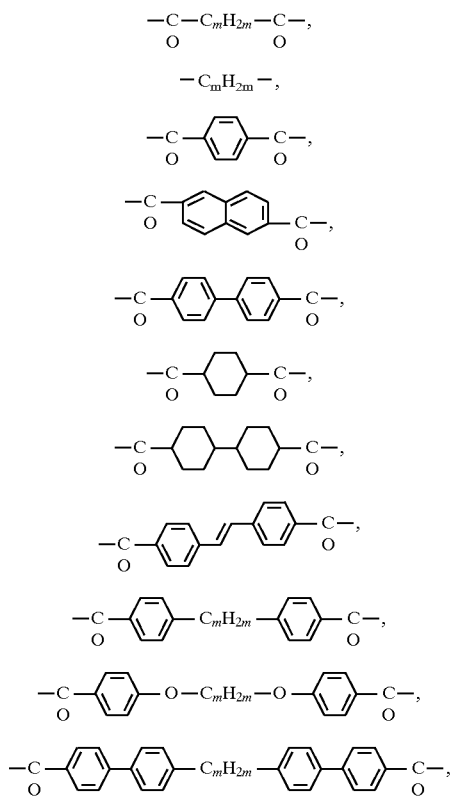
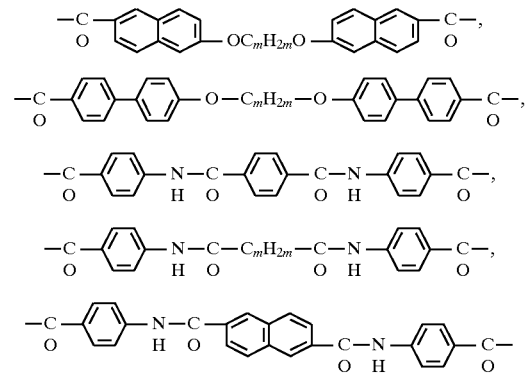
etc.
wherein m is an integer of 2–16.
Preferable Q:
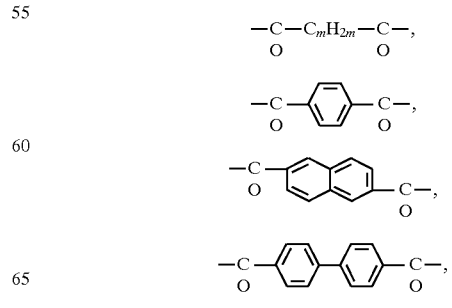

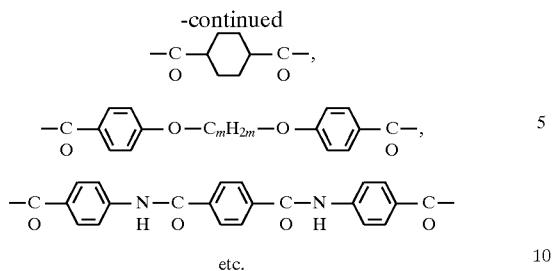
etc.
wherein m is an integer of 2–16, preferably 4–12.
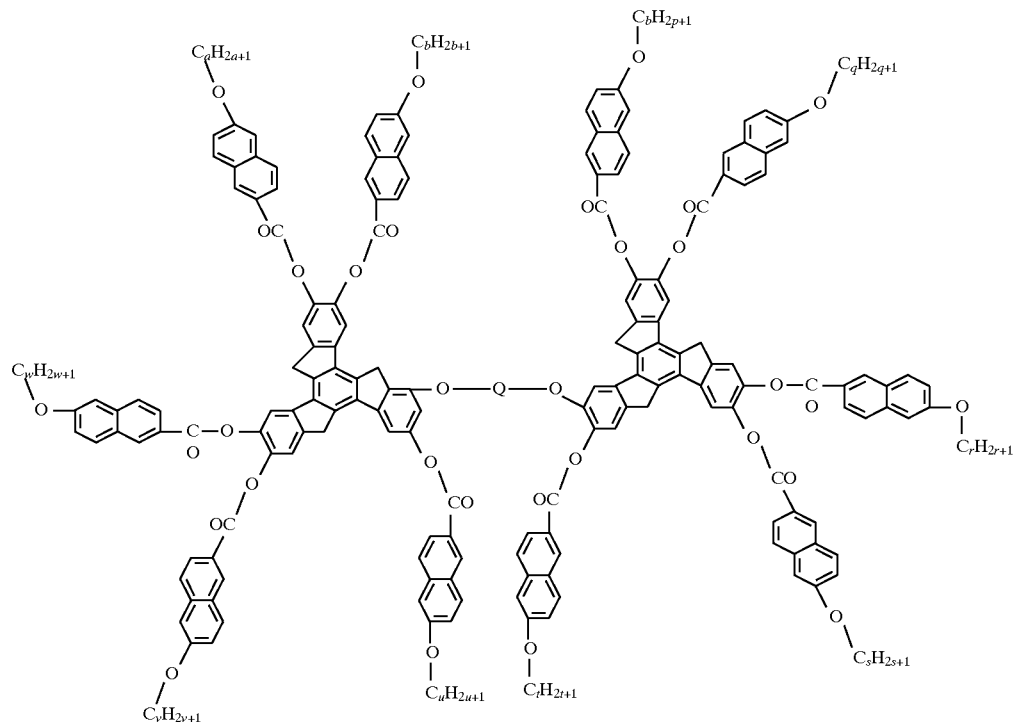
wherein p, q, r, s, t, u, v, w, a and b are each an integer of 1–18, preferably 3–14.
Q is the following:
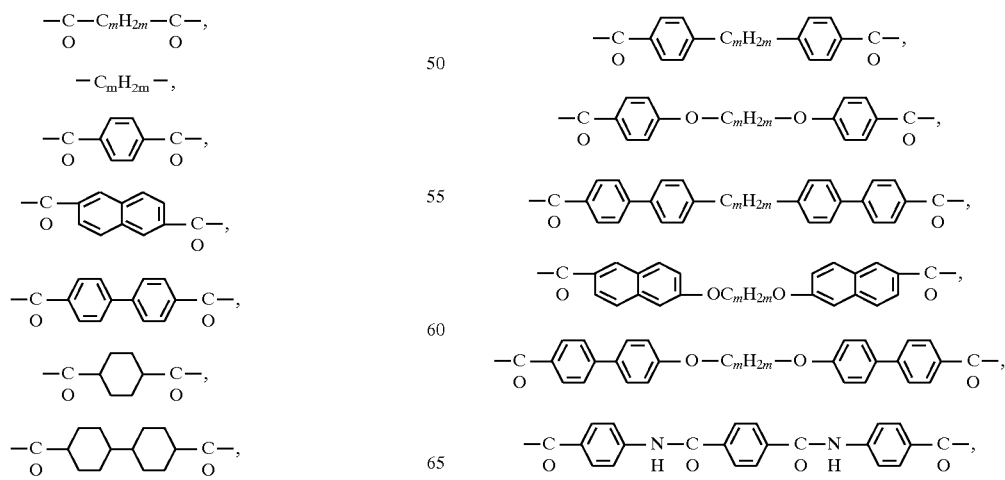

-continued
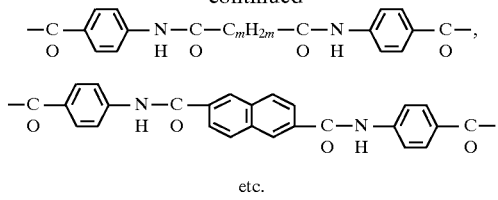
etc.
wherein m is an integer of 2–16.
Preferable Q:
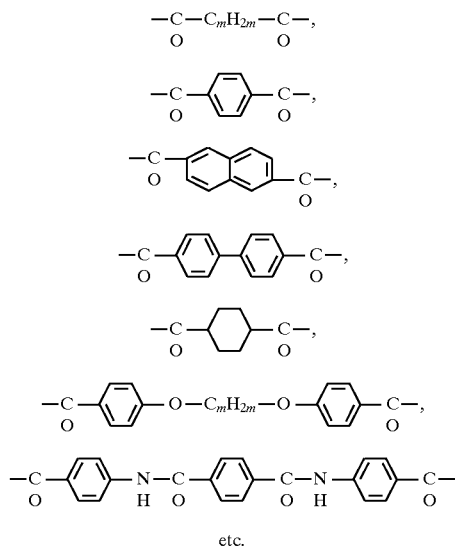
etc.
wherein m is an integer of 2–16, preferably 4–12.
Q is the following:
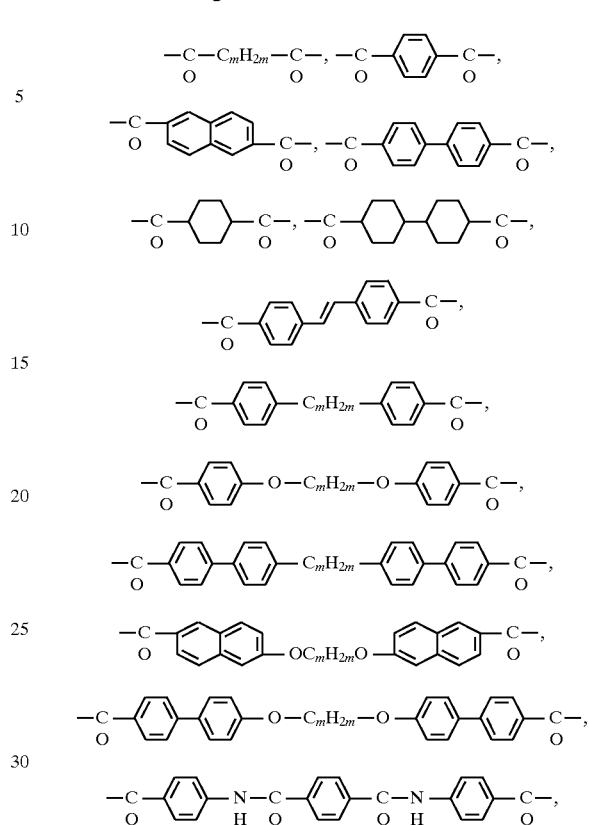
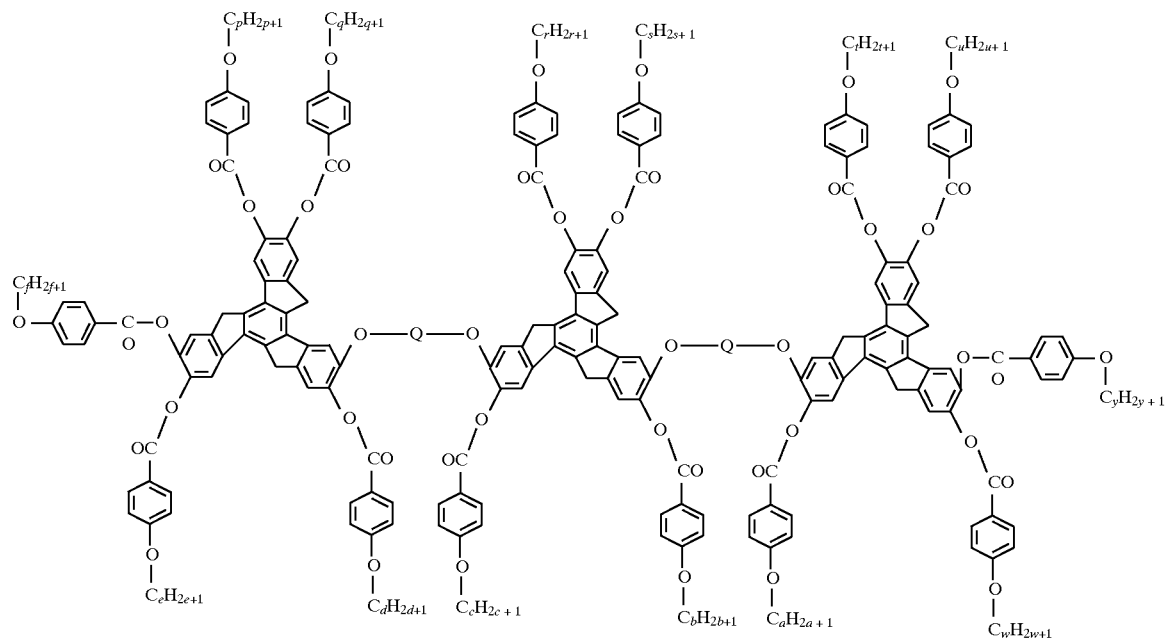
wherein p, q, r, s, t, u, v, w, a, b, c, d, e and f are each an integer of 1–18, preferably 3–14.

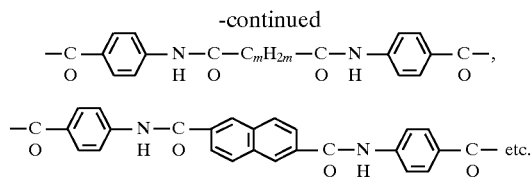
wherein m is an integer of 2–16.
Preferable Q:
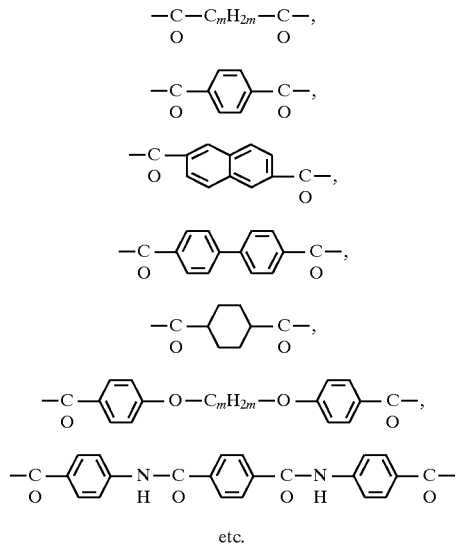
wherein m is an integer of 2–16, preferably 4–12.
Polymer represented by the following:
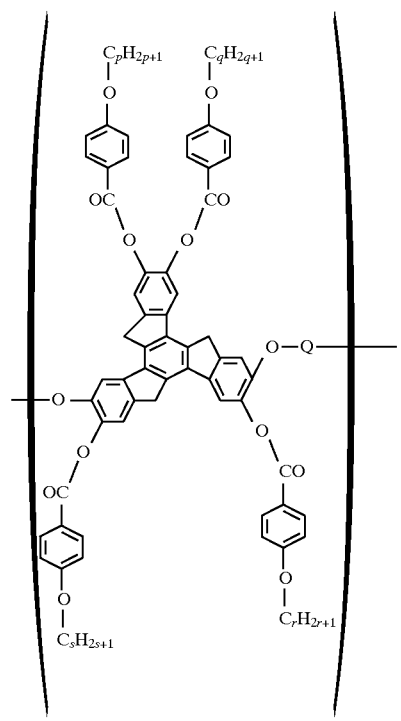
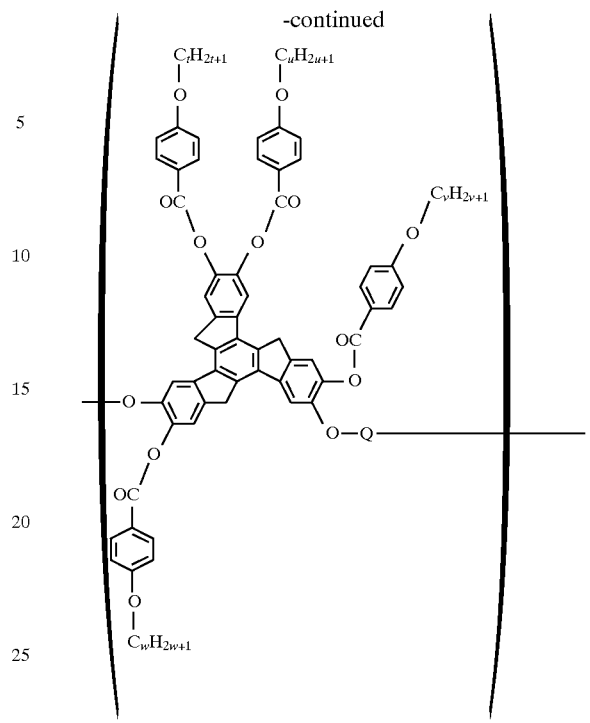
wherein p, q, r, s, t, u, v and w are each an integer of 1–18, preferably 3–14, and the average molecular weight is 5,000–100,000.
Q is the following:
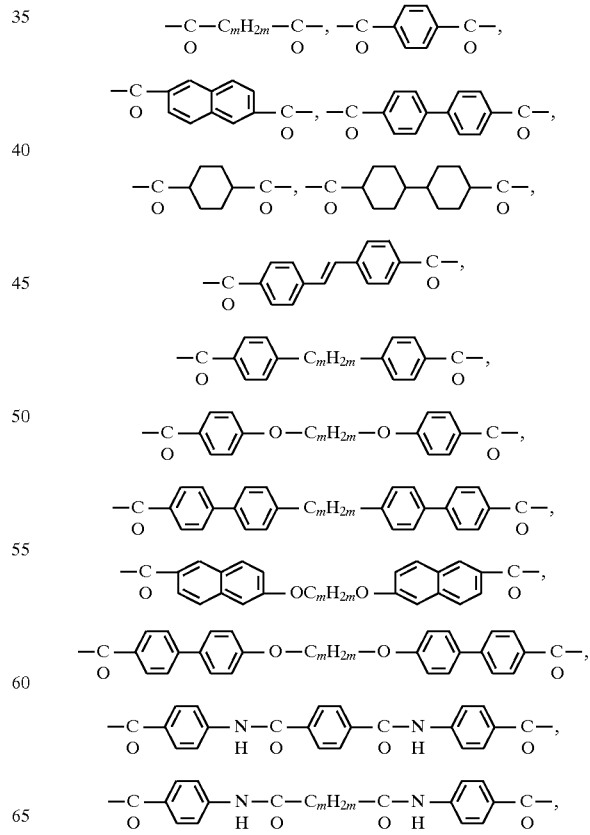

-continued
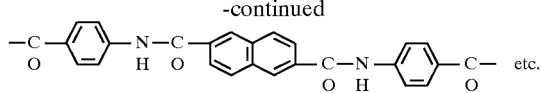
wherein m is an integer of 2–16.
Preferable Q:
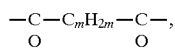
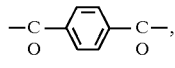
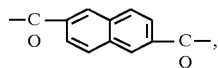
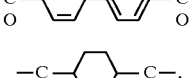
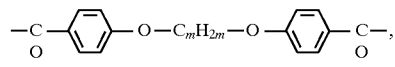
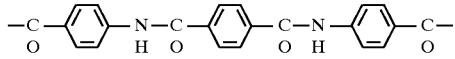
etc.
wherein m is an integer of 2–16, preferably 4–12.
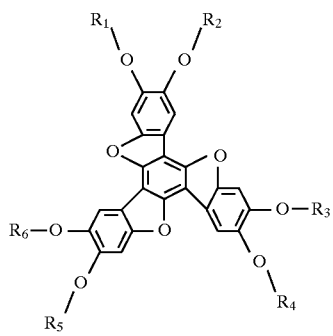
[Structural formula 8]
wherein $R_1$–$R_6$ are each a monofunctional or bifunctional substituent group selected from the following groups:
Mono functional substituent groups:
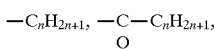
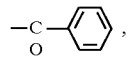
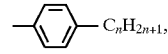
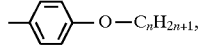
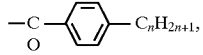
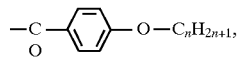
-continued
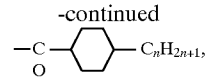
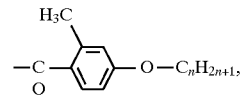
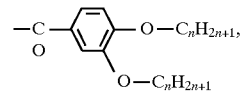
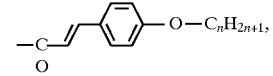
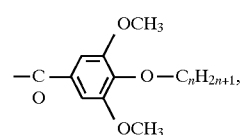
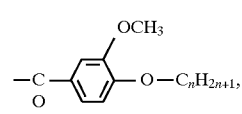
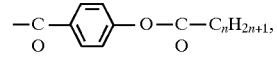
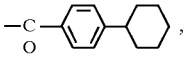
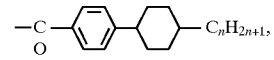
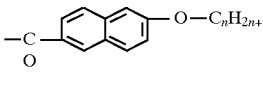
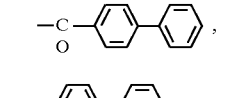
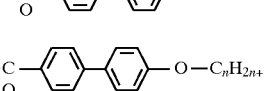
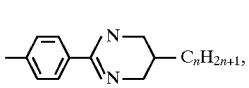
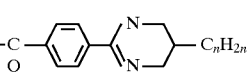
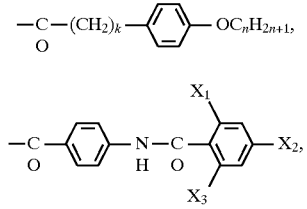
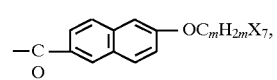

-continued

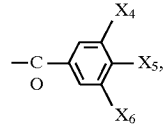

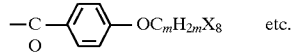 etc.

wherein $C_nH_{2n+1}$ is a linear or branched alkyl group, n is an integer of 1–18, preferably 3–14, $X_1$–$X_8$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, l is an integer of 1–18, preferably 1–10, $C_mH_{2m}$ is a linear or branched alkylene chain, and m is an integer of 1–18, preferably 2–10.

Bifunctional substituent groups:

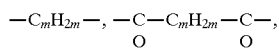

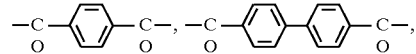

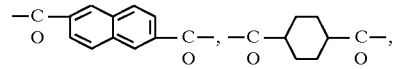

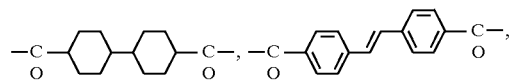

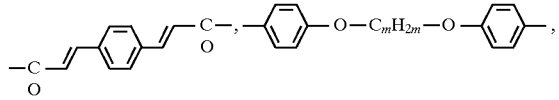

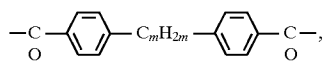

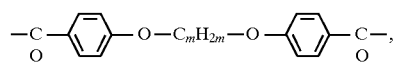

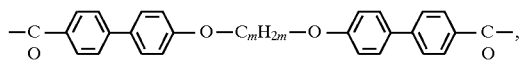

-continued

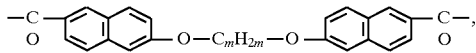

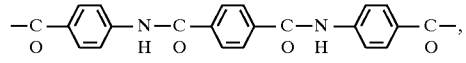

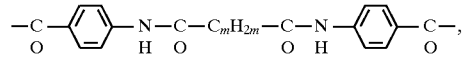

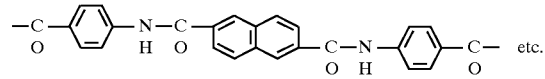 etc.

wherein $C_mH_{2m}$ is a linear or branched alkylene chain, and m is an integer of 2–16, preferably 4–12.

Examples of the concrete structures:

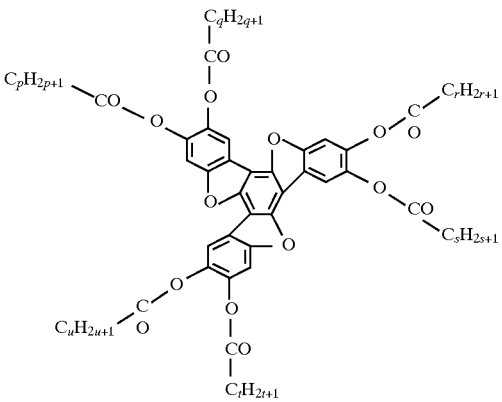

wherein p, q, r, s, t and u are each an integer of 1–18, preferably 3–14.

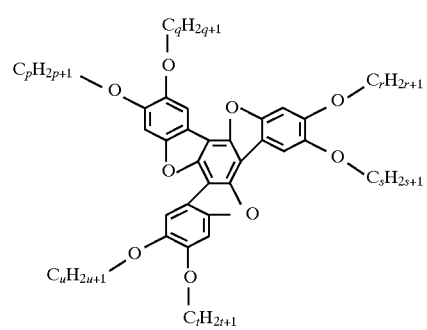

wherein p, q, r, s, t and u are each an integer of 1–18, preferably 3–14.

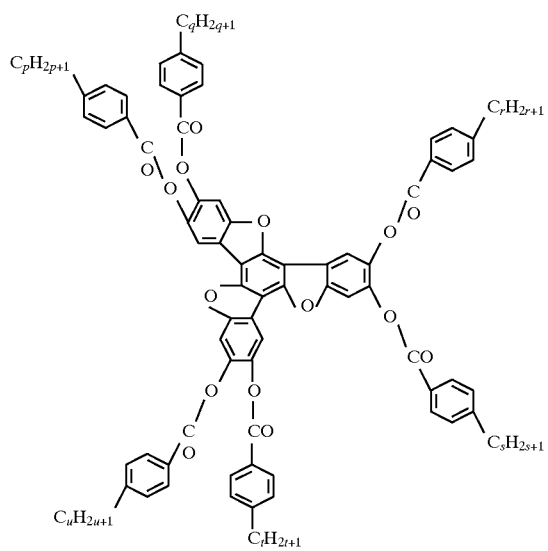

wherein p, q, r, s, t and u are each an integer of 1–18, preferably 3–14.

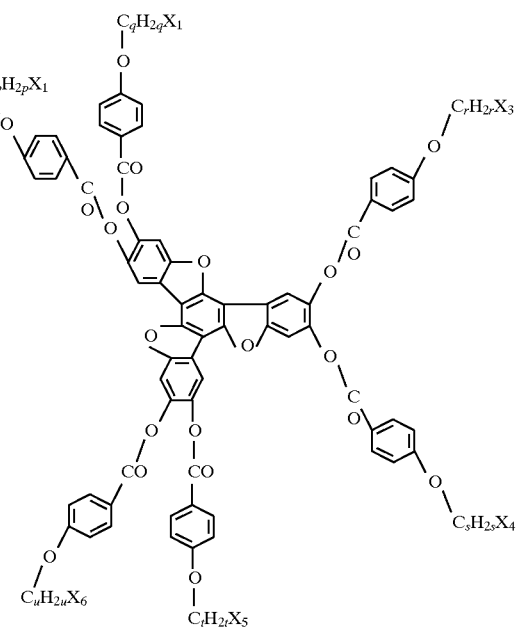

wherein p, q, r, s, t and u are each an integer of 1–18, preferably 3–14, $X_1$–$X_6$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

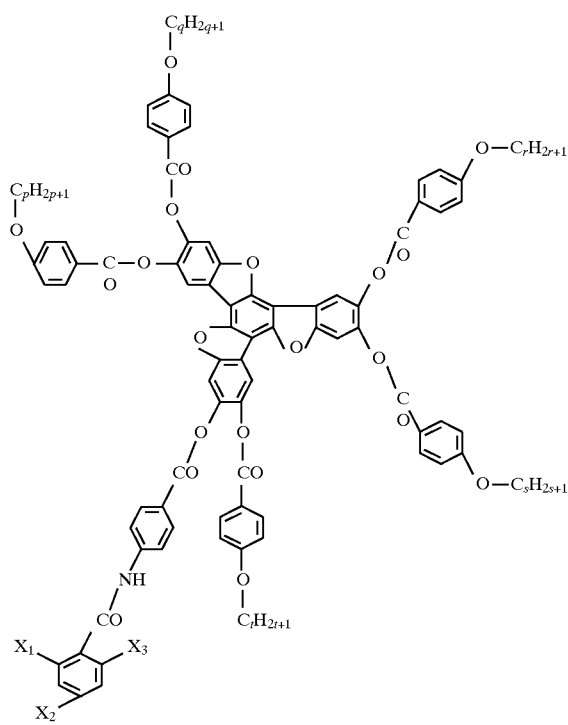

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

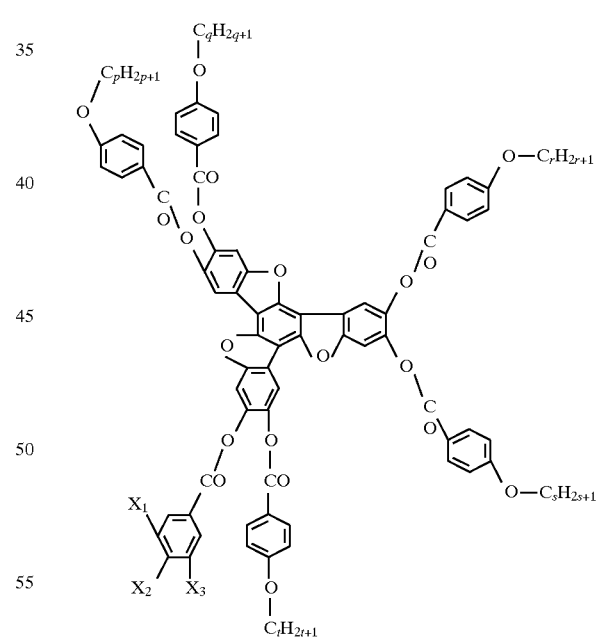

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

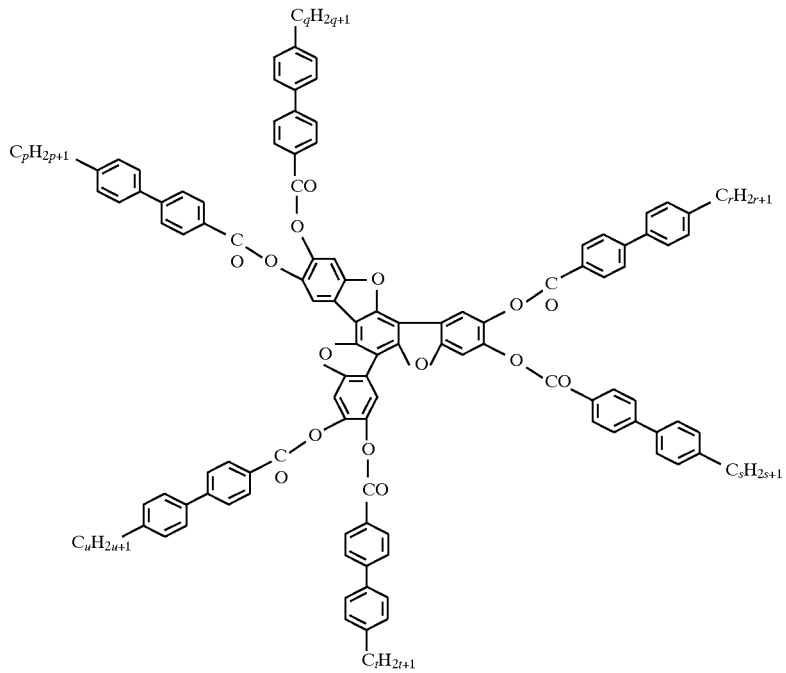
wherein p, q, r, s, t and u are each an integer of 1–18, preferably 3–14.
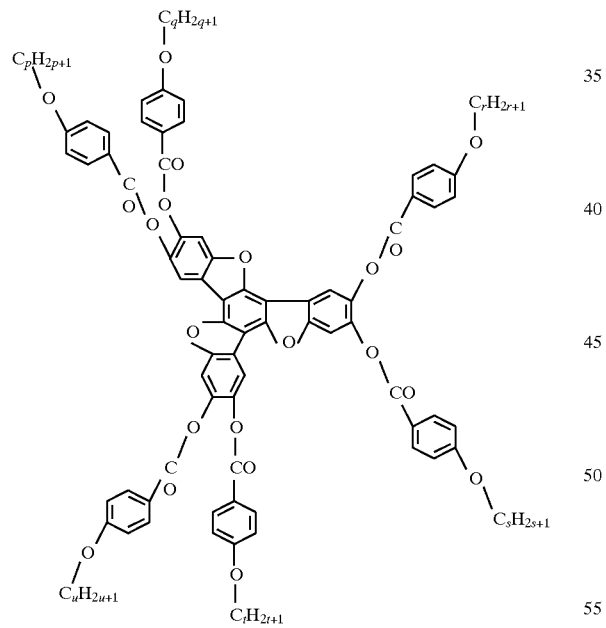
wherein p, q, r, s, t and u are each an integer of 1–18, preferably 3–14

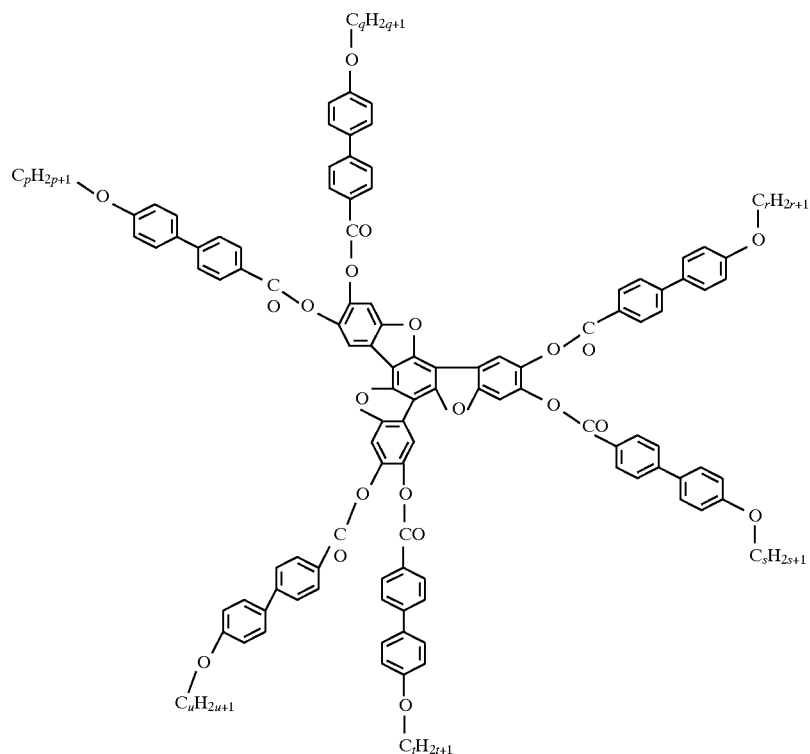
wherein p, q, r, s, t and u are each an integer of 1–18, preferably 3–14.
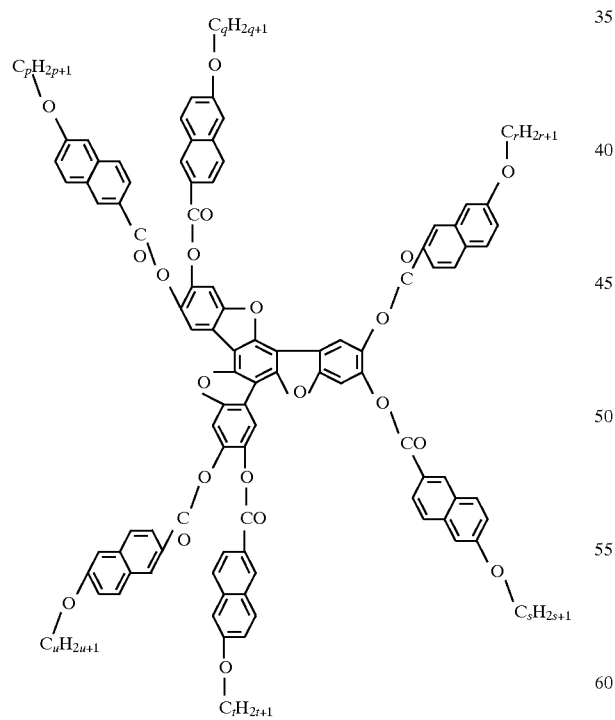
wherein p, q, r, s, t and u are each an integer of 1–18, preferably 3–14.

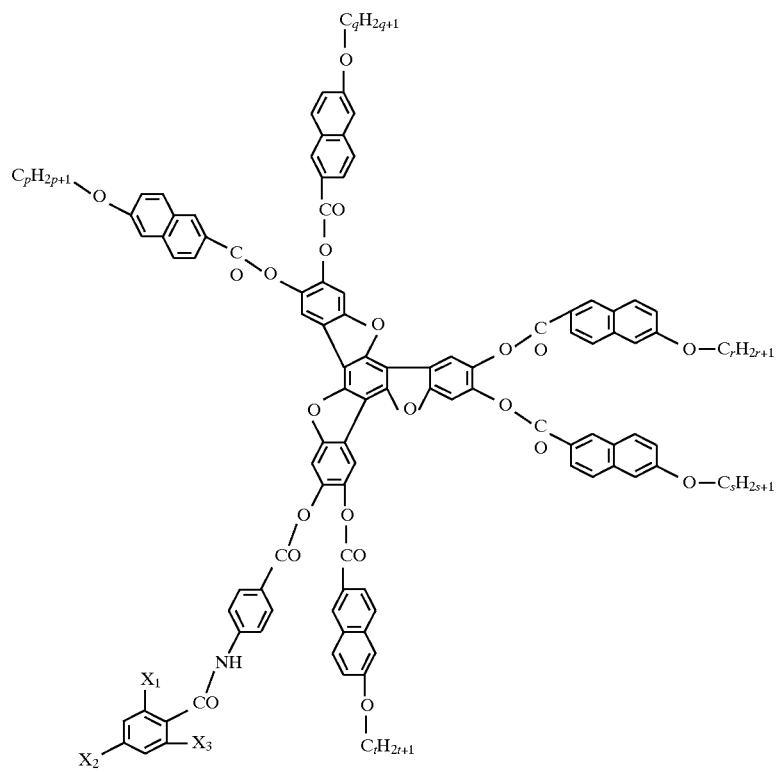

wherein p, q, r, s and t are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

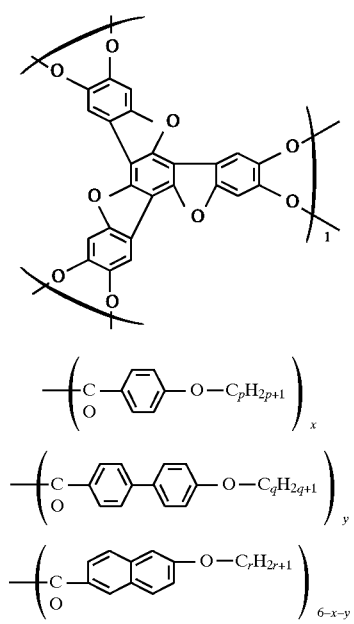

wherein $0 \leq x \leq 6$, $0 \leq y \leq 6$ in the molar ratio, and p, q and r are each an integer of 1–18, preferably 3–14.

Composition of the following:

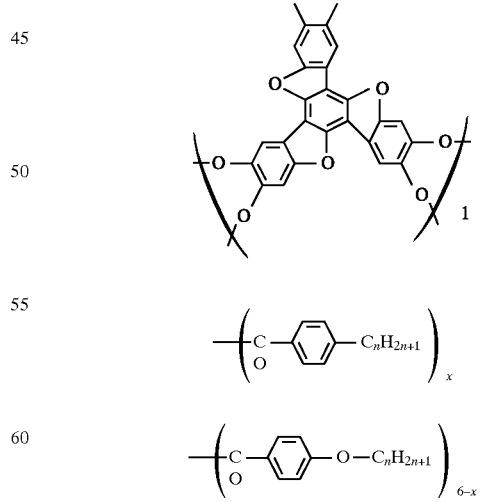

wherein $0 \leq x \leq 6$ in the molar ratio, and p, q and r are each an integer of 1–18, preferably 3–14.

Composition of the following:

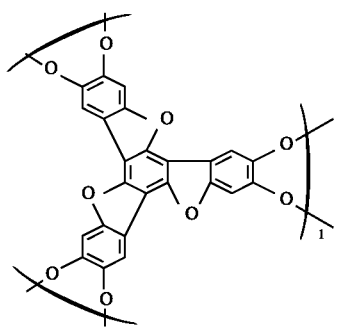

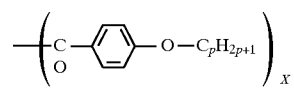

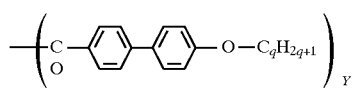

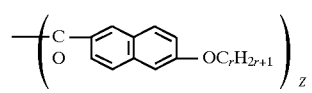

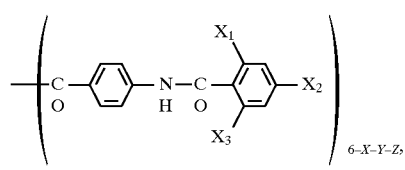

wherein $0 \leq x \leq 6$, $0 \leq y \leq 6$, $0 \leq z \leq 6$ in the molar ratio, and p, q and r are each an integer of 1–18, preferably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

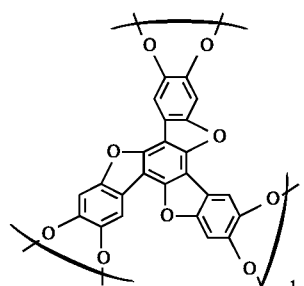

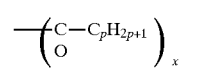

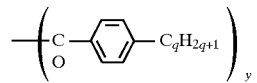

-continued

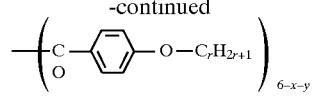

wherein $0 \leq x \leq 6$, $0 \leq y \leq 6$ in the molar ratio, and p, q and r are each an integer of 1–18, preferably 3–14.

Composition of the following:

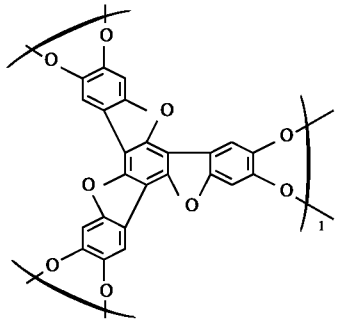

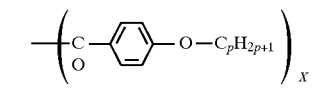

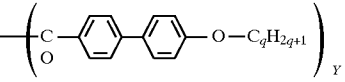

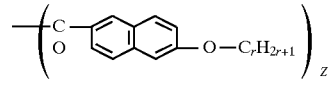

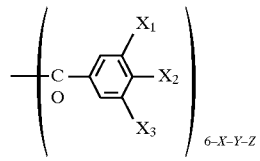

wherein $0 \leq x \leq 6$, $0 \leq y \leq 6$, $0 \leq z \leq 6$ in the molar ratio, and p, q and r are each an integer of 1–18, prefeably 3–14, $X_1$–$X_3$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.

Composition of the following:

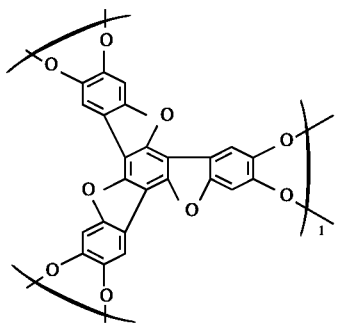

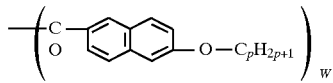

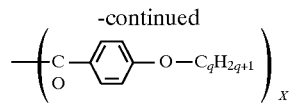
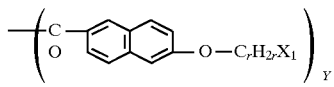
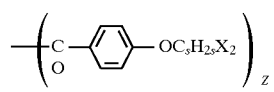
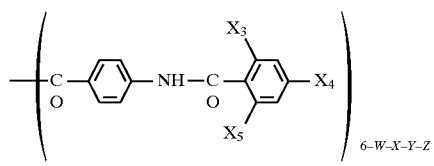
wherein $0 \leq x \leq 6$, $0 \leq y \leq 6$, $0 \leq z \leq 6$ in the molar ratio, and p, q and r are each an integer of 1–18, preferably 3–14, $X_1$–$X_5$ are each independently H—, F—, Cl—, Br—, $C_lH_{2l+1}$, $C_lH_{2l+1}O$—, $C_6H_5$—, $C_6H_5CO$— or $C_6H_5O$—, where $C_lH_{2l+1}$ is a linear or branched alkyl group, and l is an integer of 1–18, preferably 1–10.
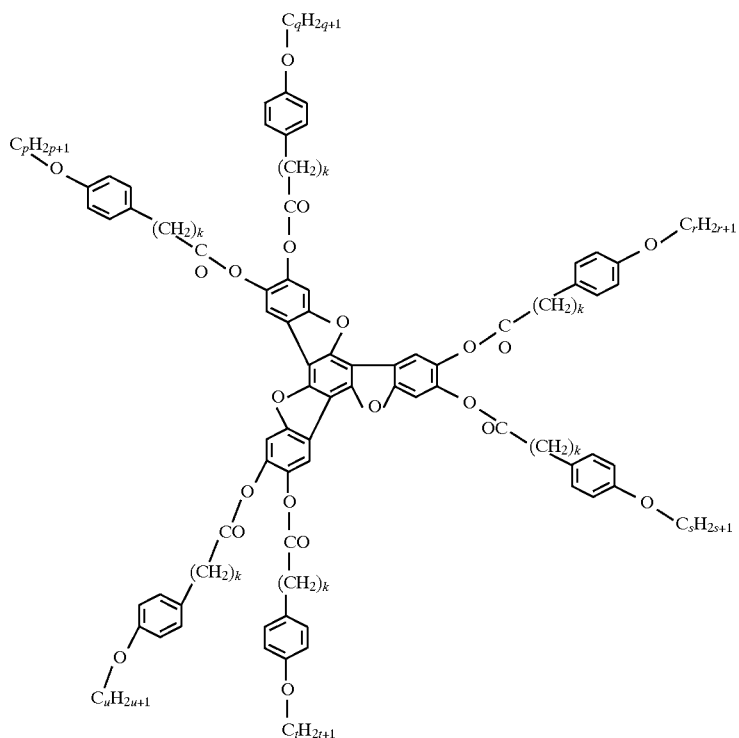
wherein p, q, r, s, t, u, v and w are each an integer of 3–18, preferably 5–14, k is 1, 2 or 3.

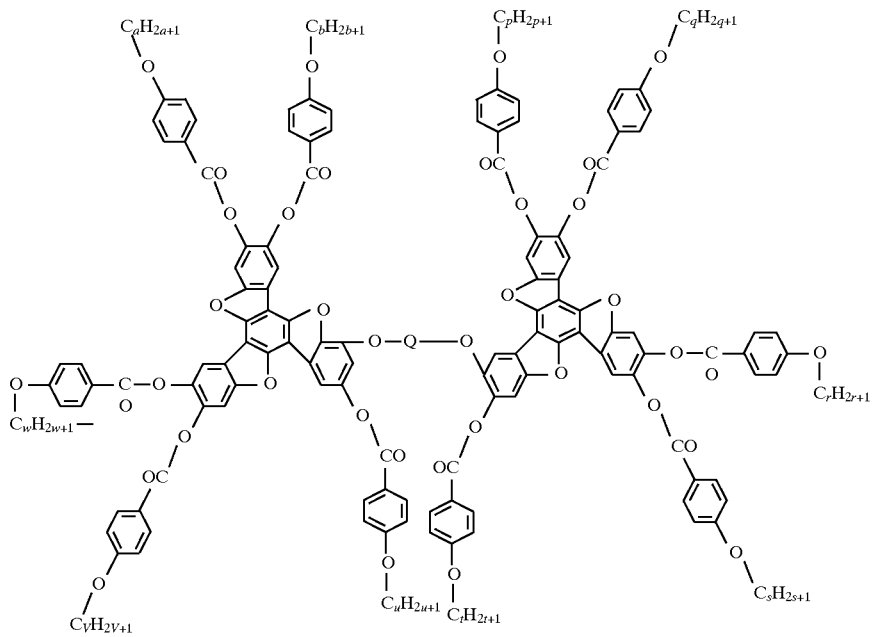
wherein p, q, r, s, t, u, v, w, a and b are each an integer of 1–18, preferably 3–14.
Q is the following:
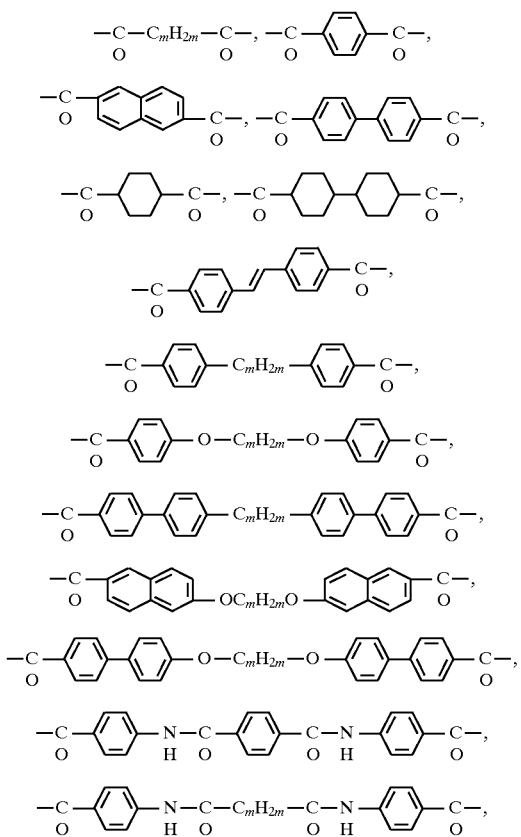
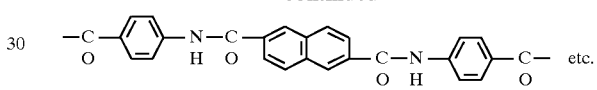
wherein m is an integer of 2–16.
Preferable Q:
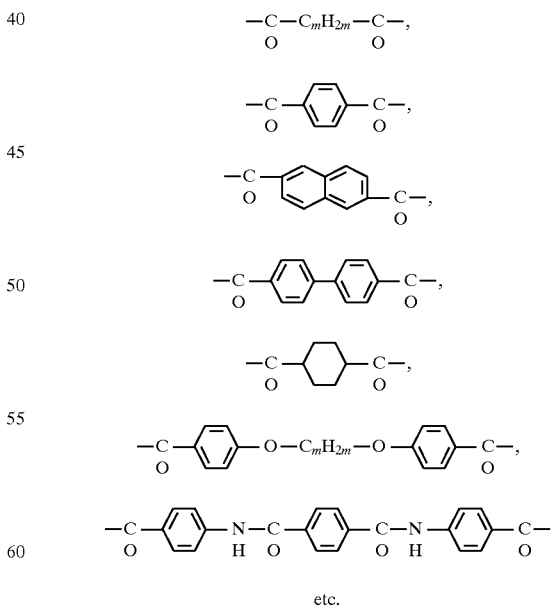
etc.
wherein m is an integer of 2–16, preferably 4–12.

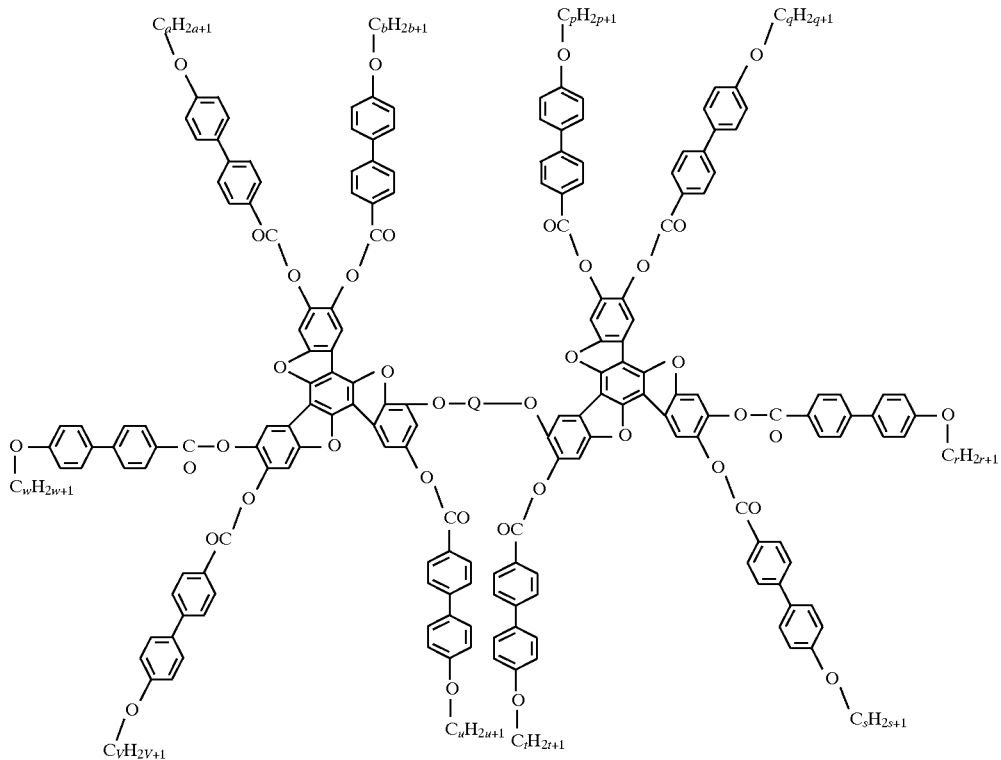
wherein p, q, r, s, t, u, v, w, a and b are each an integer of 1–18, preferably 3–14.
Q is the following:
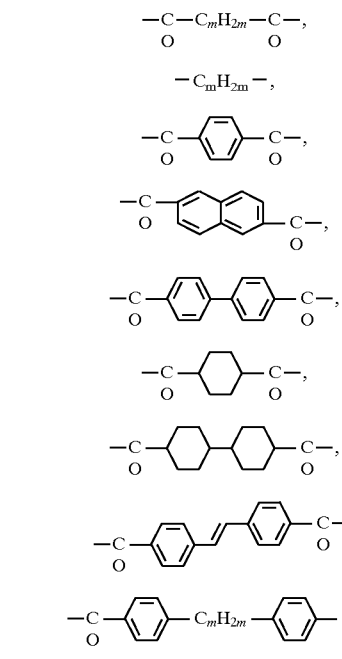
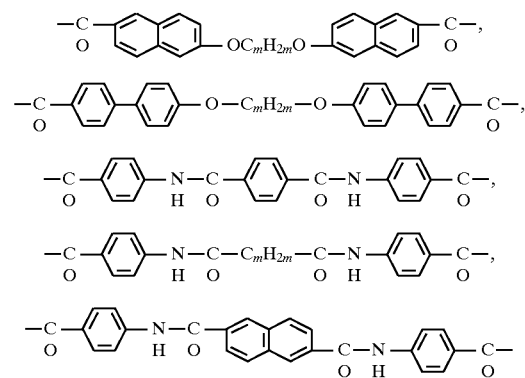
etc.
wherein m is an integer of 2–16.
Preferable Q:
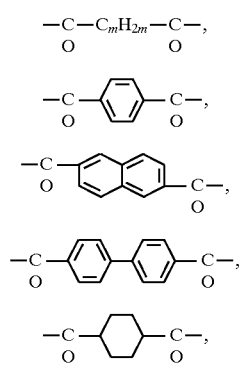

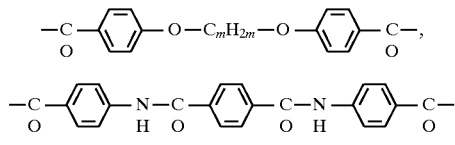
wherein m is an integer of 2–16, preferably 4–12.
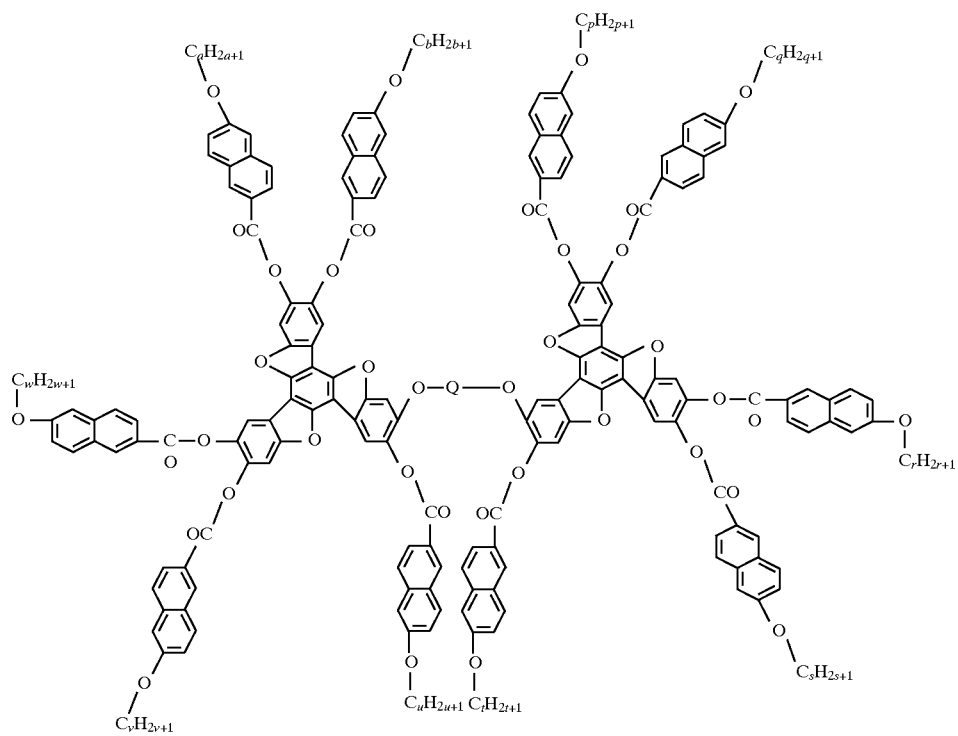
wherein p, q, r, s, t, u, v, w, a and b are each an integer of 1–18, preferably 3–14.
Q is the following:
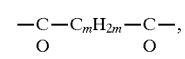
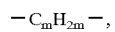
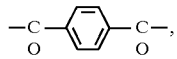
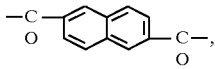
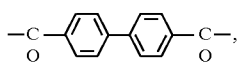
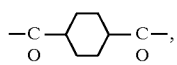
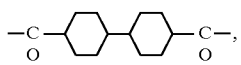
-continued
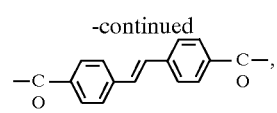
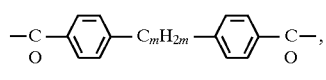
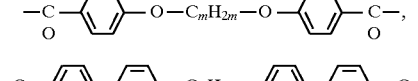
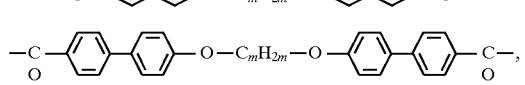
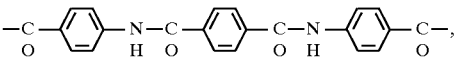
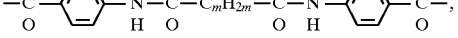

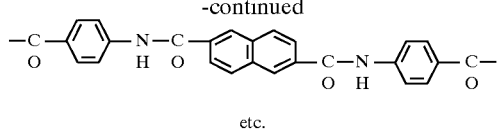
etc.
wherein m is an integer of 2–16.
Preferable Q:
Q is the following:
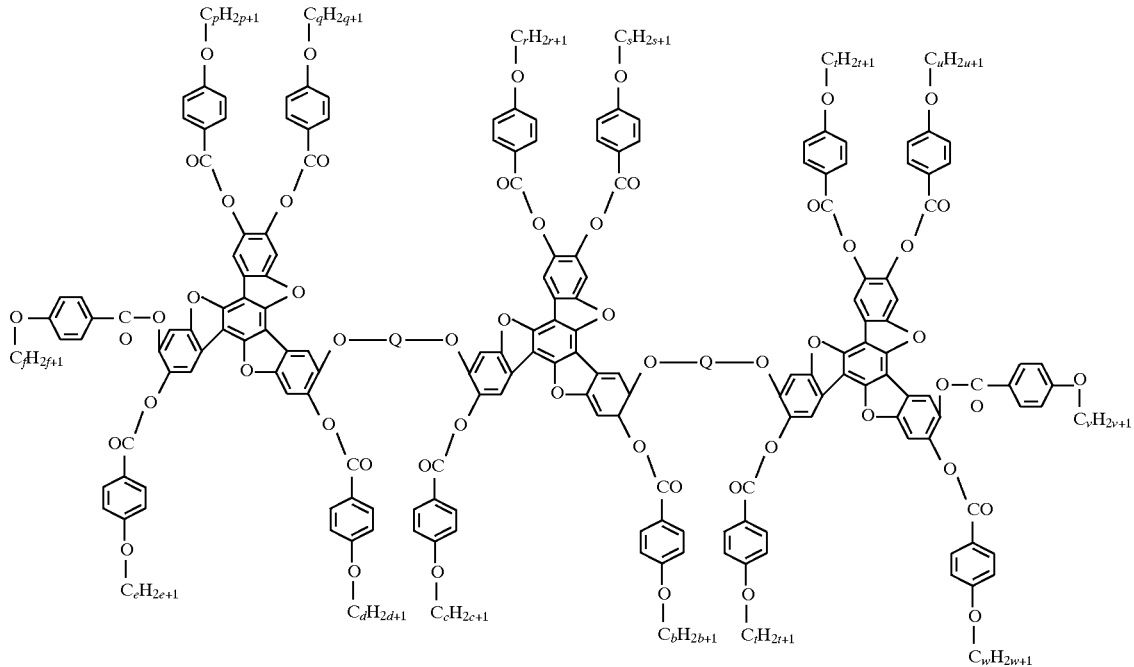
etc.
wherein m is an integer of 2–16, preferably 4–12.
wherein p, q, r, s, t, U, V, w, a, b, c, d, e and f are each an integer of 1–18, preferably 3–14.

-continued
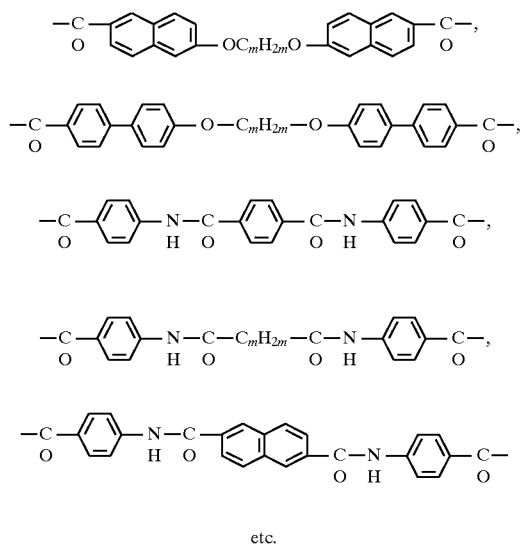
wherein m is an integer of 2–16.
Preferable Q:
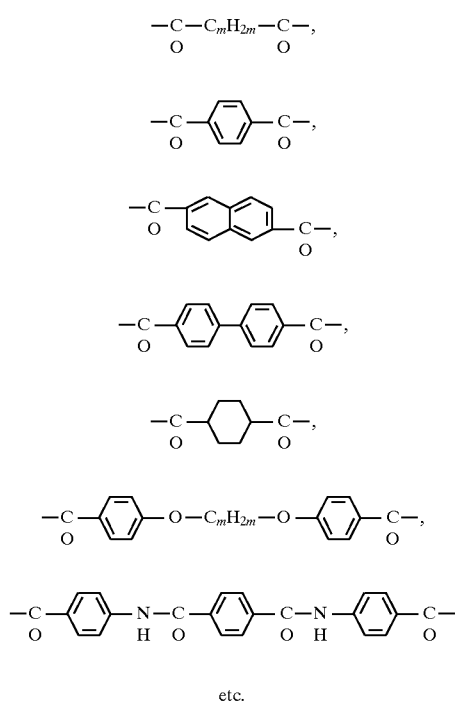
etc.
wherein m is an integer of 2–16, preferably 4–12.
Polymer represented by the following:
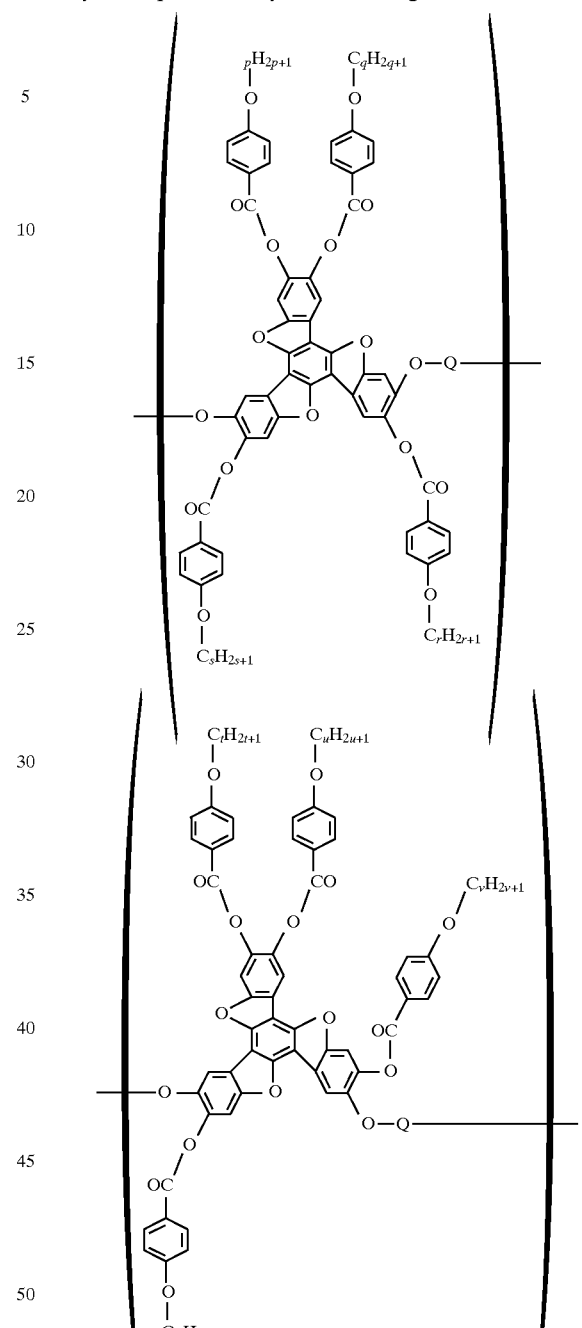
wherein p, q, r, s, t, u, v and w are each an integer of 1–18, preferably 3–14, and the average molecular weight is 5,000–100,000.
Q is the following:
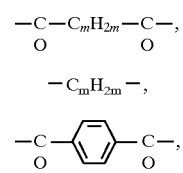

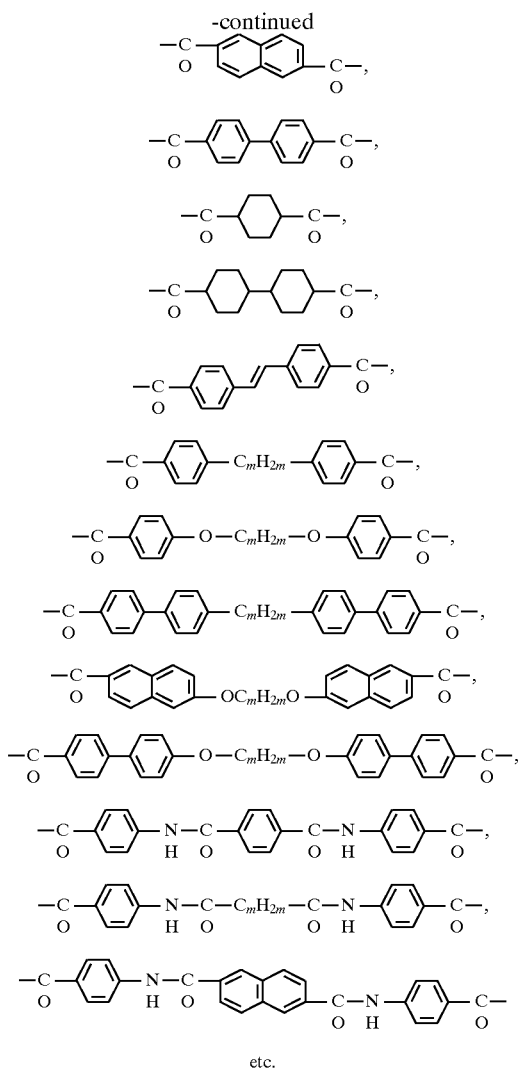

wherein m is an integer of 2–16.

Preferable Q:

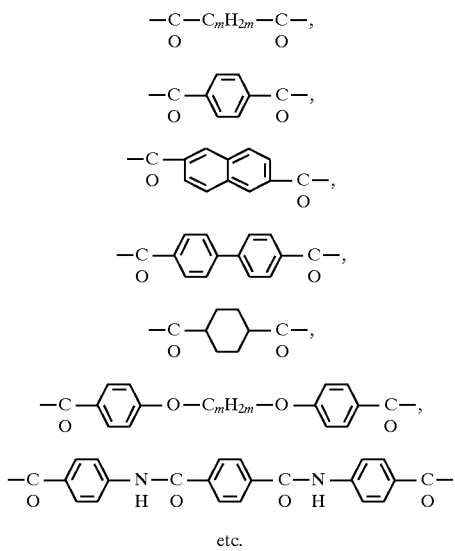

etc.

wherein m is an integer of 2–16, preferably 4–12.

[Structural formula 9]

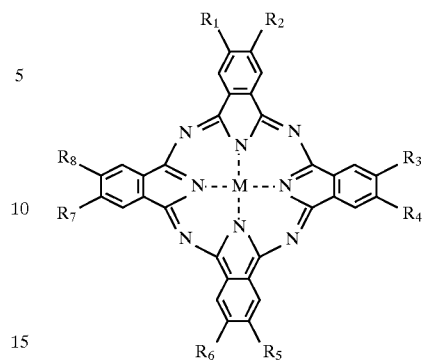

wherein $R_1$–$R_8$ are each a monofunctional or bifunctional substituent group selected from the following groups, wherein M represents two protons or a metal such as Mg, Fe, Co, Ni, Mn, Zn, Cu, Pb, Pd, Cd, Rh or Ru.

Mono functional substituent groups:

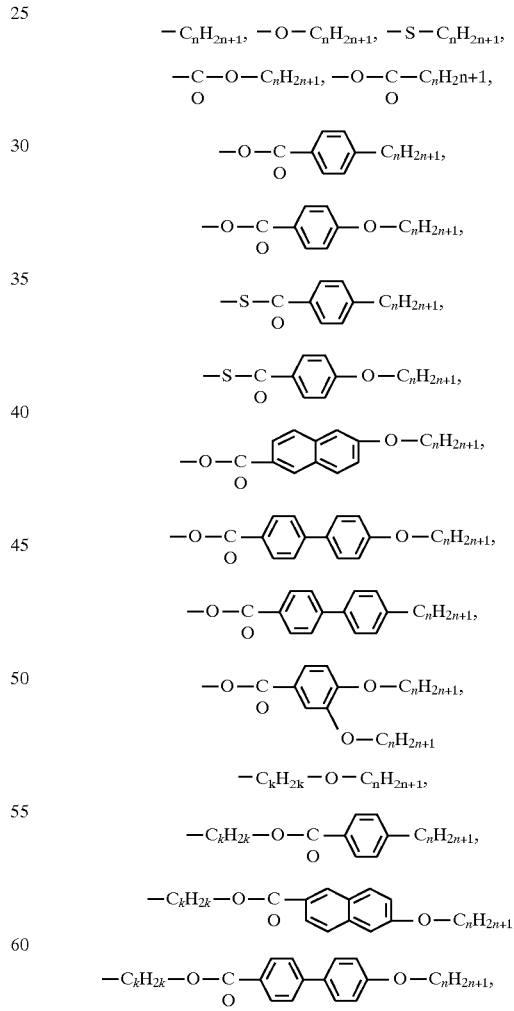

wherein $C_nH_{2n+1}$ is a linear or branched alkyl group, n is an integer of 3–18, preferably 5–14, k is 1, 2 or 3.

Bifunctional substituent groups:

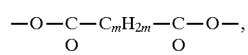

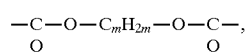

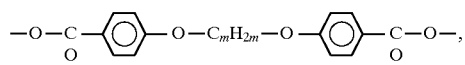

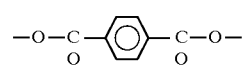

etc.

wherein $C_mH_{2m}$ is a linear or branched alkylene chain, and m is an integer of 2–16, preferably 4–12.

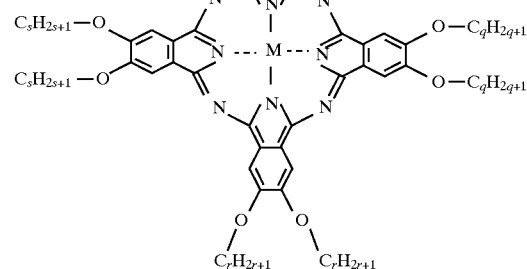

wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

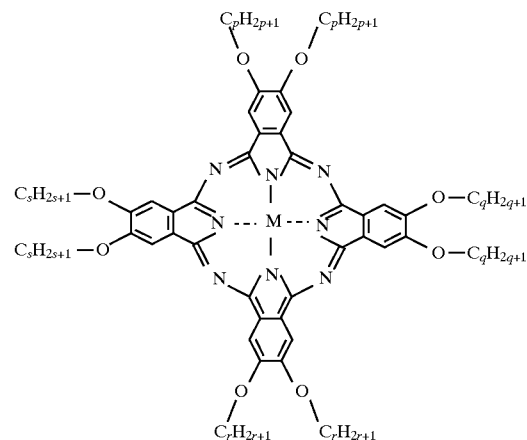

wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

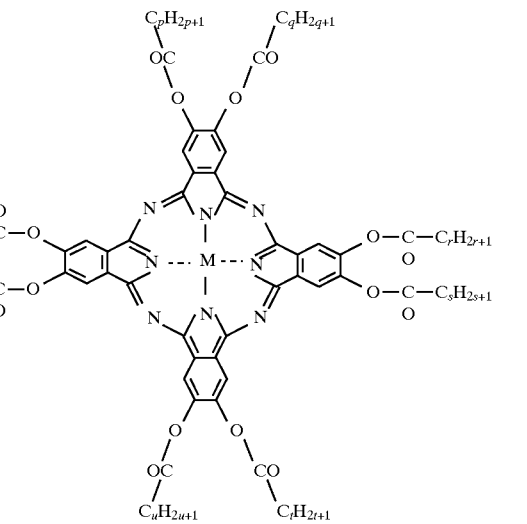

wherein M is two protons Mg, Fe, Co, Ni, Mn, Zn, Cu, Pb, Pd, Cd, Rh or Ru, preferably two protons Fe, Co, Ni, Zn or Cu. p, q, r, s, t, u, v and w are each an integer of 3–18, preferably 5–14.

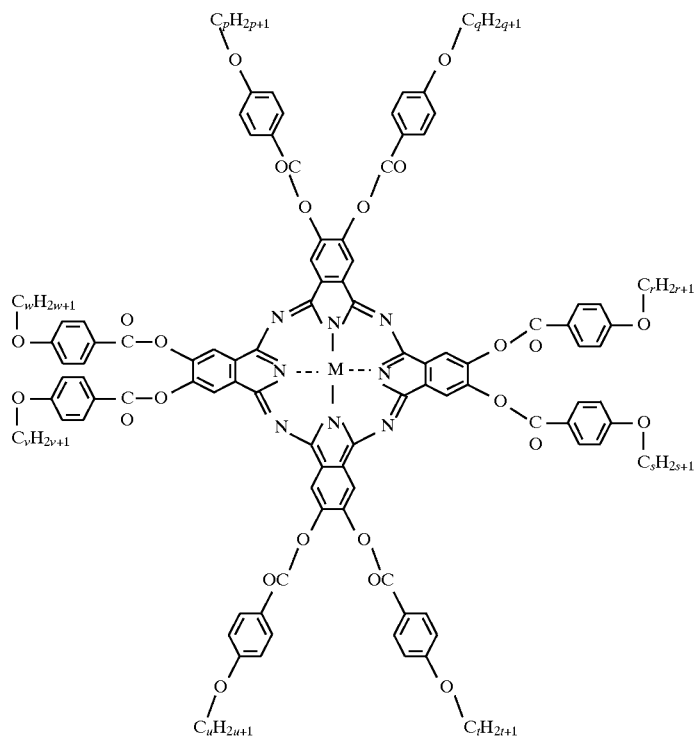
wherein M is two protons Mg, Fe, Co, Ni, Mn, Zn, Cu, Pb, Pd, Cd, Rh or Ru, preferably two protons Fe, Co, Ni, Zn or Cu. p, q, r, s, t, u, v and w are each an integer of 3–18, preferably 5–14.
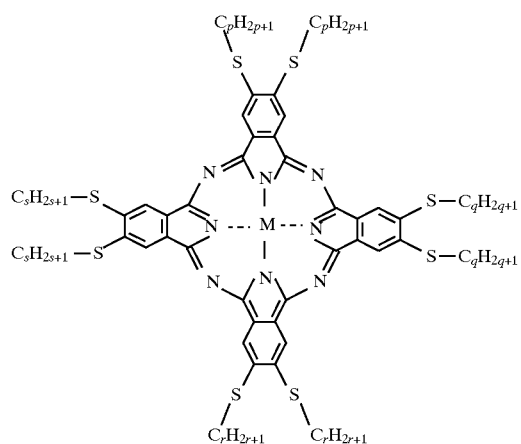
wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.
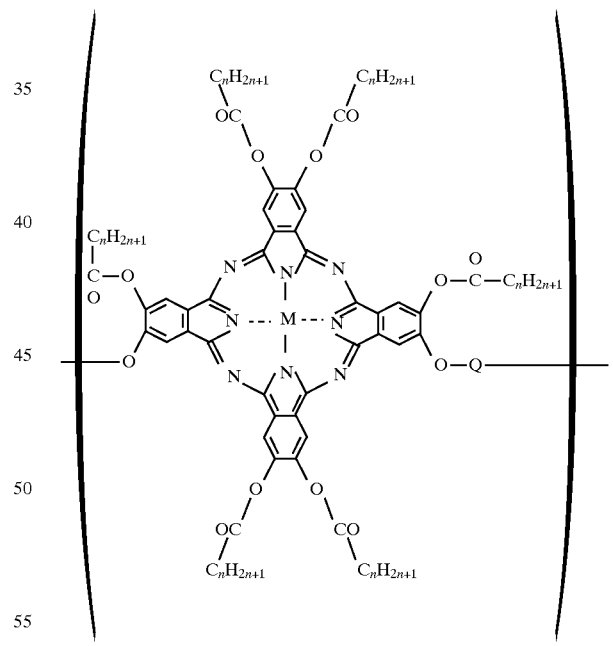

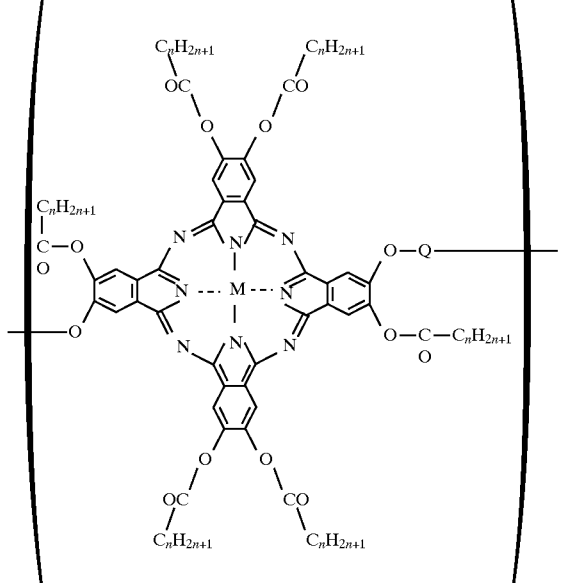

wherein M is two protons Mg, Fe, Co, Ni, Mn, Zn, Cu, Pb, Pd, Cd, Rh or Ru, preferably two protons Fe, Co, Ni, Zn or Cu. n is an integer of 3–18, preferably 5–14, m is an integer of 2–16, preferably 4–12, and the average molecular weight is 8,000–100,000.

Q is the following:

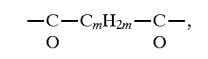
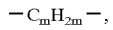
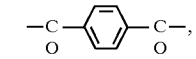
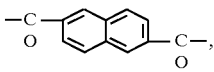
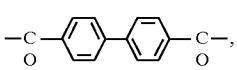
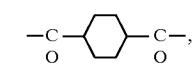
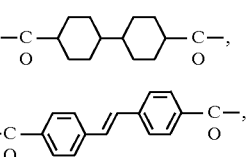
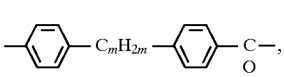
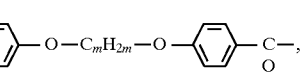
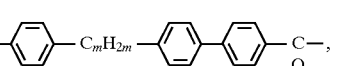
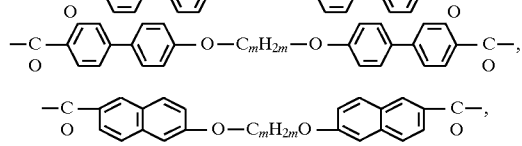
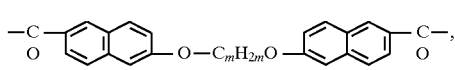

etc.

wherein m is an integer of 2–18.

Preferable Q:

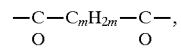
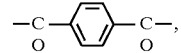
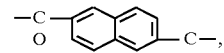
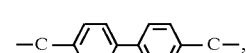
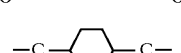
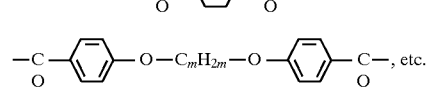

wherein m is an integer of 2–16, preferably 4–12.

[Structural formula 10]

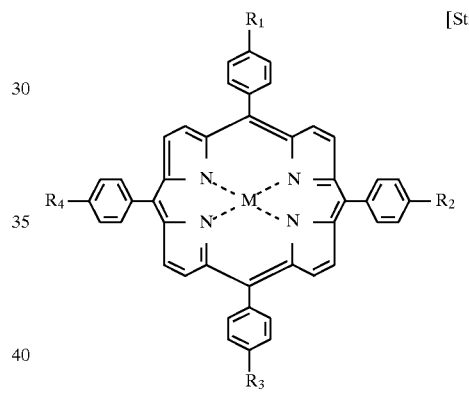

wherein $R_1$–$R_4$ are each independently a substituent group selected from the following groups, wherein M is two protons or a metal such as Mg, Fe, Co, Ni, Mn, Zn, Cu, Pb, Pd, Cd, Rh or Ru.

Mono functional substituent groups:

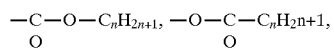
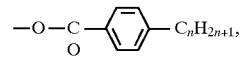
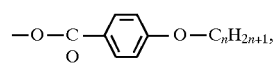
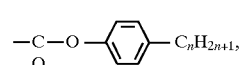
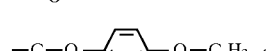
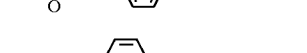

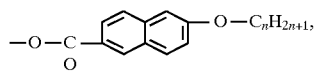

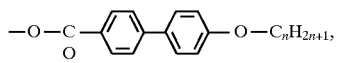

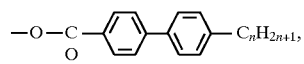

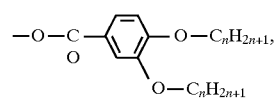

wherein $C_nH_{2n+1}$ is a linear or branched alkyl group, and n is an integer of 3–18, preferably 5–14.

Bifunctional substituent groups:

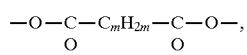

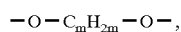

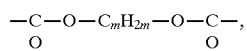

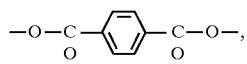

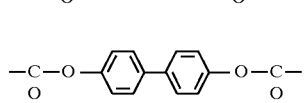

etc.

wherein $C_mH_{2m}$ is a linear or branched alkylene chain, and m is an integer of 2–16, preferably 4–12.

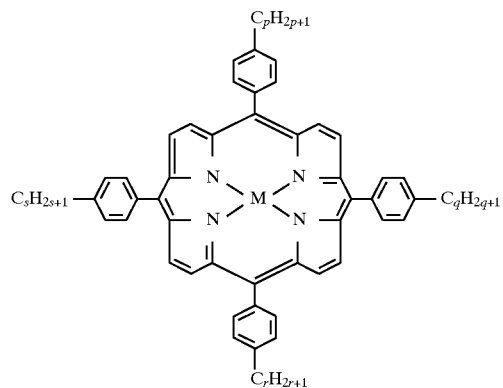

wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

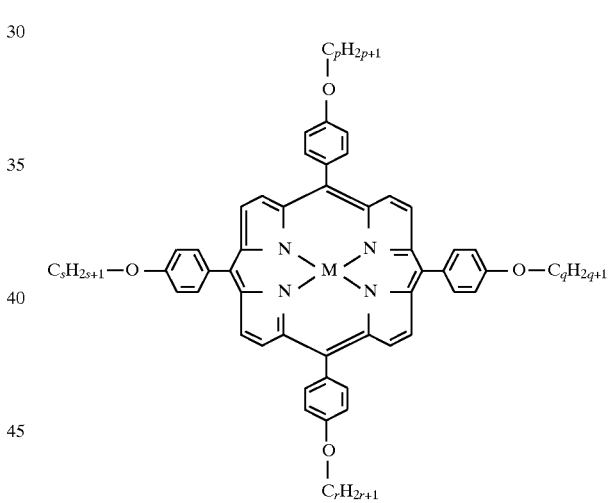

wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

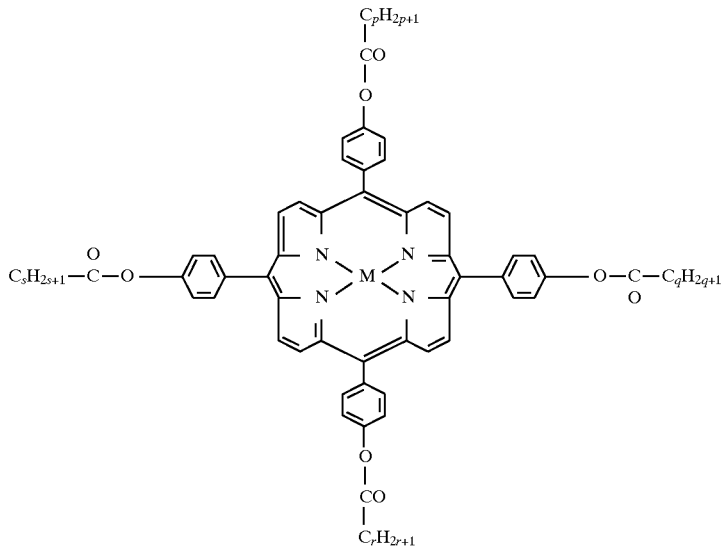
wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.
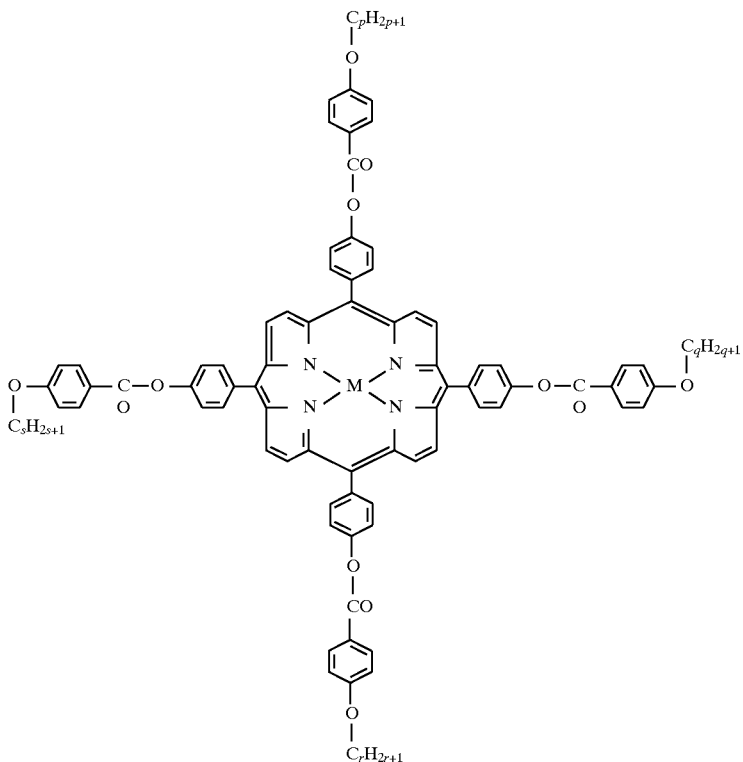
wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

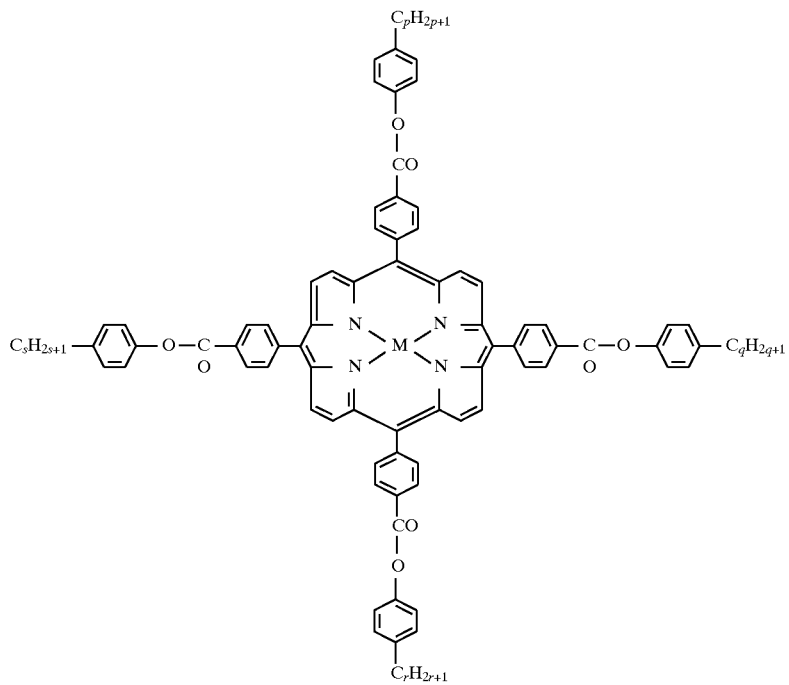

wherein M is two protons Mg, Fe, Co, Ni, Mn, Zn, Cu, Pb, Pd, Cd, Rh or Ru, preferably two protons Fe, Co, Ni, Zn or Cu. p, q, r and s are each an integer of 3–18, preferably 5–14.

Also, polymers such as polyacrylates or polysiloxanes having a compound having the above mentioned structural formula at the side chain are preferably used. Examples thereof are as follows:

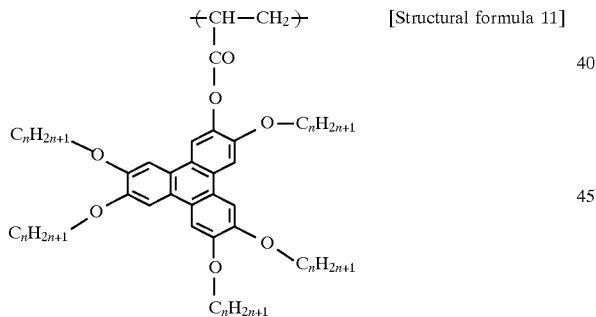

[Structural formula 11]

wherein n is an integer of 1–18, preferably 3–14.

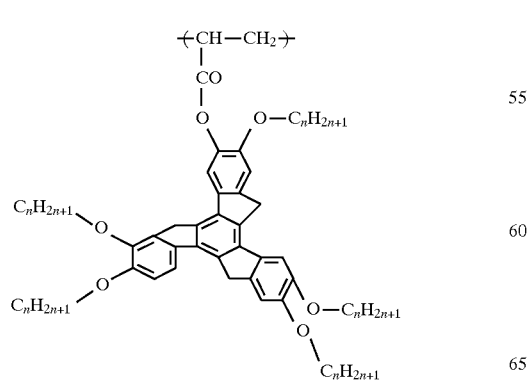

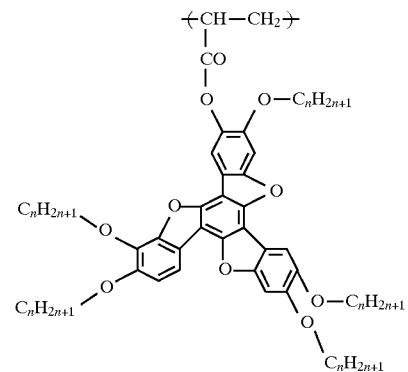

wherein n is an integer of 1–18, preferably 3–14.

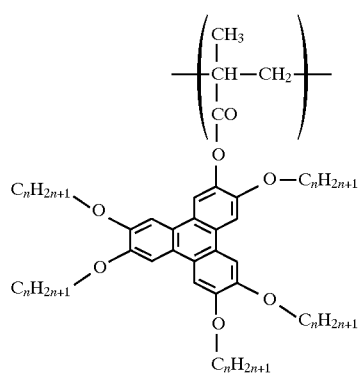

wherein n is an integer of 1–18, preferably 3–14.

141
wherein n is an integer of 1–18, preferably 3–14.
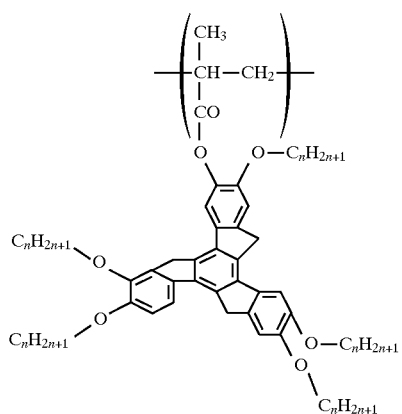
wherein n is an integer of 1–18, preferably 3–14.
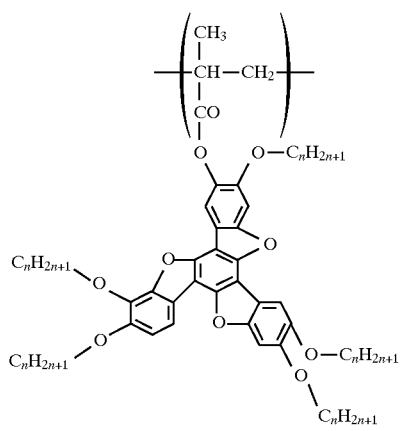
wherein n is an integer of 1–18, preferably 3–14.
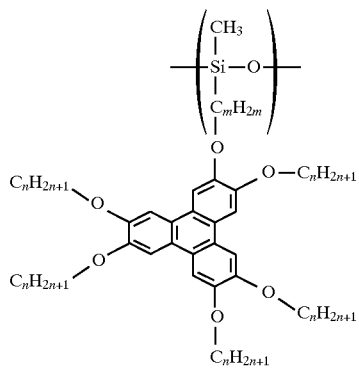
wherein n is an integer of 1–18, preferably 3–14, m is an integer of 2–16, preferably 4–12.
142
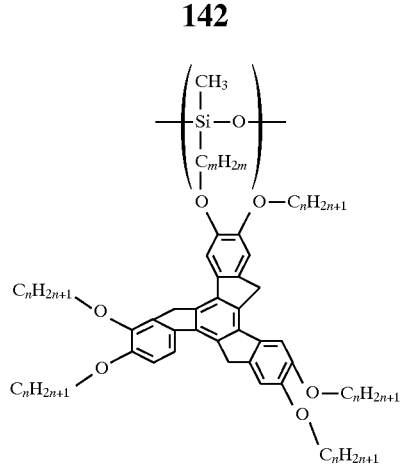
wherein n is an integer of 1–18, preferably 3–14, m is an integer of 2–16, preferably 4–12.
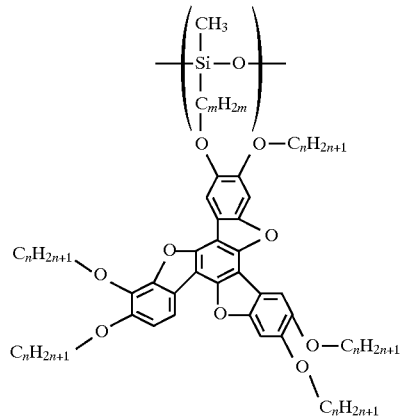
wherein n is an integer of 1–18, preferably 3–14, m is an integer of 2–16, preferably 4–12.
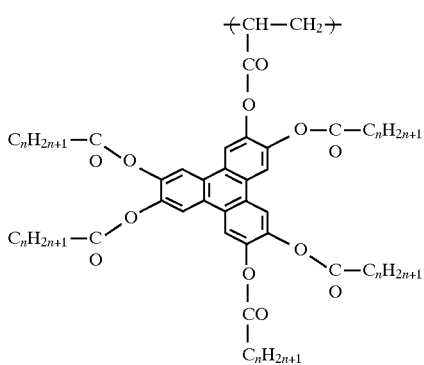

143
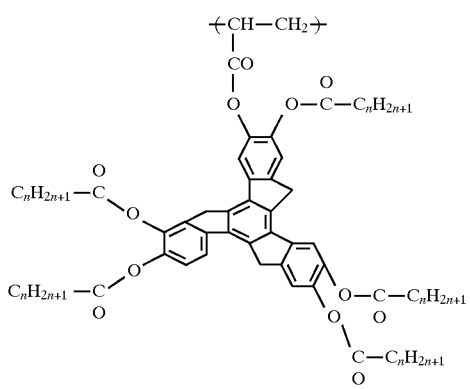
wherein n is an integer of 1–18, preferably 3–14.
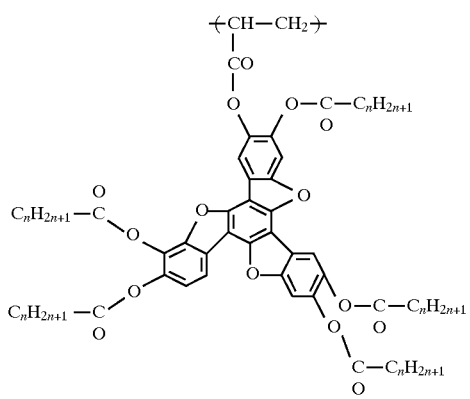
wherein n is an integer of 1–18, preferably 3–14.
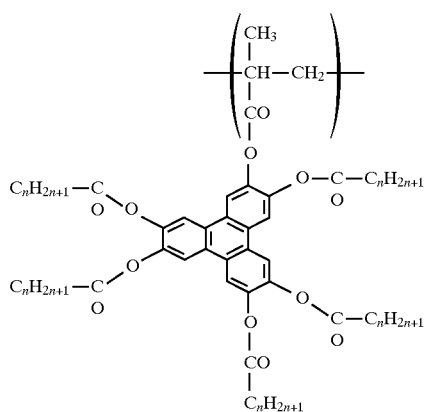
144
wherein n is an integer of 1–18, preferably 3–14.
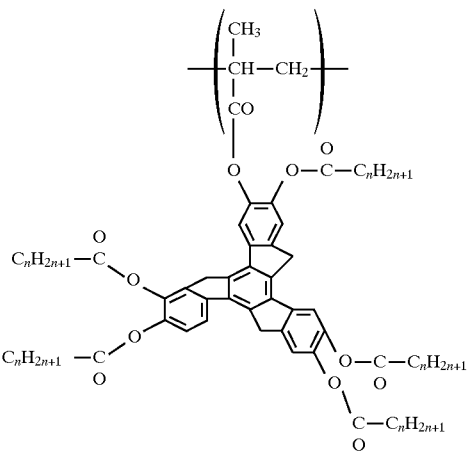
wherein n is an integer of 1–18, preferably 3–14.
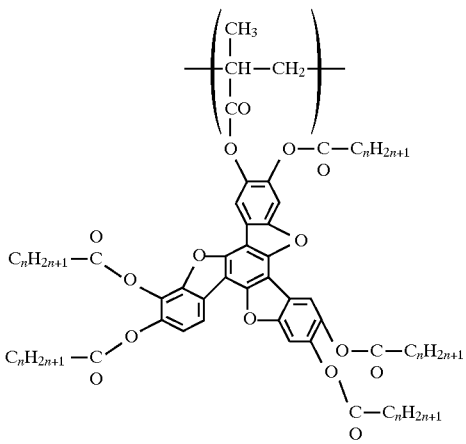
wherein n is an integer of 1–18, preferably 3–14.
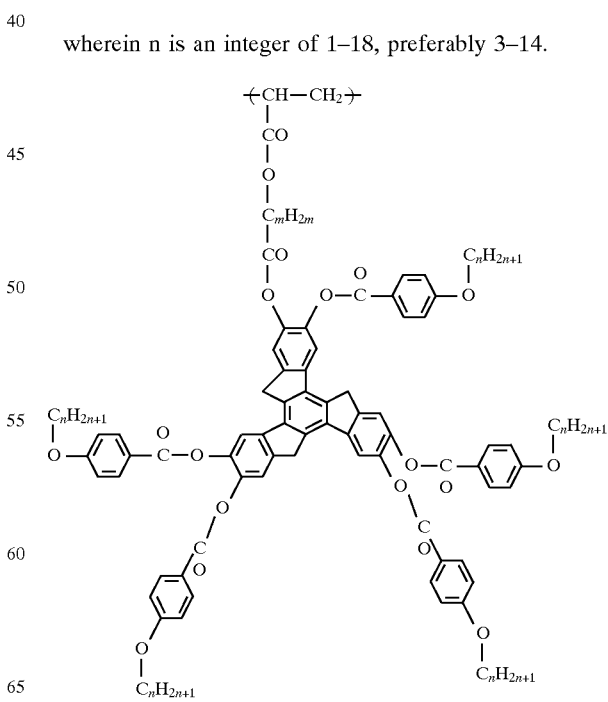

wherein n is an integer of 1–18, preferably 3–14. m is an integer of 2–16, preferably 4–12.

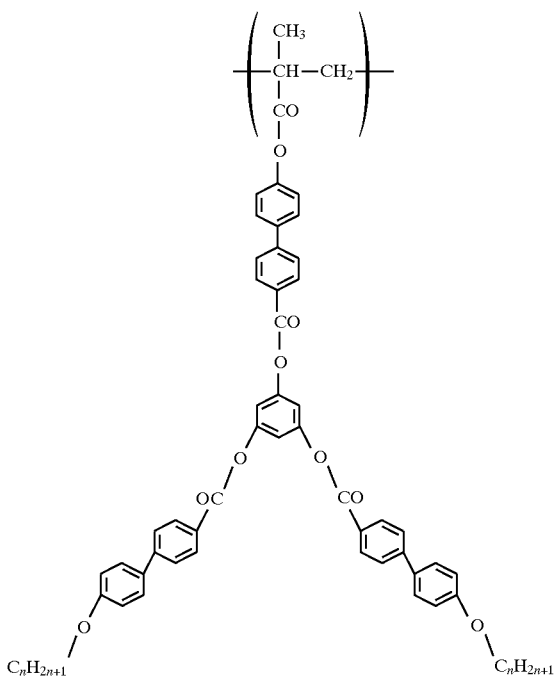

wherein n is an integer of 1–18, preferably 3–14.

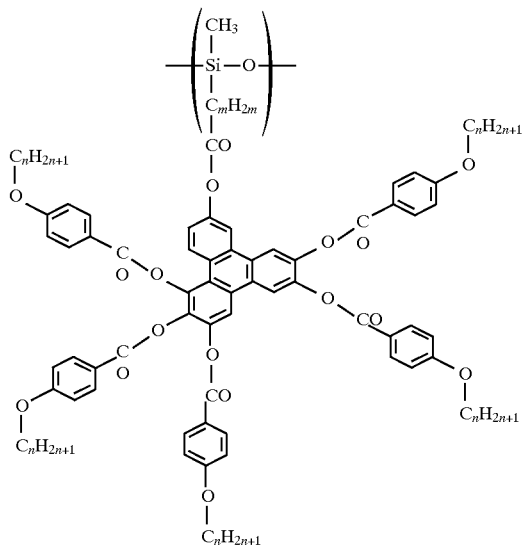

wherein n is an integer of 1–18, preferably 3–14. m is an integer of 2–16, preferably 4–12.

The average molecular weight of the above polymers are 5,000–100,000.

The structural formulas shown above are typical examples of discotic liquid crystalline compounds employable in the invention and there is made no limitation thereto. Discotic liquid crystalline compounds of any structure may each be used alone or in the form of a composition in so far as they possess any of the foregoing properties.

As the discotic liquid crystalline material, in order to avoid transition from liquid crystal phase to crystal phase, there is used a compound wherein all of plural substituent groups attached to mesogen are different. When a compound wherein all of the substituent groups are the same, it is desirable to use the compound as a composition with at least one another compound different (in mesogen and/or substituent groups) from the compound.

Most of the discotic liquid crystalline compounds contain many ether linkages or ester linkages in the molecule. Known reaction methods are adoptable for the formation of those linkages. For example, for the formation of ether linkages, there may be adopted the Williamson method involving a nucleophilic substitution reaction of alkoxide ion with a primary alkyl halide. For the formation of ester linkages there may be used, for example, an acid chloride method involving reaction of an acid chloride with alcohol, or a deacetylation reaction which is the reaction of an acetylated compound of alcohol with an acid. There is no special limitation. Each discotic crystalline compound employable in the invention is not required to undergo a reaction control such as selecting a substituent group at each substitution site of a discogen constituting compound. For example, therefore, though a concrete description of a structural formula is difficult, it is possible to react in a single reaction system the discogen constituting compound with compounds capable of becoming a variety of substituent groups in a larger number than the number of substitution sites of the discotic liquid crystalline compound to afford a discotic liquid crystalline compound or a composition containing the said compound. In this case it is possible that a certain substituent group will not be bonded in the molecule of a certain discogen constituting compound but be bonded in the molecule of another compound. In the present invention, since the transition from liquid crystal phase to crystal phase is not desirable, the use of such various kinds of substituent groups as mentioned above is preferred, for example, in deteriorating the symmetricity of the molecular structure. Preferably, the discotic liquid crystalline material used in the present invention is substantially constituted by only the discotic liquid crystalline compound explained above.

For obtaining a compensating film with a uniformly fixed hybrid orientation, using the above discotic liquid crystalline material, it is desirable in the invention to use a substrate which will be described below and go through the following steps.

Reference will be made first to the substrate (hereinafter referred to as "alignment").

In order to obtain the hybrid orientation in the invention it is preferred that the layer of the discotic liquid crystalline material be sandwiched in between different upper and lower interfaces. If the layer is sandwiched in between the same upper and lower interfaces, the orientation at the upper interface of the layer and that at the lower interface of the layer will become the same, thus making it difficult to obtain the hybrid orientation.

According to a concrete embodiment, alignment substrate and an air interface are utilized and the lower surface of the discotic liquid crystalline layer is brought into contact with the alignment substrate, while the upper surface thereof is contacted with the air. It is also possible to use upper and lower substrates of different substrates, but in point of manufacturing process it is preferable to use a single substrate and an air interface.

The alignment substrate employable in the present invention preferably has anisotropy so that a tilting direction of liquid crystal (projection of directors to the alignment substrate) can be defined. If the alignment substrate used cannot define the tilting direction of liquid crystal, there will be obtained only a disorderly tilted structure (disordered vectors of projected directors to the substrate).

As the alignment substrate, one having anisotropy in a plane is preferred. Examples are film substrates of plastics such as polyimides, polyamide-imides, polyamides, polyether ketones, polyketone sulfides, polyether sulfones, polysulfones, polyphenylene sulfides, polyphenylene oxides, polyethylene terephthalates, polybutylene terephthalates, polyethylene naphthalates, polyacetals, polycarbonates, polyarylates, acrylic resins, polyvinyl alcohols, polypropylenes, cellulosic plastics, epoxy resins, and phenolic resins, uniaxially stretched film substrates thereof, metallic substrates such as aluminum, iron and copper substrates with slits formed in the surfaces thereof, and glass substrates such as alkali glass, borosilicate glass and flint glass substrates having etched slits in the surfaces thereof.

The substrates exemplified above may have been subjected to a surface treatments such as a hydrophilicizing or hydrophobicizing treatment. Also employable are rubbing-treated plastic film substrates obtained by rubbing the plastic film substrates exemplified above, as well as the above-exemplified substrates having rubbing-treated plastic films such as, for example, rubbing-treated polyimide films and rubbing-treated polyvinyl alcohol films. Further employable are the above-exemplified substrates having an oblilquely vapor-deposited film of silicon oxide.

Among the above various alighment substrates, as examples of those suitable for forming such a hybrid orientation of discotic liquid crystal as in the present invention there are mentione substrates having a rubbing-treated polyimide film, as well as rubbing-treated polyimide, polyether ether ketone, polyether ketone, polyether sulfone, polyphenylene sulfide, polyethylene terephthalate, polyethylene naphthalate and polyarylate substrates, further, cellulosic plastic substrates. In the compensating film of the present invention, the angle of the discotic liquid crystal directors relative to the film plane is different between the upper surface and the lower surface of the film. At the substrate-side film surface the said angle can be adjusted in the range of 60° to 90° or in the range of 0° to 50°. In view of the manufacturing process it is preferable that the angle between the discotic liquid crystal directors in the vicinity of the film interface with the orienting substrate be adjusted in the range of 60° to 90°.

The compensating film of the present invention is obtained by applying the foregoing discotic liquid crystalline material onto the alignment substrate and then going through uniform orienting and fixing steps.

The application of the discotic liquid crystalline material can be effected by using a solution of the discotic liquid crystalline material in any of various solvents or by using the said material in a molten condition. But the former, namely, solution application is preferred.

The following description is now provided about the solution application.

A solution containing a predetermined concentation of the discotic liquid crystalline material is prepared by dissolving the same material in a solvent. As the solvent there usually is employed, though depending also on the kind of the discotic liquid crystalline material used, any of halogenated hydrocarbons such as chloroform, dichloromethane, carbon tetrachloride, dichloroethane, tetrachloroethane, trichloroethylene, tetrachloroethylene, chlorobenzene and o-dichlorobenzene, phenols such as phenol and p-chlorophenol, aromatic hydrocarbons such as benzene, toluene, xylene, ethylbenzenemethoxybenzene and 1,2-dimethoxybenzene, as well as acetone, methyl ethyl ketone, ethyl acetate, t-butyl alcohol, glycerol, ethylene glycol, triethylene glycol, hexylene glycol, ethylene glycol monomethyl ether, diethylene glycol dimethyl ether, ethyl cellosolve, butyl cellosolve, γ-butyrolactone, 2-pyrrolidone, N-methyl-2-pyrrolidone, pyridine, triethylamine, dimethylformamide, dimethylacetamide, acetonitrile, butyronitrile, dimethyl sulfoxide, carbond disulfide, and mixtures thereof.

The concentration of the solution cannot be said sweepingly because it depends on the solubility of the discotic liquid crystalline material used and the thickness of the desired compensating film, but usually it is in the range of 1 to 60 wt %, preferably 3 to 40 wt %.

The solution of the discotic liquid crystalline material thus prepared is then applied onto the alignment substrate described above, for example by spin coating method, roll coating method, printing method, dipping/pulling-up method, or curtain coating (die coating) method.

Thereafter, the solvent is removed, allowing a layer of the discotic liquid crystalline material having a uniform thickness to be formed on the substrate. Conditions for removing the solvent are not specially limited if only the solvent can mostly be removed and the material layer does not flow or drop. Usually the solvent is removed by air-drying at room temperature, drying on a hot plate, drying in a drying oven, or the spray of warm or hot air.

This solution applying and drying step intends to form a layer of the discotic liquid crystalline material having a uniform thickness on the substrate, in which stage the liquid crystalline material layer does not form a hybrid orientation yet. For forming a hybrid orientation it is desirable in the present invention to perform the following heat treatment.

The heat treatment is conducted at a temperature of not lower than the liquid crystal transition point of the discotic liquid crystalline material. More specifically, orientation is allowed to take place in the state of liquid crystal of the material. Alternatively, the material is once brought into an isotropic liquid state at a temperature higher than the temperature range in which liquid crystal phase is presented, and thereafter the temperature is dropped to the temperatue range.

The heat treatment temperature is usually in the range of 50° to 300° C., preferably 100° to 250° C.

As to the time required for satisfactory orientation of liquid crystal, it cannot be said sweepingly because it differs depending on the kind of the discotic liquid crystalline material used. But the said time is usually in the range of 5 seconds to 2 hours, preferably 10 seconds to 40 minutes, more preferably 20 seconds to 20 minutes. If the time is shorter than 5 seconds, it is likely that the temperature of the discotic liquid crystalline material layer will not rise up to a predetermined level, resulting in unsatisfactory orientation. A longer time than 2 hours is not desirable because of deterioration of productivity.

Through the above steps it is possible to form a hybrid orientation in the state of liquid crystal.

In the above heat treatment step there may be used a magnetic or electric field for orienting the discotic liquid crystalline material. However, if a magnetic or electric field is applied while heat treatment is performed, a uniform field force acts on the liquid crystalline material layer, so that the liquid crystal layers are apt to face in a certain direction and hence it becomes difficult to obtain the hybrid orientation intended in the invention in which the directors are changed in the film thickness direction. If the field force is removed after an orientation other than the hybrid orientation, e.g. homeotropic orientation or tilt orientation, is formed, it is possible to obtain a thermally stable hybrid orientation.

However, this brings about no special merits in the manufacturing process.

The hybrid orientation in the state of liquid crystal thus obtained is then cooled, whereby the orientation form is fixed without impairment, thus affording the compensating film of the present invention.

Generally, in the case where a crystalline phase appears in the course of cooling, the orientation in the state of liquid crystal is destroyed with crystallization. In contrast therewith, the discotic liquid crystalline material used in the present invention does not have any crystalline phase, or even when it has a crystalline phase latently, the crystal phase does not appear during cooling, or although a clear crystal transition point or liquid crystal transition point is not confirmed, the material does not exhibit fluidity in the working temperature range of the film nor does its orientation form change even under the application of an external field or force. Since the liquid crystalline material used possesses such a property, the orientation form is not destroyed by crystallization.

For cooling, it suffices to take out the discotic liquid crystalline material from the heat treatment atmosphere into the atmosphere of room temperature, whereby the discotic liquid crystal can be fixed uniformly. Forced cooling such as air cooling or water cooling, or slow cooling, may be performed, and no limitation is placed on the cooling speed.

The thickness of the compensating film after the fixing is preferably in the range of 10 nm to 100 $\mu$m, more preferably 100 nm to 50 $\mu$m. If the film thickness is smaller than 10 nm, it will be difficult to obtain a satisfactory optical performance due to small birefringence. If the film thickness exceeds 100 $\mu$m, an orientation defect is apt to occur during production. Thus, both such cases are undesirable.

In the hybrid orientation obtained according to the present invention, the angle in the film thickness direction is set in such a manner that the absolute value of the angle between the film directors and the film plane is in the range of 60° to 90° at one of the upper and lower surfaces of the film, while at the opposite surface it is in the range of 0° to 50°. Adjustment to desired angles can be made by suitably selecting the discotic liquid crystalline material and orienting substrate to be used. Even after formation of the film, adjustment to desired angles can be made by adopting a method of scraping the film surface uniformly or a method of dissolving the film surface uniformly in a solvent. The solvent to be used is suitably selected according to the kind of the discotic liquid crystalline material used and that of the alignment substrate used.

As the method for loading the compensating film thus obtained actually onto an OCB mode driving liquid crystal cell there may be adopted any of the following three methods: ① using the compensating film alone, ② using the compensating film as formed on the alignment substrate, ③ laminating the compensating film to another substrate different from the alignment substrate.

In the case of using the compensating film alone, the alignment substrate is peeled from the film at the interface, for example by ① a mechanical peeling method using rolls, ② a method involving dipping in a poor solvent which is poor for all of the constituent materials and subsequent mechanical peeling, ③ a peeling method using an ultrasonic wave in a poor solvent, ④ a peeling method which utilizes a temperature change based on the difference in thermal expansion coefficient between the alignment substrate and the film, or ⑤ a method of dissolving off an alignment film formed on the alignment substrate. Since the peelability differs depending on the adherence between the discotic liquid crystalline material used and the alignment substrate used, there should be adopted a method most suitable for the system used.

Next, in the case of using the compensating film as formed on the alignment substrate, if the alignment substrate is transparent and optically isotropic, or if the alignment substrate is a necessary component for a desired OCB mode liquid crystal display, the laminate of the alignment substrate and the film may be used as it is as a compensating element for the desired OCB mode liquid crystal display.

The compensating film of the present invention obtained by orientation-fixing the discotic liquid crystalline material on the alignment substrate may be peeled from the substrate, then laminated to another substrate more suitable for an optical use, and the resulting laminate constituted at least by both film and another substrate different from the alignment substrate may be used as a compensating element for an OCB mode liquid crystal display.

For example, in the case where the alignment substrate used is necessary for obtaining the hybrid orientation form but exerts an undesirable influence on an OCB mode liquid crystal display, the substrate may be removed from the compensating film after fixing the orientation form. More specifically, there may be adopted the following method.

A substrate (hereinafter referred to as the "second substrate") suitable for a liquid crystal element to be incorporated in a desired OCB mode liquid crystal display and the compensating film on the alignment substrate are affixed together using an adhesive or a pressure-sensitive adhesive. Next, the alighment substrate and the compensating film are peeled from each other at the interface, and the compensating film is transferred onto the second substrate side, whereby the compensating element can be produced.

The second substrate to be used for the transfer is not specially limited if only it has a moderate flatness, but a glass substrate or a transparent plastic film having optical isotropy is preferred. As examples of such a plastic film there are mentioned films of polymethacrylates, polystyrenes, polycarbonates, polyether sulfones, polyphenylene sulfides, polyarylates, amorphous polyolefins, triacetyl cellulose, and epoxy resins. Particularly preferred are films of polymethyl methacrylates, polycarbonates, polyarylates, triacetyl cellulose, and polyether sulfones. Even in the case of an optically anisotropic film, it may be used as it is if it is a necessary component for the desired liquid crystal display. Examples of such an optically anisotropic film include retardation films obtained by stretching such plastic films as polycarbonate and polystyrene films, as well as polarizing films.

As a further example of the second substrate, mention may be made of a driving liquid crystal cell itself. The liquid crystal cell employs two upper and lower glass or plastic substrates each provided with an electrode. By transferring the compensating film of the invention onto one or both of the upper and lower glass or plastic substrates, the incorporation thereof in the liquid crystal display is completed. Of course, it is possible to prepare the compensating film of the invention by using as an alignment substrate(s) the glass or plastic substrate(s) itself which constitutes the driving liquid crystal cell.

The adhesive or pressure-sensitive adhesive for affixing the second substrate for transfer and the compensating film of the invention to each other is not specially limited insofar as it is of an optical grade. For example, there may be used an adhesive or pressure-sensitive adhesive prepared from acrylic resin, epoxy resin, ethylenevinyl acetate copolymer, rubber, urethane resin, or a mixture thereof. The adhesive used may be a thermosetting type, photocuring type, or electron beam curing type, provided it is necessary for the adhesive to possess optical isotropy.

By the transfer onto the second substrate described above it is possible to obtain a compensating element wherein the angle between the discotic liquid crystal directors located near the film interface on the second substrate side and the film plane is in the range of 0° to 50°.

On the surface of the compensating film according to the present invention there may be disposed a protective film such as a transparent plastic film for surface protection.

The compensating film thus obtained is incorporated in an OCB mode liquid crystal display in such an arrangement as will be described below and it can thereby exhibit compensating effects, namely, color compensation and viewing angle compensation, for the driving liquid crystal cell used in the liquid crystal display. A single or plural sheets, preferably one or two sheets, more preferably two sheets, of the compensating film are used, whereby satisfactory compensating effects can be exhibited.

Reference will be made first to color compensation using the compensating film of the present invention. For effecting color compensation, it is required that an apparent retardation (hereinafter referred to as "in-plane retardation") of the compesating film when seen from the front and an in-plane retardation induced by the liquid crystal orientation in the driving liquid crystal cell of OCB mode corresponding to black display be equal to each other in terms of their absolute values and that the respective slow axes be substantially orthogonal to each other. The slow axis of an in-plane retardation of the driving liquid crystal cell is usually parallel to the direction of an orienting treatment such as rubbing treatment on the substrate. On the other hand, the in-plane retardation of the compensating film according to the present invention is such that the direction obtaine when the discotic liquid crystal directors are projected in the film plane corresponds to an apparent fast axis, while the in-plane direction perpendicular to the said axis corresponds to a slow axis. That is, a satisfactory color compensating effect is exhibited by arranging the substrate orienting treatment direction in the driving liquid crystal cell and the direction obtained upon projction of the compensating film directors in the film plane approximately in parallel with each other or approximately counterparallel-wise.

In the case of using plural sheets of the compensating film, a satisfactory color compensating effect is exhibited by making the slow axes of the plural films orthogonal to that of the driving cell and by setting the sum total of retardation absolute values of the films at a value almost equal to the absolute value of in-plane retardation of the liquid crystal cell.

The retardation of the driving liquid crystal cell in black display cannot be said sweepingly because it differs depending on the gap in the liquid crystal cell used, driving conditions, and whether the cell is to be used in normally white mode or in normally black mode. But against a monochromatic light the retardation in question is usually in the range of 20 nm to 1000 nm, preferably 50 nm to 800 nm, and more preferably 80 nm to 500 nm.

Next, a description will be given of viewing angle compensation using the compensating flm of the present invention. The arrangement of the compensating film for effecting the viewing angle compensation to a satisfactory extent is substantially limited to the arrangement adopted above for attaining a satisfactory color compensating effect, which arrangement, however, is also suitable for the exhibition of viewing angle compensation. More particularly, the liquid crystal directors in the driving liquid crystal cell are present in the zx plane in FIG. 1 and vary in the thickness direction. Likewise, the directors of the compensating film in question are also present in the zx plane and vary in the thickness direction. In FIG. 1, therefore, an optically rotatory dispersion induced in the liquid crystal cell by light which travels along the yz plane can be cancelled by the compensating film, so that the viewing angle in the plane direction becomes wider.

On the other hand, against light traveling along the zx plane in FIG. 1, the liquid crystal cell does not cause an optically rotatory dispersion, nor does the compensating film cause such a dispersion. Thus, the compensating film of the present invention does not exert any bad influence on the driving liquid crystal cell used in the liquid crystal display of OCB mode.

Further, in the zx plane direction in FIG. 1, the refractive index anisotropy of the rod-like liquid crystal in the liquid crystal cell can be compensated by the refractive index anisotropy of the discotic liquid crystal in the compensating film and therefore the widening of the viewing angle can be attained also in the zx plane direction.

For viewing angle compensation using the compensating film of the invention there is no special limitation on other optical parameters if only the foregoing arangement condition relating to color compensation is satisfied. In the case where only viewing angle compensation is to be made by the compensating film of the invention, it is not necessary to meet the arrangement condition relating to color compensation. It is more preferable that the absolute value of the product of liquid crystal birefringence and film thickness be approximately equal between the driving liquid crystal cell and the compensating film. The "birefringence" as referred to herein indicates the anisotropy of refractive index inherent in the liquid crystal. More particularly, it indicates a difference between a refractive index in the optical axis direction obtained in a uniaxial orientation wherein the liquid crystal directors face in one direction and a refractive index in a direction prependicular thereto. The product of the birefringence and film thickness is usually in the range of 100 nm to 300 nm, preferably 200 nm to 2,000 nm, more preferably 300 nm to 1,500 nm in absolute value. In the case of using plural sheets of the compensating film, it is desirable that the value obtained by totaling the absolute values of the products of compensating film birefringence and film thickness be within the aforesaid range. However, it is not always necessary that the value obtained by multiplying birefringence by film thickness be completely coincident between the driving liquid crystal cell and the compensating film. Even when there is a great difference between the two, there is obtained an outstanding viewing angle compensating effect as compared with the case where the compensating film of the invention is not incorporated in the cell. On the other hand, a high accuracy is required for the matching between the driving liquid crystal cell for OCB mode and the compensating film to exhibit the foregoing color compensating effect.

If the arrangement of the compensating film of the invention and the liquid crystal cell is shown schematically from the standpoint of exhibiting the above-mentioned color and viewing angle compensating effects, there can be illustrated such patterns as in FIG. 4. In all of the patterns, directors of a nematic liquid crystal in the driving liquid crystal cell for OCB mode (nearly coincident with the molecular major axis direction) and directors of the discotic liquid crystal molecules are all present in the zx plane. The patterns (a), (b)

and (c) in FIG. 4 each employ one sheet of the compensating film (although in FIG. 4 the film is positioned on the upper surface of the driving liquid crystal cell, it may be disposed on the lower surface side), the patterns (d), (e), (f) and (g) each employ two sheets of the compensating film, which are positioned on the upper and lower surfaces, respectively, of the liquid crystal cell. The patterns (h), (i), (j) and (k) each employ two sheets of the compenating film in a superimposed fashion (although in FIG. 4 the films are positioned on the upper surface of the liquid crystal cell, they may be disposed on the lower surface side). The illustrated patterns constitute no limitation. Of the illustrated patterns, however, the patterns (e) and (i) are particularly preferred in exhibiting satisfactory color and viewing angle compensating effects.

The above-described arrangement conditions for the compensating film relative to the OCB mode driving liquid crystal cell are substantially the same between the case where the compensating film is used as it is on the alignment substrate and the case where it is transferred onto the second substrate.

Under the arrangement conditions described above the compensating film of the invention is incorporated in the OCB mode liquid crystal display. As to the other components of the liquid crystal display than the compensating film to be incorporated in the same display such as, for example, polarizing plates and the driving liquid crystal cell for OCB mode, there is no special limitation. But reference will be made below to arrangement conditions and materials of those components.

The arrangement of polarizing plates is usually the same as in FIG. 1. More specifically, the angle of a transmission axis of each polarizing plate relative to the projection direction of the liquid crystal directors in the liquid crystal cell to the cell substrate is approximately 45° or 135°. Upper and lower polarizing plates are in a relation such that their transmission axes are nearly orthogonal to each other. A deviation from the orthogonal condition of the upper and lower polarizing plates is usually within ±20°, preferably within ±10°.

The driving liquid crystal cell for OCB mode is obtained by sandwiching a nematic liquid crystalline material in between two electrode substrates which have been subjected to an alignment treatment. As the electrode substrates there may be used, for example, glass or plastic substrates having electrically conductive layers of ITO, transistor thin film electrodes or diode thin film electrodes. An alignment film is disposed on each of the electrode substrates. Usually a rubbing-treated polyimide or polyvinyl alcohol film is used as the alignment film. An obliquely vapor-deposited film of silicon oxide is also employable as the alignment layer.

When one or plural sheets of the compensating film according to the present invention are used, the film exhibits the greatest effect in improving the viewing angle of the driving liquid crystal cell used in the OCB mode liquid crystal display. It is also possible to use conventional optical films in combination such as, for example, an optical film having a negative uniaxial refractive index structure, an optical film having a positive unixial refractive index structure and an optical film having a biaxial refractive index structure. Further, the polarizing plates may be combined with polarizing plates whose viewing angle dependency has been improved. However, it is the compensating film of the present invention that plays a decisive role in the compensation. No matter how conventional optical films alone may be combined, it is impossible to obtain such excellent compensating effects as attained by the compensating film of the present invention.

Thus, the OCB mode liquid crystal display incorporating the compensating film of the invention therein can attain a high contrast ratio and a wide viewing angle so far not obtainable.

The drivig liquid crystal cell used in the coventional OCB mode liquid crystal display, for obtaining as wide a viewing angle as possible, has encountered a limit on the parameter setting range for the liquid crystal cell. In contrast therewith, the compensating film of the present invention permits easy control of the orientation form and can compensate almost completely for the liquid crystal cell of any optical parameters. Consequently, the freedom of parameter setting for a liquid crystal cell becomes wider. Thus, also from the standpoint of industrial production of the driving liquid crystal cell used in an OCB mode liquid crystal display, the value of the compensating film according to the present invention is high.

EXAMPLES

Working examples of the present invention will be described below, but the invention is not limited thereto. In the working examples there were used the following analyzing methods.

Determination of Chemical Structure

Determined using H-NMR (JNM-GX400, a product of Japan Electron Optics Laboratory Co., Ltd.).

Observation with Optical Microscope

Orthoscope observation and conoscope observation were conducted using a polarizing microscope BX-50 (a product of Olympus Optical Co., Ltd.). Identification of a liquid crystal phase was performed by texture observation under heating on a Mettler hot stage (FP-80).

Polarization Analysis

Conducted using an ellipsometer DVA-36VWLD (a product of Mizoshiri Kogaku Kogyosho K.K.)

Measurement of Refractive Index

Conducted using an Abbe's refractometer Type-4T (a product of Atago K.K.).

Measurement of Film Thickness

Conducted using mainly a high-precision thin film step measuring instrument ET-10 (a product of Kosaka Kenkyusho K.K.). There also was adopted a method of determining the film thickness on the basis of both interference wave measurement (an ultraviolet-visible-near infrared spectrophotometer V-570 manufactured by Nippon Bunko Co.) and refractive index data.

Example 1

50 mmol of hexahydroxytruxene, 150 mM of p-hexylbenzoic acid chloride and 150 mmol of p-hexyloxybenzoic acid chloride were dissolved in 1 l of dried pyridine and the resulting solution was stirred at 90° C. for 5 hours in a nitrogen atmosphere. Then, the reaction solution was poured into 10 l of water. The resulting precipitate was separated by filtration, washed with 0.1N hydrochloric acid, then with pure water, and dried to afford a discotic liquid crystalline material (a brown powder 68 g) of the following formula (1):

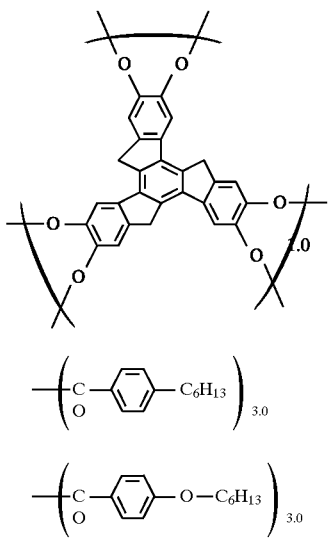

(1)

The right-hand numerals of the parentheses each represent a molar composition ratio This material was observed on the Mettler hot stage to find that the material had schlieren pattern and ND phase, with no crystal phase developed even on cooling. 10 g of the material was dissolved in 40 g of chloroform to prepare a 20 wt % solution. This solution was then applied by the spin coating method onto a glass substrate of 15 cm×15 cm having a rubbing-treated polyimide film, then dried on a hot plate of 80° C., heat-treated in an oven at 250° C. for 30 minutes, thereafter taken out and cooled to yield a compensating film 1 on the transparent substrate.

The thickness of the film was 6.0 μm. the refractive index measurement which will be described later, the birefringence of the discotic liquid crystalline material of the formula (1) was found to be 0.11, and the product of the birefringence and the film thickness was 660 nm.

Polarization analysis was conducted using the ellipsometer to find that an apparent retardation value at the front was 150 nm. A slow axis was found in an in-plane direction of the film perpendicular to the rubbing direction.

Next, the compensating film 1 as formed on the substrate was sandwiched in between crossed polarizers in such a manner that projection vectors of the liquid crystal directors in the compensating film to the film surface and transmission axes of the polarizers are at an angle of 45°. The compensating film 1, together with the substrate, was tilted in the directors' projection vector direction to the film surface (coincident with the rubbing direction) and an apparent retardation value was measured. As a result, there was obtained the graph of FIG. 5. From the value of tilt angle indicating a minimum value of retardation, and taking into account the refractive index to be described below, there was obtained the result that an average tilt angle was 25°. From FIG. 5 it turned out that the liquid crystal directors tilted in such a direction as shown in FIG. 5 relative to the substrate rubbing direction.

Measurement of refractive index was conducted in the following manner.

On a high refractive index glass substrate having a rubbing-treated polyimide film there was formed a compensating film in the same manner as in the formation of the compensating film 1, and the measurement of refractive index was made using the Abbe's refractometer. The glass substrate was placed so as to contact the prism surface of the refractometer and so that the substrate interface side of the compensating film was lower than the air interface side. As a result, there was no anisotropy in in-plane refractive indices and a constant value of 1.67 was obtained. Also in the thickness direction, refractive indices were almost constant and a value of 1.56 was obtained. From this result it turned out that on the glass substrate side disc-like liquid crystal molecules were oriented in parallel with the substrate (directors were perpendicular to the substrate plane). Next, when the substrate was disposed in such a manner that the air interface side of the compensating film was in contact with the prism surface of the refractometer, there were obtained a refractive index of 1.56 in a plane parallel to the rubbing direction and a refractive index of 1.67 in a plane perpendicular to the rubbing direction. In the thickness direction there was obtained a constant value of 1.67 irrespective of the direction of sample. From this result it turned out that on the air interface side the disc-like liquid crystal molecules were oriented in a direction perpendicular to the substrate rubbing direction (directors are parallel to the substrate plane). Such a refractive index structure is also true of the compensating film 1. Now it turns out that the refractive indices peculiar to the compensating film 1 are 1.56 (ne) in a direction parallel to the directors and 1.67 (no) in a direction perpendicular to the directors and that the difference is 0.11.

Two sheets of the compensating film 1 having the above structure were arranged on an OCB cell as in FIG. 6 [corresponding to (d) in FIG. 4]. The OCB cell was obtained by injecting Merck's liquid crystal ZLI-1237 ($\Delta n=0.14$) between ITO electrode substrates having two rubbing-treated polyimide films. The gap between the electrode substrates in this cell was set at 9.0 μm. The liquid crystal cell was driven at 2.2 V, 3.9 V and 6.0 V. With use of the compensating films, there were obtained black at 2.2 V, white at 6.0 V and a half tone at 3.9 V. Apparent in-plane retardations were measured with respect to the liquid crystal cell alone and were found to be 300 nm at 2.2 V and 110 nm at 6.0 V. Viewing angle dependence of transmittance was determined and the results shown in FIG. 7 were obtained. It turned out that the use of the compensating films could afford a liquid crystal display of a wide vertical and horizontal viewing angle.

Example 2

50 mmol of hexaacetoxytriphenylene, 100 mmol of butoxybenzoic acid, 100 mmol of hexyloxybenzoic acid and 100 mmol of octyloxybenzoic acid were stirred vigorously with a mechanical stirrer in a nitrogen atmosphere in a glass flask and a deacetylation was allowed to take place at 280° C. for 8 hours while the stirring was continued to afford a discotic liquid crystalline material of the following formula (2):

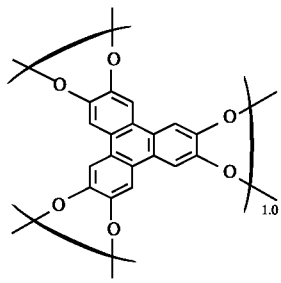

(2)

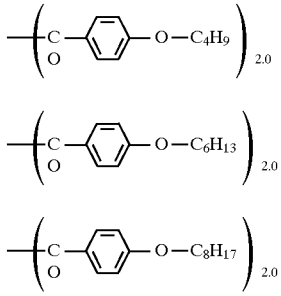

The right-hand numerals of the parentheses each represent a molar composition ratio.

The material thus obtained was observed on the Mettler hot stage to find that it had ND phase and that no crystal phase was developed even on cooling from liquid crystal phase. Further, no fluidity was observed at temperatures below 100° C. A butyl cellosolve solution containing 15 wt % of the liquid crystal material was prepared and then applied by the printing method onto a glass substrate (30 cm square, 1.1 mm thick) having a rubbing-treated polyimide film, then air-dried, heat-treated at 220° C. for 30 minutes, and thereafter cooled to solidify at room temperature. The resulting compensating film 2 on the substrate was tansparent, free of any orientation defect, and had a thickness of 5.4 μm. Refractive index measurement showed that the liquid crystal directors were nearly perpendicular to the alignment substrate on the substrate interface side and nearly parallel to the substrate on the air interface side and that ne=1.56, no=1.65. Thus, the difference in refractive index between no and ne was 0.09 and the product between it and the film thickness was 490 nm. An apparent in-plane retardtion value was 55 nm, and a slow axis was located in an in-plane direction perpendicular to the rubbing direction.

Two sheets of the compensating film 2 having the above structure were arranged on an OCB cell as in FIG. 8 [corresponding to (d) in FIG. 4]. The OCB cell used was the same as that used in Example 1. The liquid crystal cell was driven at 2.2 V, 3.9 V and 6.0 V. With use of the compensating films, there were obtained white at 2.2 V, black at 6.0 V and a half tone at 3.9 V. Viewing angle dependence of transmittance was determined and the results shown in FIG. 9 were obtained. It turned out that the use of the compensating films could afford a liquid crystal display of a wide vertical and horizontal viewing angle.

Example 3

Using two sheets of the film 2 prepared in Example 2, viewing angle dependence was checked at the arrangement shown in FIG. 10 [corresponding to (i) in FIG. 4]. There was used the same OCB cell as that used in Example 1. The liquid crystal cell was driven at 2.2 V, 3.9 V and 6.0 V. With use of the compensating films, there were obtained white at 2.2 V, black at 6.0 V and a half tone at 3.9 V. Viewing angle dependence of transmittance was determined and the results shown in FIG. 11 were obtained. It turned out that the use of the compensating films could afford a liquid crystal display of a wide vertical and horizontal viewing angle.

Example 4

A compound of the following formula (3) was prepared as a discotic liquid crystalline material:

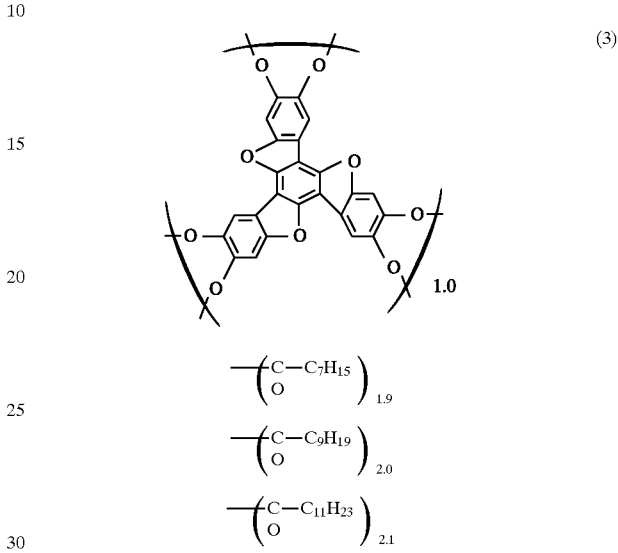

The right-hand numerals of the parentheses each represent a molar composition ratio.

This compound was dissolved in xylene to prepare a 12 wt % solution.

Then, using a roll coater, the solution was applied over a length of 10 m onto a rubbing-treated polyimide film having a width of 25 cm (obtained by rubbing a Du Pont's "kapton" film having a thickness of 100 μm), then dried with 100° C. hot air, heat-treated at 250° C. for 5 minutes and thereafter cooled to solidify, affording a compensating film 3 on the rubbing-treated polyimide film.

Since the polyimide film lacks transparency and involves a problem in its use as a substrate for a compensator, the compensating film 3 was transferred onto a polyether sulfone of an optical grade through a pressure-sensitive adhesive. More specifically, the polyether sulfone which has been applied with the prssure-sensitive adhesive and the film 3 on the rubbing-treated polyimide film were laminated together so that the adhesive layer and the film 3 were in contact with each other, followed by peeling of the rubbing-treated polyimide film.

Due to the transfer operation, the relation between the compensating film 3 and the substrate on the polyimide film and that on the polyetehr sulfone having the adhesive layer are reverse to each other. Directors of the film 3 after peeling are substantially parallel to the film plane on the side contacting the adhesive layer, while on the air side they are nearly perpendicular to the film plane.

The thickness of the film 3 was 3.6 μm. Refractive indices were 1.54 in the director direction and 1.68 in a direction perpendicular to the directors. An apparent inplane retardation was 115 nm.

Two sheets of the compensating film 3 on the polyether sulfone having the pressure-sensitive adhesive were arranged as in FIG. 12 [corresponding to (e) in FIG. 4]. An OCB cell was obtained by injecting Merck's liquid crystal ZL-3277 (Δn=0.16) between ITO electrode substrates having two rubbing-treated polyimide films. The gap between the electrode substrates in this cell was set at 6.5 μm. The liquid crystal cell was driven at voltages in the range of 2.2 V to 6.0 V. With use of the compensating films, there were presented black at 2.0 V, white at 6.0 V and a half tone at intermediate voltages. Apparent in-plane retardations for the liquid crystal cell alone were measured and found to be 230 nm at 2.0 V and 80 nm at 6.0 V. Viewing angle dependence of transmittance was determined and the results shown in FIG. 13 were obtained. It turned out that the use of the compensating films could afford a liquid crystal display of a wide vertical and horizontal viewing angle and not involving gray-scale inversion.

Example 5

As a discotic liquid crystalline material there was used a polymer having a molecular weight of 15,000 and with mesogens couled using the octane diacid unit of the following formula (4):

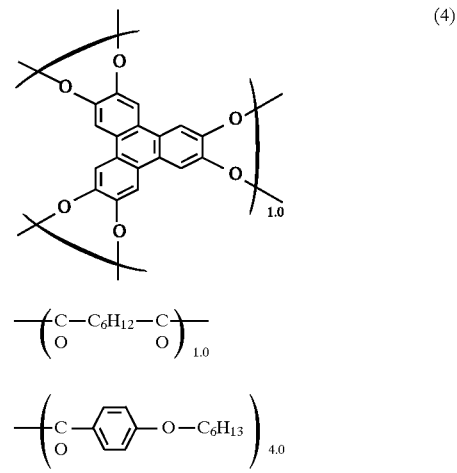

The right-hand numerals of the parentheses each represent a molar composition ratio.

Molecular weight was determined by GPC and in terms of polystyrene. This polymer, not having a crystalline phase, exhibited glass transition at a temperature lower than ND phase. Tg was 65° C. The polymer was then dissolved in a mixed p-chlorophenol/tetrachloromethane solvent (weight ratio: 6:4) under heating to prepare a 16 wt % solution.

The solution thus prepared was applied over a length of 10 m onto a 25 cm wide polyether ether ketone film which had been subjected to a rubbing treatment, by means of a roll coater, then dried with 100° C. hot air, heat-treated at 220° C. for 20 minutes and thereafter cooled to solidify the liquid crystal phase into the glassy state, thereby affording a compensating film 4 on the rubbing-treated polyether ether ketone film.

Since the polyether ether ketone film lacks transparency and involves a problem in its use as a substrate for a compensator, the compensating film 4 was transferred onto a triacetylcellulose film of an optical grade through a pressure-sensitive adhesive. Peeling and transfer operations were the same as in Example 4.

The thickness of the film 4 was 6.1 μm. Directors of the discotic liquid crystal were approximately parallel to the film plane on the side contacting the pressure-sensitive adhesive layer, while on the air side the directors were nearly perpendicular to the film plane. Refractive indices were 1.56 in the director direction and 1.64 in a direction perpendicular to the directors. An apparent in-plane retardation was 40 nm.

Two sheets of the compensating film 4 on the triacetylcellulose film having the pressure-sensitive adhesive layer were arranged as in FIG. 14 [corresponding to (e) in FIG. 4]. There was used the same OCB cell as that used in Example 4. Viewing angle dependence of transmittance was determined and the results shown in FIG. 15 were obtained. It turned out that the use of the compensating films could afford a liquid crystal display of a wide vertical and horizontal viewing angle and not involving gray-scale inversion.

Example 6

Using two sheets of the film 4 prepared in Example 5 and at the arrangement shown in FIG. 16, there was checked viewing angle dependence [corresponding to (h) in FIG. 4]. The OCB cell used was the same as that used in Example 4. Viewing angle dependence of transmittance was determined and the results shown in FIG. 17 were obtained. It turned out that the use of the compensating films could afford a liquid crystal display. of wide viewing angles in both vertical and horizontal directions and not involving gray-scale inversion.

Example 7

As a discotic liquid crystalline material three was used an oligomer composition containing a bifunctional substituent group of the following formula (5):

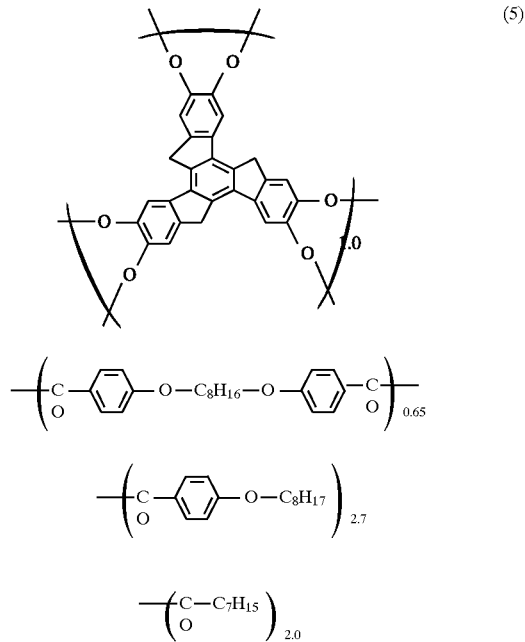

The right-hand numerals of the parentheses each represent a molar composition ratio.

Using the oligomer composition, there was prepared a 15 wt % solution in tetrachloroethane and the solution was applied by the spin coating method onto a glass substrate of 15 cm square having a rubbing-treated polyimide film, then dried on a hot plate of 100° C., heat-treated in an oven at 180° C. for 30 minutes and thereafter taken out into the atmosphere of room temperature for cooling to afford a compensating film 5 on the transparent substrate.

The thickness of the film 5 was 6.5 μm. With respect to the substrate plane, discotic liquid crystal directors were at an angle of 85° on the side contacting the substrate and approximately 0° on the air side. Refractive indices were 1.55 in the director direction and 1.65 in a direction perpendicular to the directors. An apparent inplane retardation was 50 nm.

The compensating film 5 was put on an OCB cell as in FIG. 18 [corresponding to (c) in FIG. 4]. The OCB cell was obtained by injecting Merck's liquid crystal ZLI-1844 (Δn= 0.18) between ITO electrode substrates having two rubbing-treated polyimide films. The gap between the electrode substrates in this cell was set at 4.0 μm. There were used driven voltages of 1.6 V, 3.0 V and 5.0 V. With use of the compensating film 5, there were presented white at 1.6 V, black at 5.0 V and a half tone at 3.0 V. An in-plane retardation of the cell at 5.0 V was 48 nm. Viewing angle dependence of transmittance was determined and the results shown in FIG. 19 were obtained. It turned out that the use of the compensating film 5 could afford a liquid crystal display of a wide vertical and horizontal viewing angle.

EFFECTS OF THE INVENTION

The compensating film according to the present invention with a discotic liquid crystal fixed in the hybrid orientation form exhibits excellent color compensation and viewing angle compensation for an OCB mode liquid crystal display. For attaining as wide a viewing angle as possible, the driving liquid crystal cell used in the conventional OCB mode liquid crystal display has encountered a limit in the parameter setting range in connection with the liquid crystal cell. On the other hand, the compensating film according to the present invention permits easy control of the orientation form and can compensate almost completely for any liquid crystal orientation form. Consequently, the freedom in setting liquid crystal cell parameters becomes wider and thus also form the standpoint of industrial manufacture of the driving liquid crystal cell used in an OCB mode liquid crystal display, the compensating film according to the present invention is of great value.

BRIEF DESCRIPTION OF THE DRAWINGS

1 . . . upper polarizing plate
2 . . . OCB liquid crystal cell
3 . . . upper electrode substrate having a rubbing-treated polyimide film
4 . . . lower electrode substrate having a rubbing-treated polyimide film
5 . . . lower polarizing plate
6 . . . glass substrate having a rubbing-treated polyimide film
7 . . . compensating film 1
8 . . . glass substrate having a rubbing-treated polyimide film
9 . . . compensating film 1
10 . . . transmission axis direction of the upper polarizing plate, (angle to x axis: 45°)
11 . . . rubbing direction of the upper electrode substrate
12 . . . rubbing direction of the lower electrode substrate
13 . . . transmission axis direction of the lower polarizing plate, (angle to x axis: 135°)
14 . . . rubbing direction of the polyimide film
15 . . . rubbing direction of the polyimide film

1 . . . upper polarizing plate
2 . . . OCB liquid crystal cell
3 . . . upper electrode substrate having a rubbing-treated polyimide film
4 . . . lower electrode substrate having a rubbing-treated polyimide film
5 . . . lower polarizing plate
6 . . . glass substrate having a rubbing-treated polyimide film
7 . . . compensating film 2
8 . . . glass substrate having a rubbing-treated polyimide film
9 . . . compensating film 2
10 . . . transmission axis direction of the upper polarizing plate, (angle to x axis: 45°)
11 . . . rubbing direction of the upper electrode substrate
12 . . . rubbing direction of the lower electrode substrate
13 . . . transmission axis direction of the lower polarizing plate, (angle to x axis: 135°)
14 . . . rubbing direction of the polyimide film
15 . . . rubbing direction of the polyimide film

1 . . . upper polarizing plate
2 . . . OCB liquid crystal cell
3 . . . upper electrode substrate having a rubbing-treated polyimide film
4 . . . lower electrode substrate having a rubbing-treated polyimide film
5 . . . lower polarizing plate
6 . . . polyester sulfone film having a pressure-sensitive adhesive layer
7 . . . compensating film 3
8 . . . polyester sulfone film having a pressure-sensitive adhesive layer
9 . . . compensating film 3
10 . . . transmission axis direction of the upper polarizing plate, (angle to x axis: 45°)
11 . . . rubbing direction of the upper electrode substrate
12 . . . rubbing direction of the lower electrode substrate
13 . . . transmission axis direction of the lower polarizing plate, (angle to x axis: 135°)
14 . . . direction corresponding to the rubbing direction of the polyimide film
15 . . . direction corresponding to the rubbing direction of the polyimide film

1 . . . upper polarizing plate
2 . . . OCB liquid crystal cell
3 . . . upper electrode substrate having a rubbing-treated polyimide film
4 . . . lower electrode substrate having a rubbing-treated polyimide film
5 . . . lower polarizing plate
6 . . . triacetylcellulose film having a pressure-sensitive adhesive layer
7 . . . compensating film 4
8 . . . triacetylcellulose film having a pressure-sensitive adhesive layer
9 . . . compensating film 4
10 . . . transmission axis direction of the upper polarizing plate, (angle to x axis: 45°)
11 . . . rubbing direction of the upper electrode substrate
12 . . . rubbing direction of the lower electrode substrate
13 . . . transmission axis direction of the lower polarizing plate, (angle to x axis: 135°)
14 . . . direction corresponding to the rubbing direction of a polyether ether ketone film
15 . . . direction corresponding to the rubbing direction of a polyether ether ketone film

1 . . . upper polarizing plate
2 . . . OCB liquid crystal cell
3 . . . upper electrode substrate having a rubbing-treated polyimide film
4 . . . lower electrode substrate having a rubbing-treated polyimide film
5 . . . lower polarizing plate
6 . . . glass substrate having a rubbing-treated polyimide film
7 . . . compensating film 5
8 . . . transmission axis direction of the upper polarizing plate, (angle to x axis: 45°)
9 . . . rubbing direction of the upper electrode substrate
10 . . . rubbing direction of the lower electrode substrate
11 . . . transmission axis direction of the lower polarizing plate, (angle to x axis: 135°)
12 . . . rubbing direction of the pjolyimide film

Figure 1:
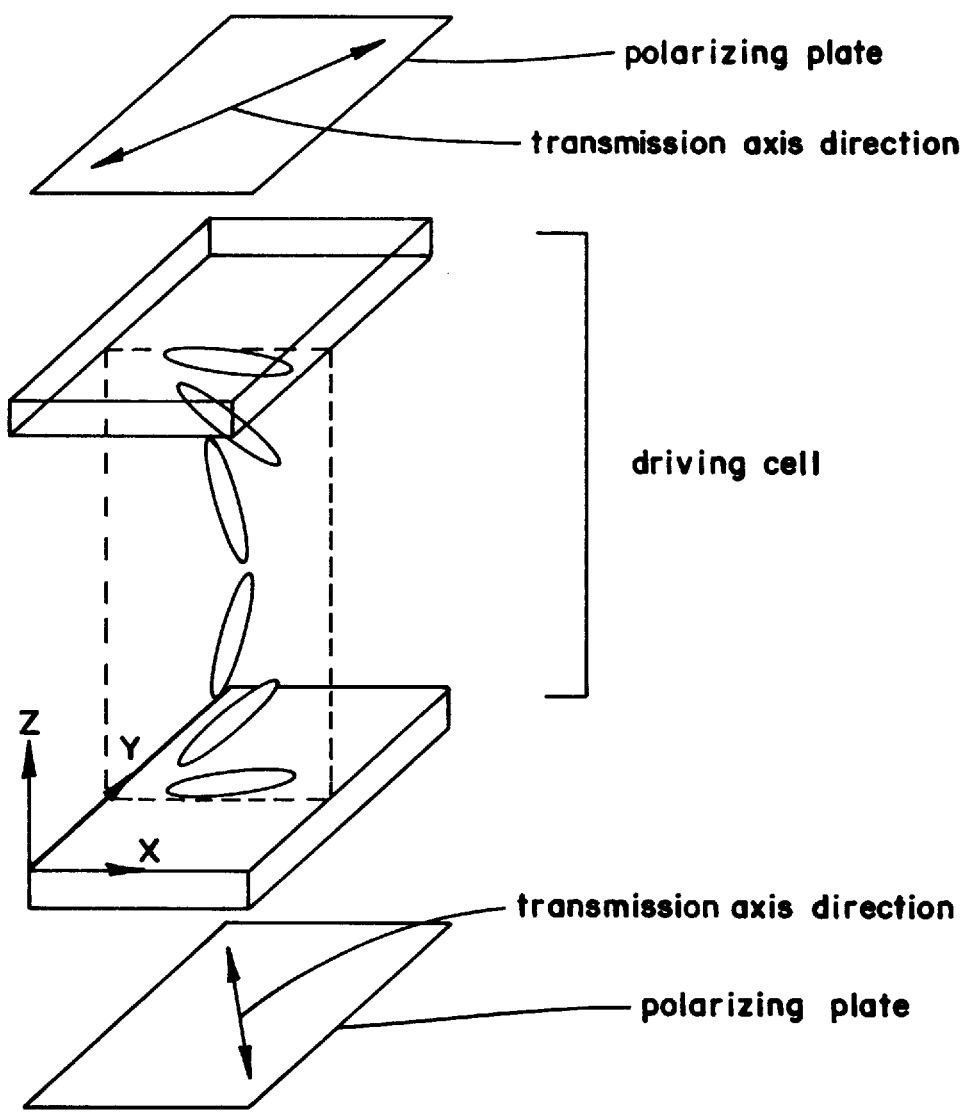
FIG. 1 is a diagram explaining an OCB mode liquid crystal display.
Figure 2:
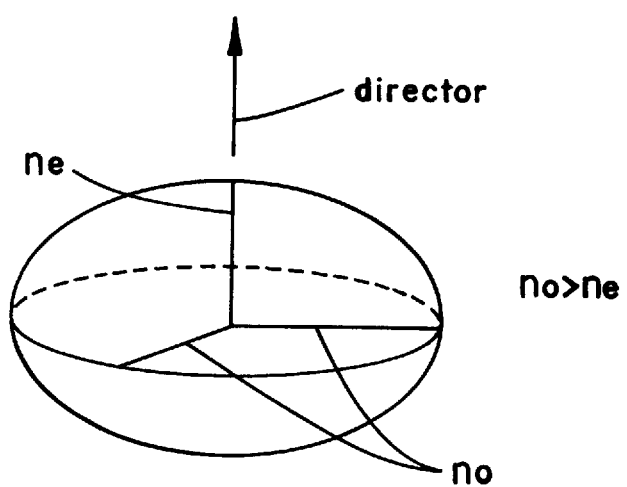
FIG. 2 is a diagram explaining a refractive index distribution peculiar to a discotic liquid crystal and also explaining a director.
Figure 3C:
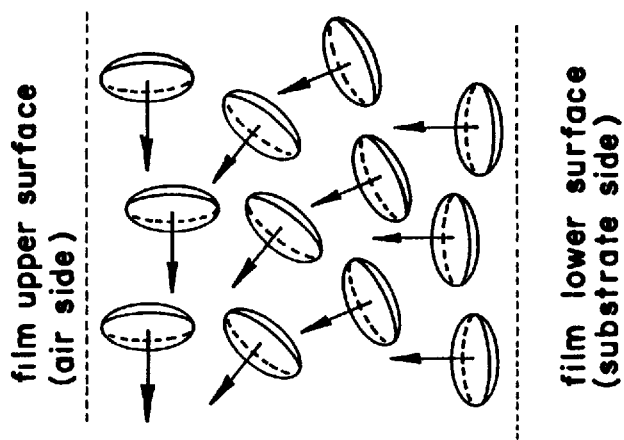
FIG. 3 is a schematic diagram showing possible orientation structures of a discotic liquid crystal. Arrows represent directors. In the same figure, (a) shows a negative uniaxial structure wherein the directors are perpendicular to the substrate plane, (b) shows a negative uniaxial structure wherein the directors tilt a predetermined angle relative to the substrate plane, and (c) shows a hybrid orientation of a compensator according to the present invention in which directors exhibit gradual changes in the thickness direction. The directions of liquid crystal directors indicated with arrows do not have distinction between head and tail, but arrows were used for convenience' sake.
Figure 3B:
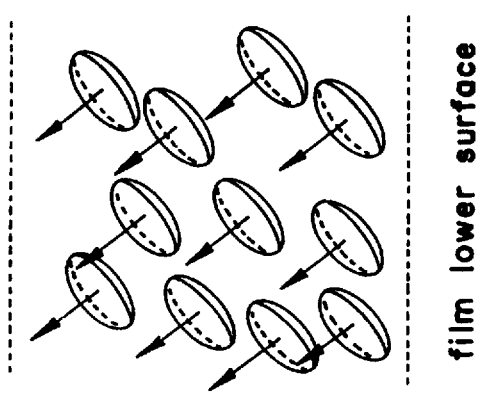
Figure 3A:
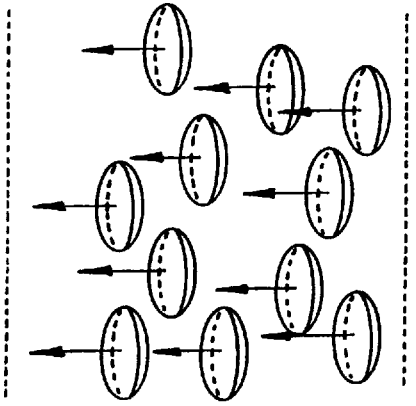
Figure 4G:
FIG. 4 is a schematic diagram explaining typical arrangement examples of compensators. Arrows in the figure represent director directions. Although there is no distinction between head and tail with respect to director directions, arrows were used for convenience' sake.
Figure 4H:
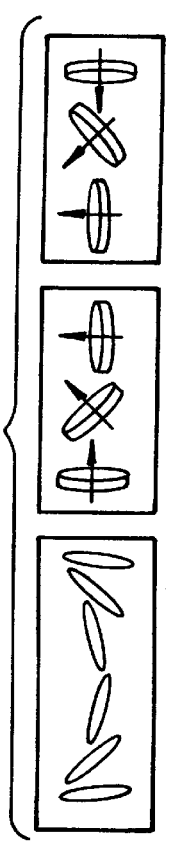
Figure 4I:
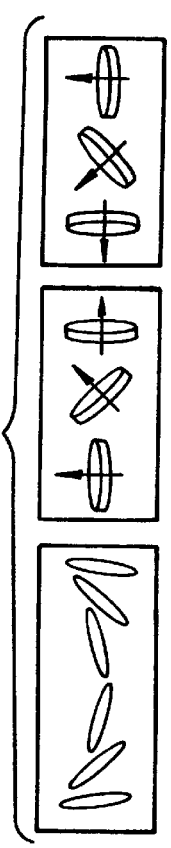
Figure 4J:
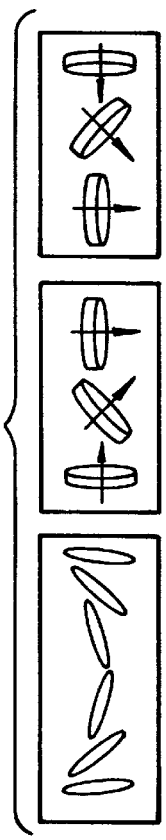
Figure 4K:
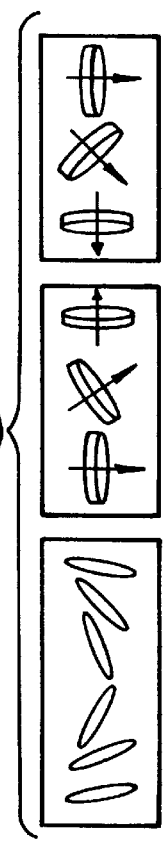
Figure 5:
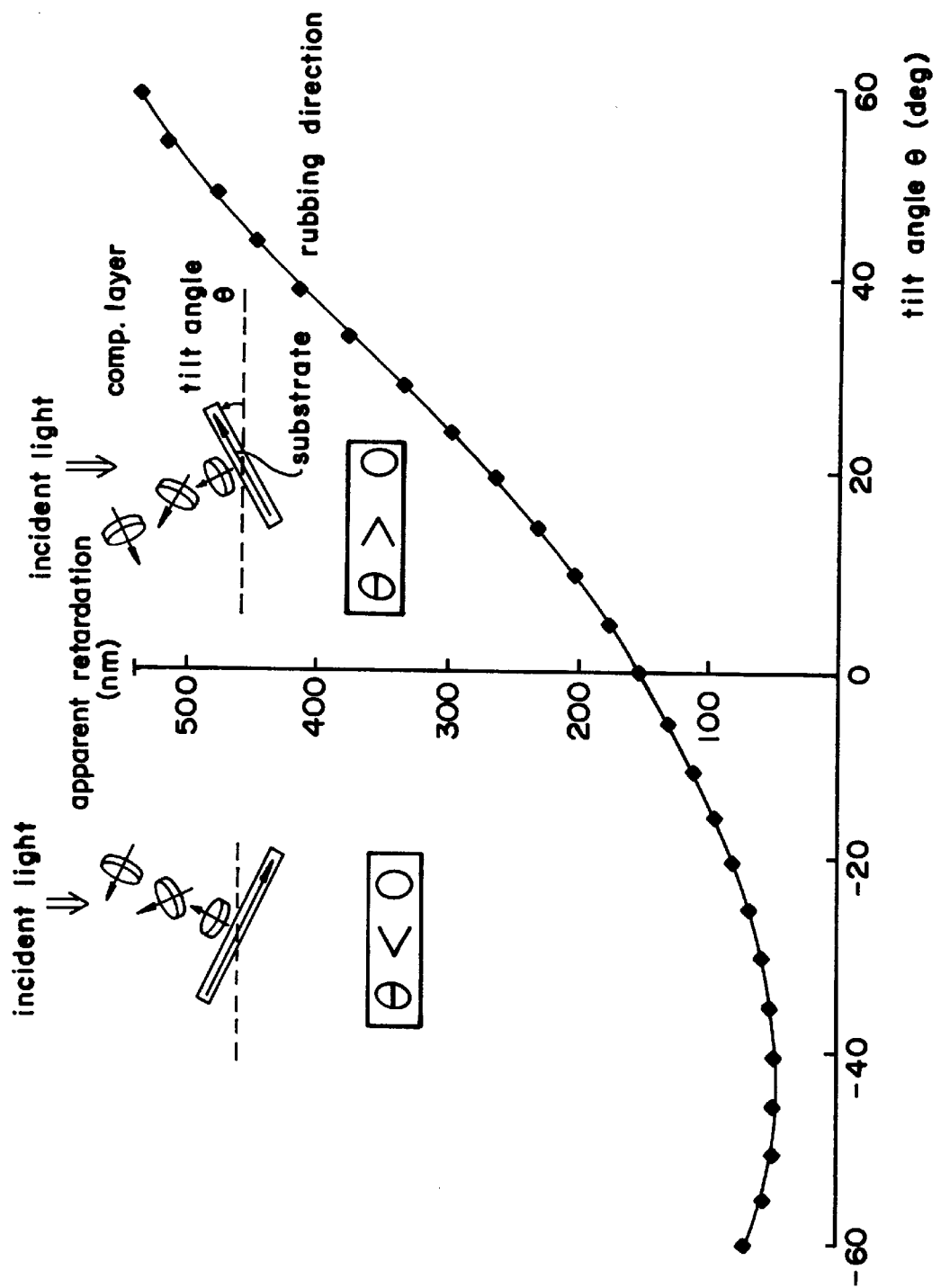
FIG. 5 is a graph showing the results of measurement conducted for measuring an apparent retardation, in which measurement a compensating film as formed on a substrate was tilted in the substrate rubbing direction. Film tilting directions are illustrated in the same figure. The tilting directions of liquid crystal directors shown in the figure have been represented schematically on the basis of the results obtained in the above measurement.
Figure 6:
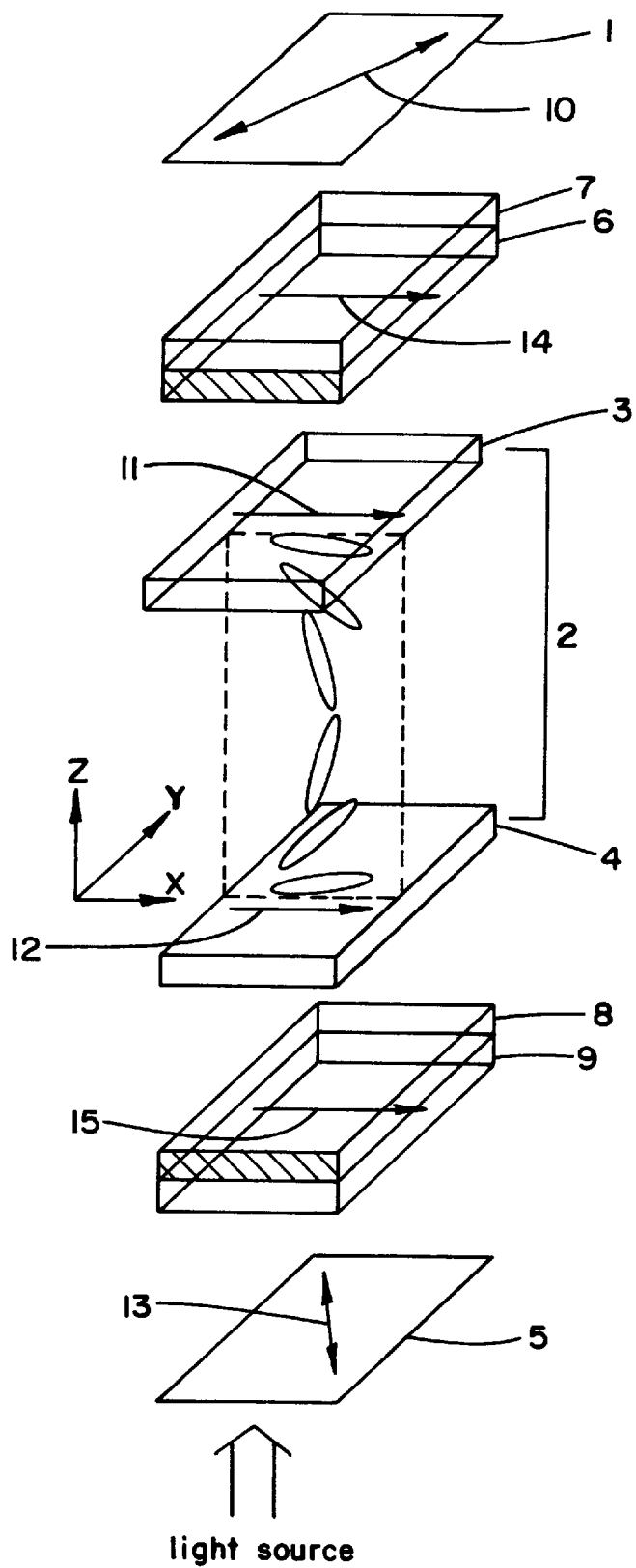
FIG. 6 is a perspective view of the liquid crystal display used in Example 1.
Figure 7A:
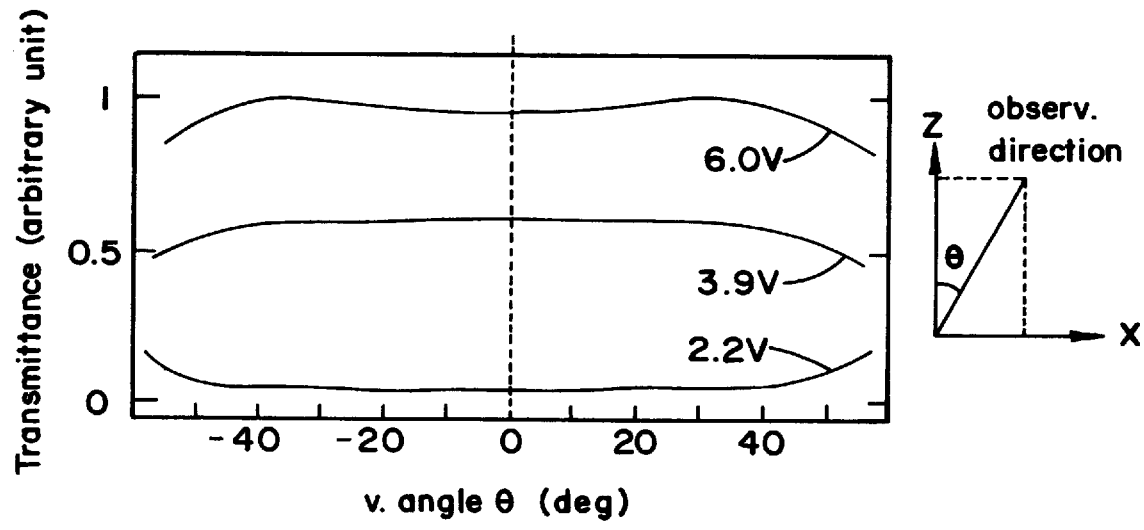
FIG. 7 is a graph showing measurement results of angle dependence of transmittance obtained in Example 1.
Figure 7B:
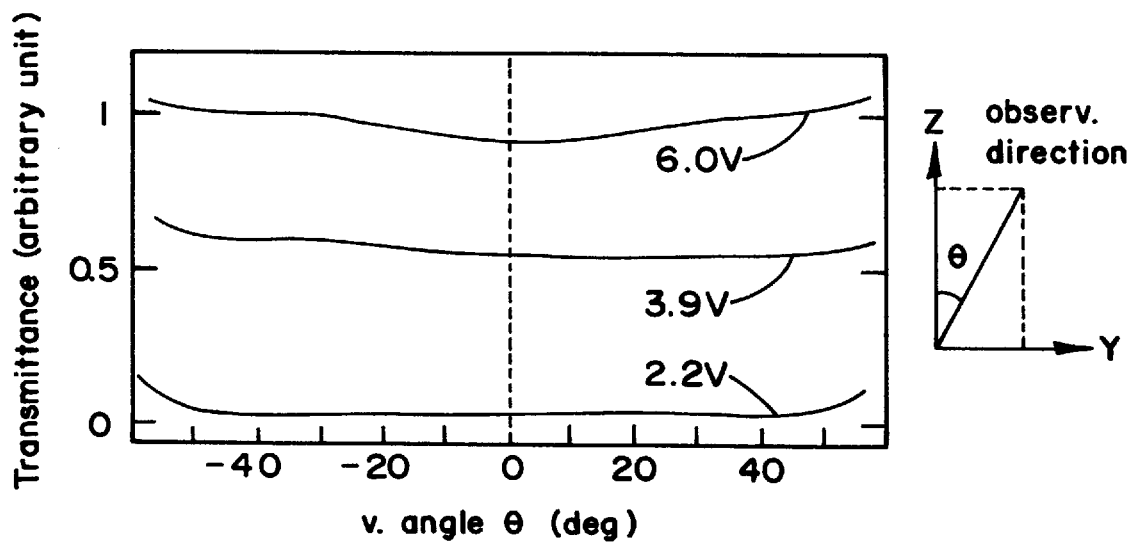
Figure 8:
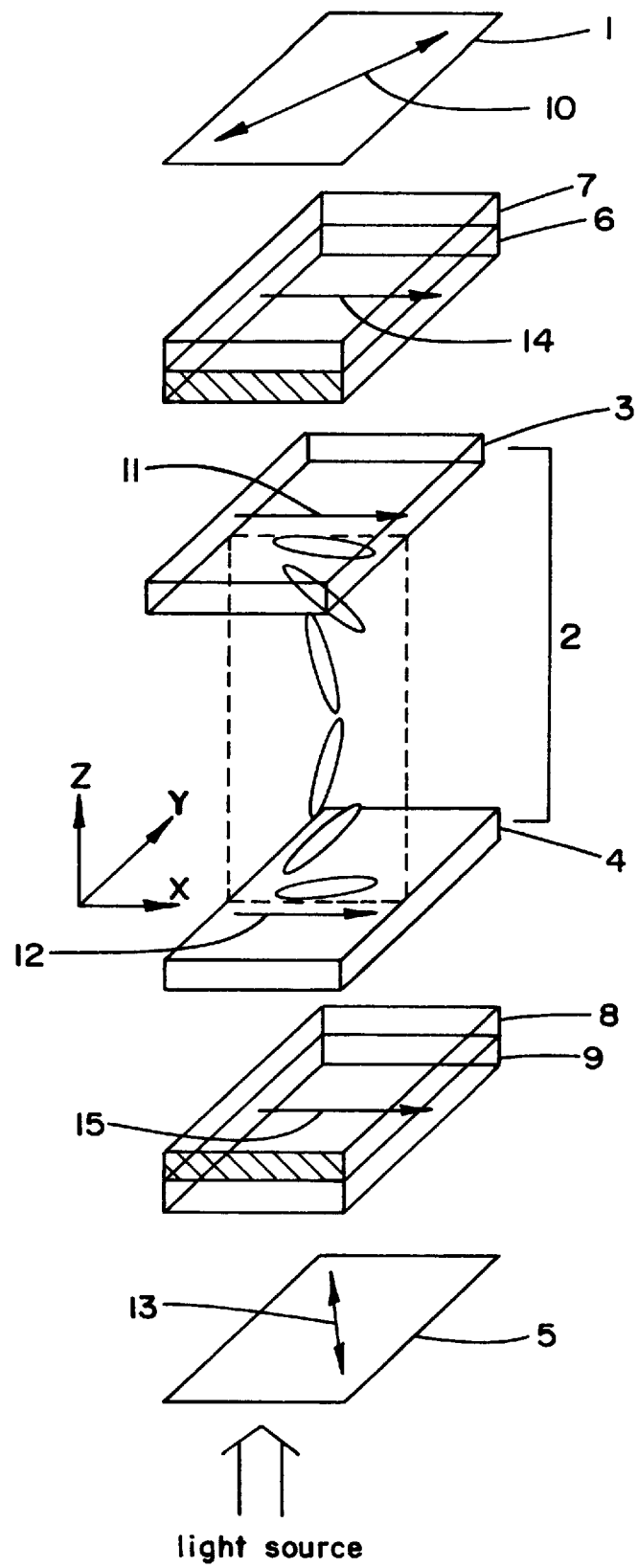
FIG. 8 is a perspective view of the liquid crystal used in Example 2.
Figure 9A:
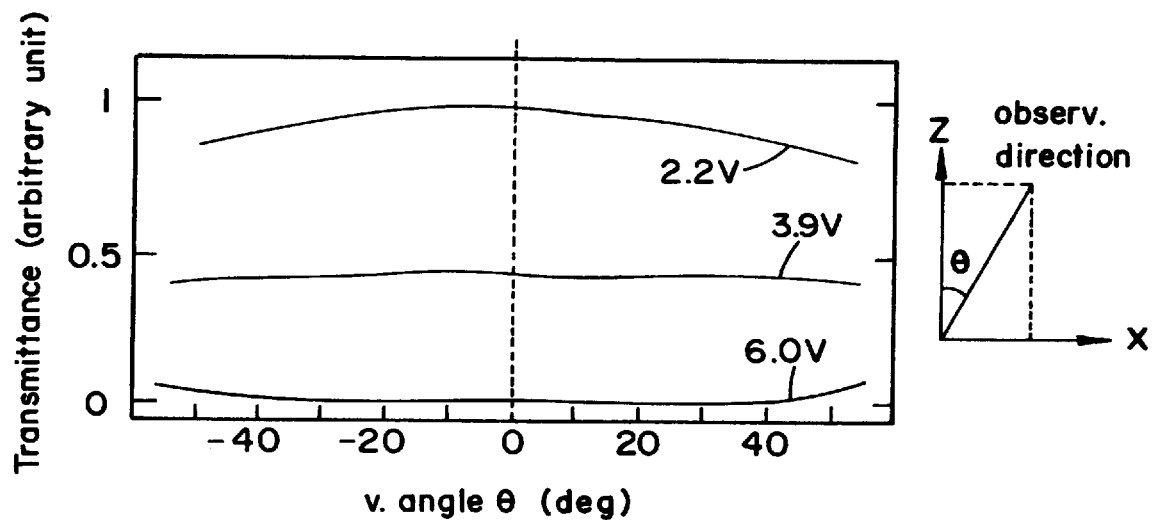
FIG. 9 is a graph showing measurement results of angle dependence of transmittance obtained in Example 2.
Figure 9B:
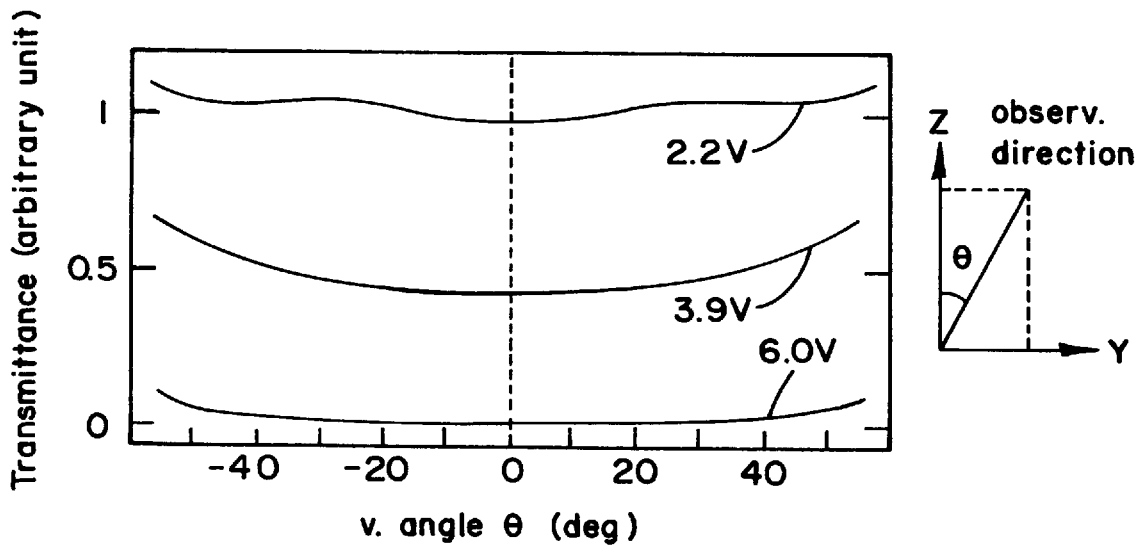
Figure 10:
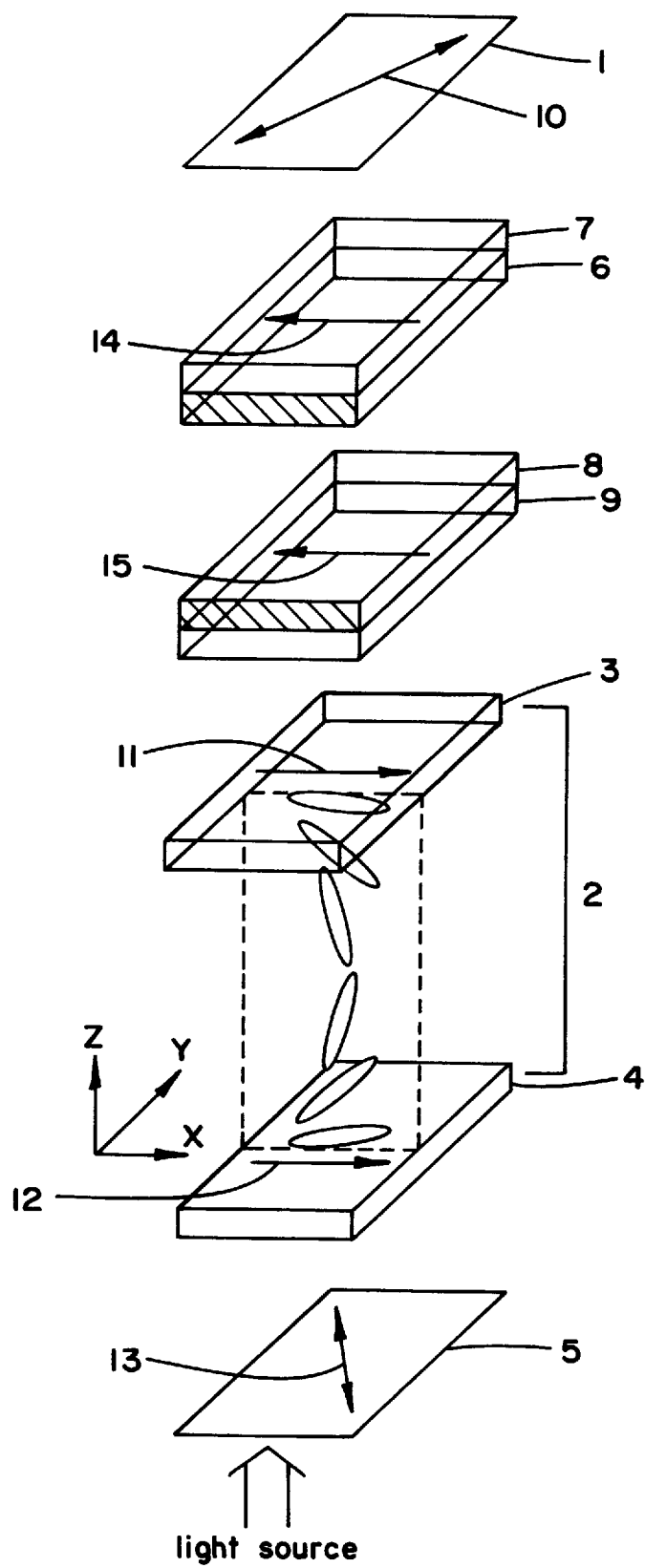
FIG. 10 is a perspective view of the liquid crystal display used in Example 3. The components and reference numerals threof used therein are the same as those used in FIG. 8 which relates to Example 2.
Figure 11A:
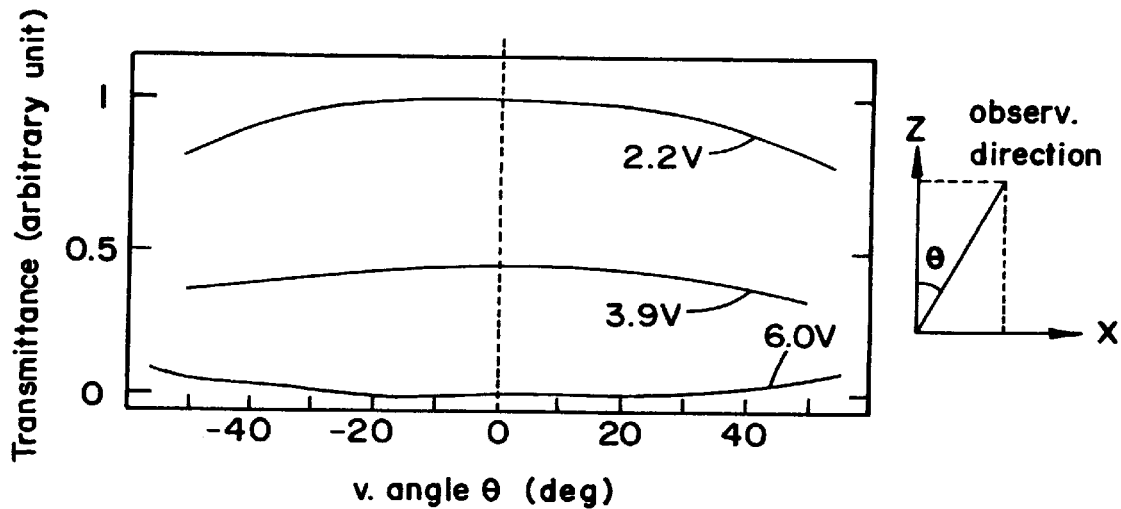
FIG. 11 is a graph showing measurement results of viewing angle dependence of transmittance obtained in Example 3.
Figure 11B:
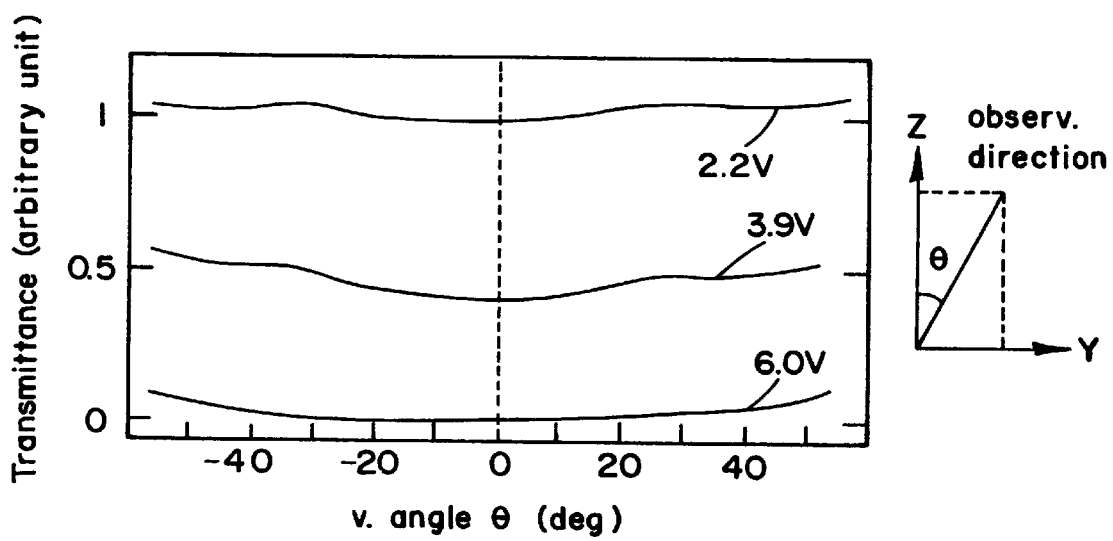
Figure 12:
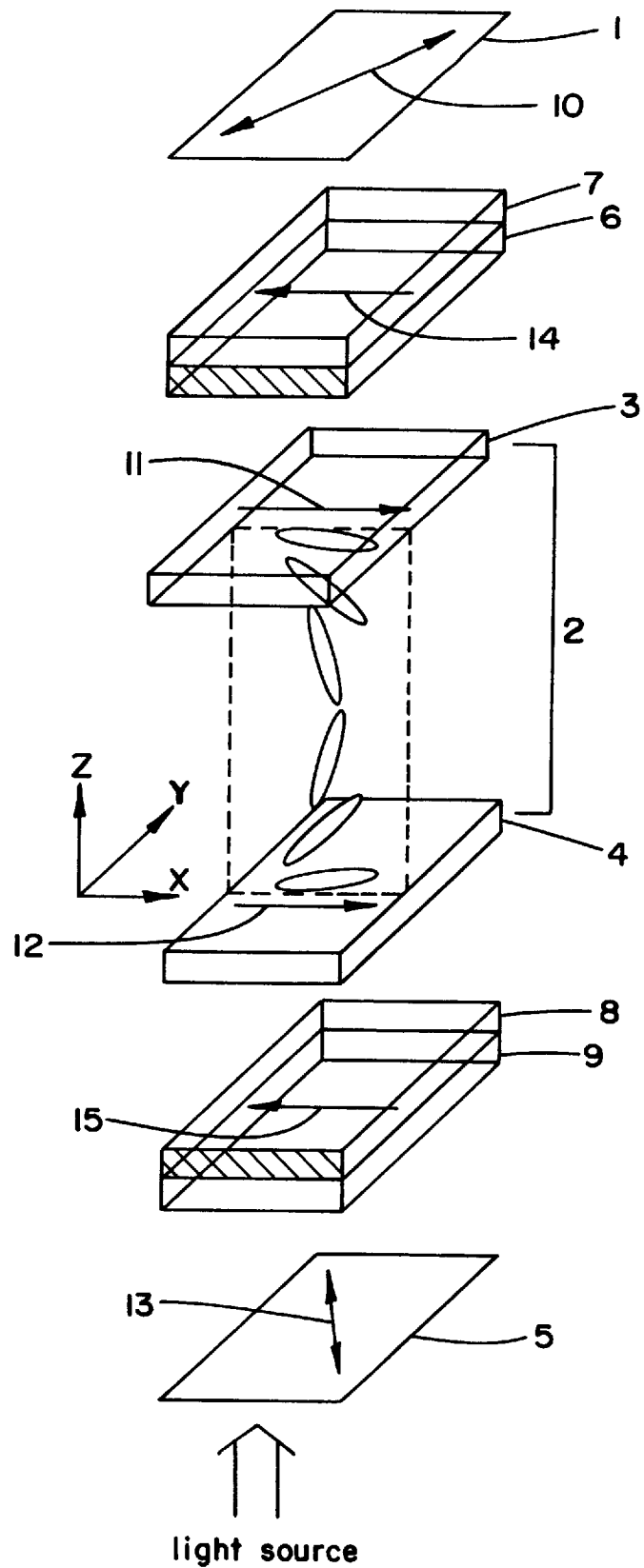
FIG. 12 is a perspective view of the liquid crystal display used in Example 4.
Figure 13A:
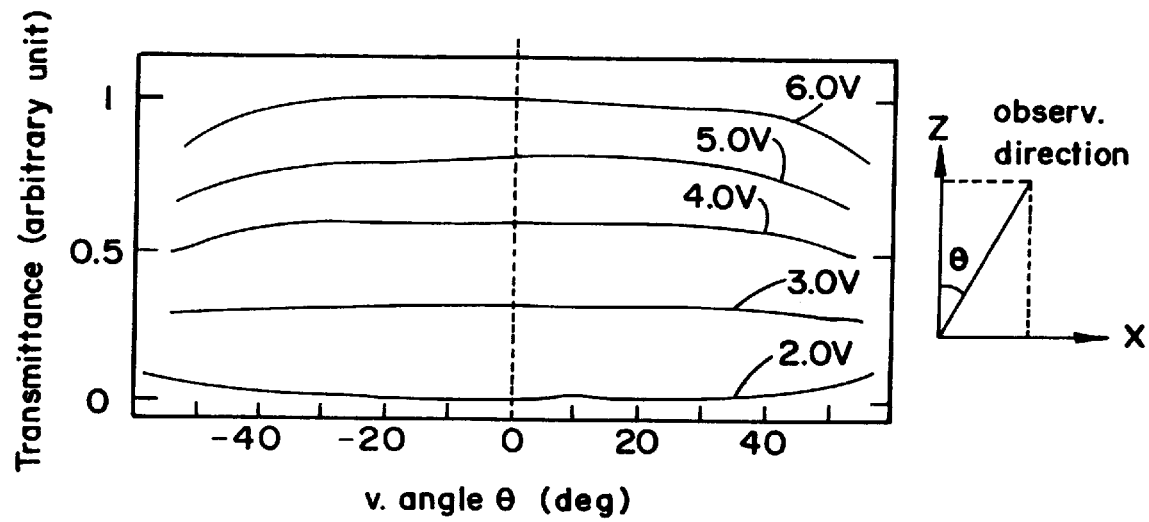
FIG. 13 is a graph showing measurement results of viewing angle dependence of transmittance obtained in Example 4.
Figure 13B:
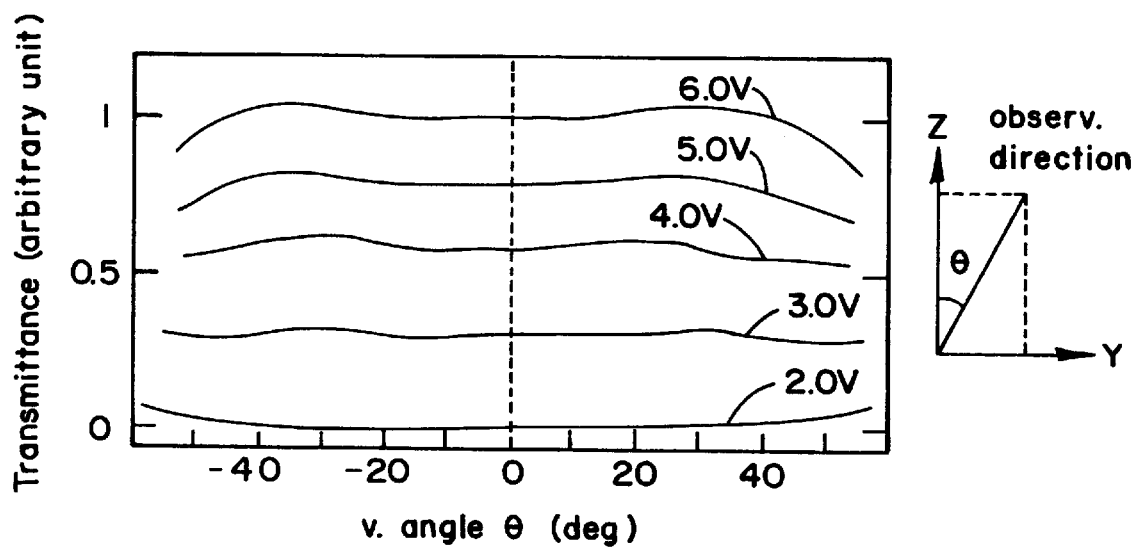
Figure 14:
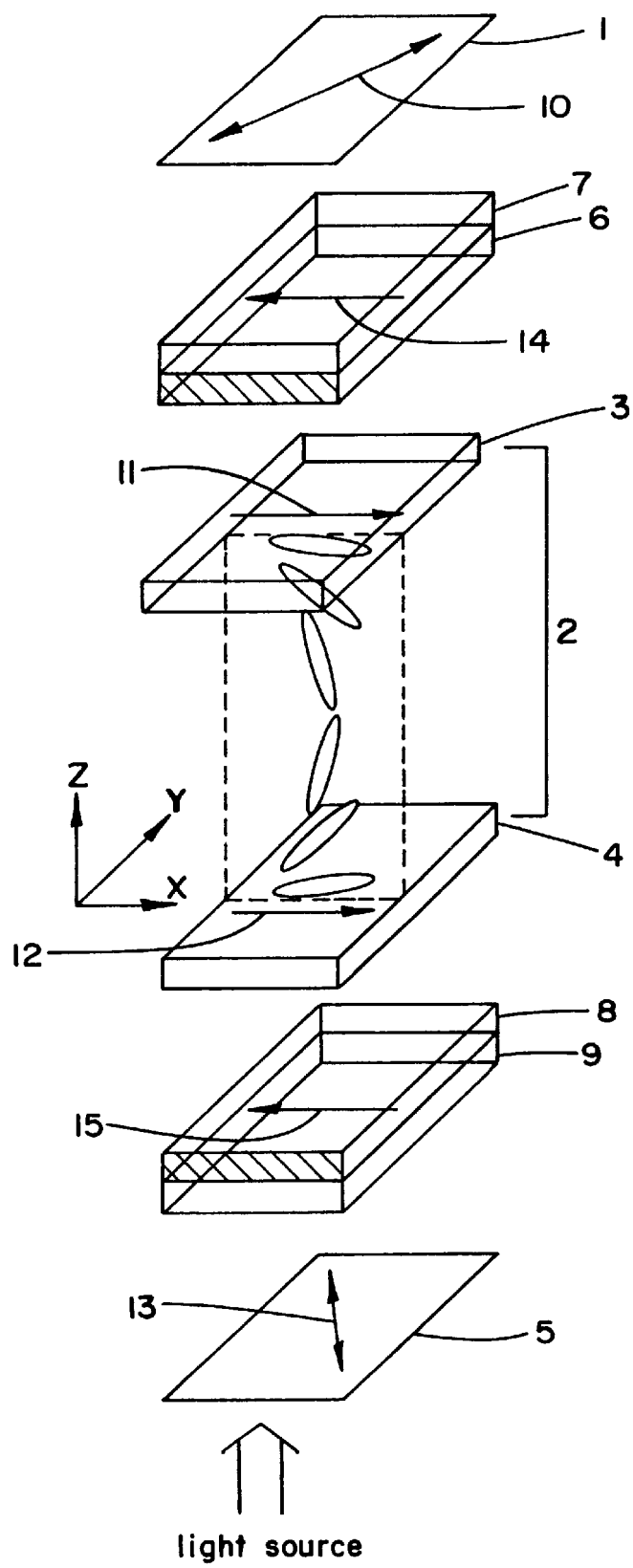
FIG. 14 is a perspective view of the liquid crystal display used in Example 5.
Figure 15A:
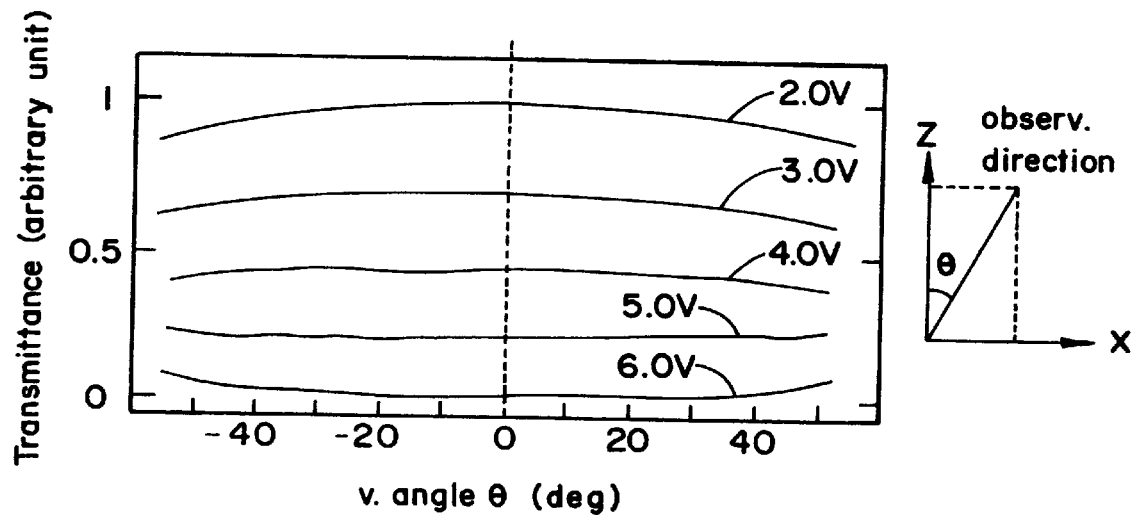
FIG. 15 is a graph showing measurement results of viewing angle dependence of transmittance obtained in Example 5.
Figure 15B:
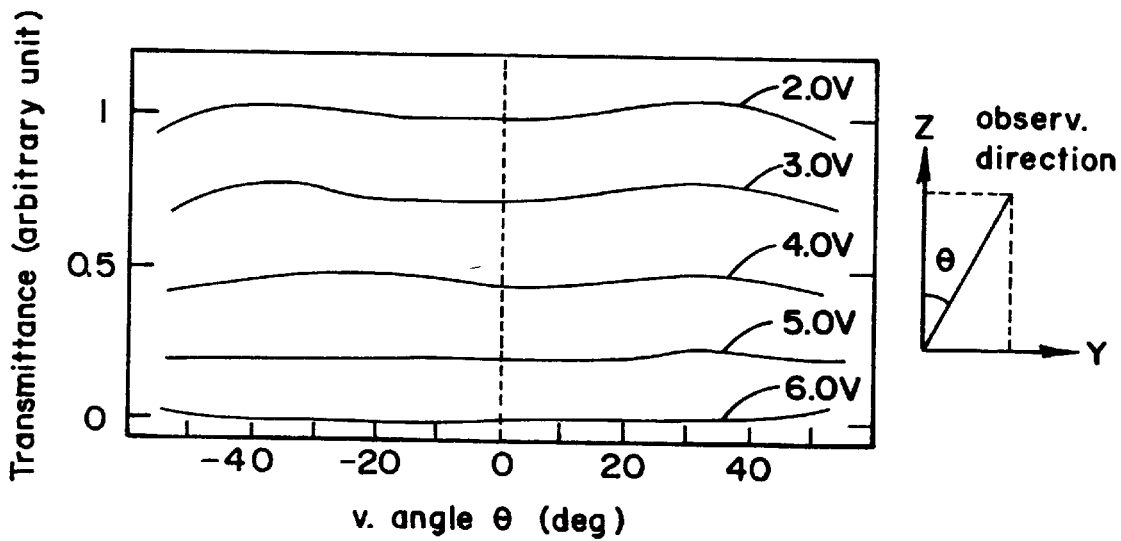
Figure 16:
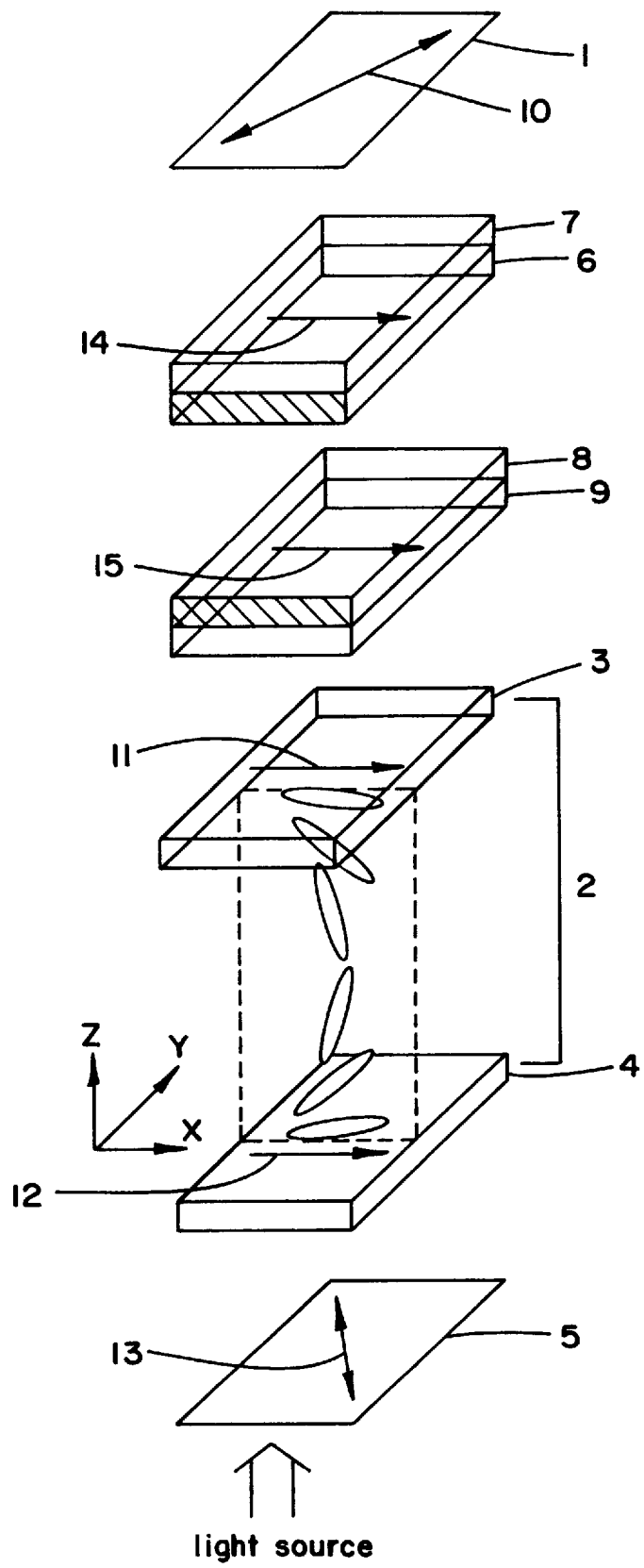
FIG. 16 is a perspective view of the liquid crystal display used in Example 6. The components and reference numerals thereof are the same viewing angle used in FIG. 14 which relates to Example 5.
Figure 17A:
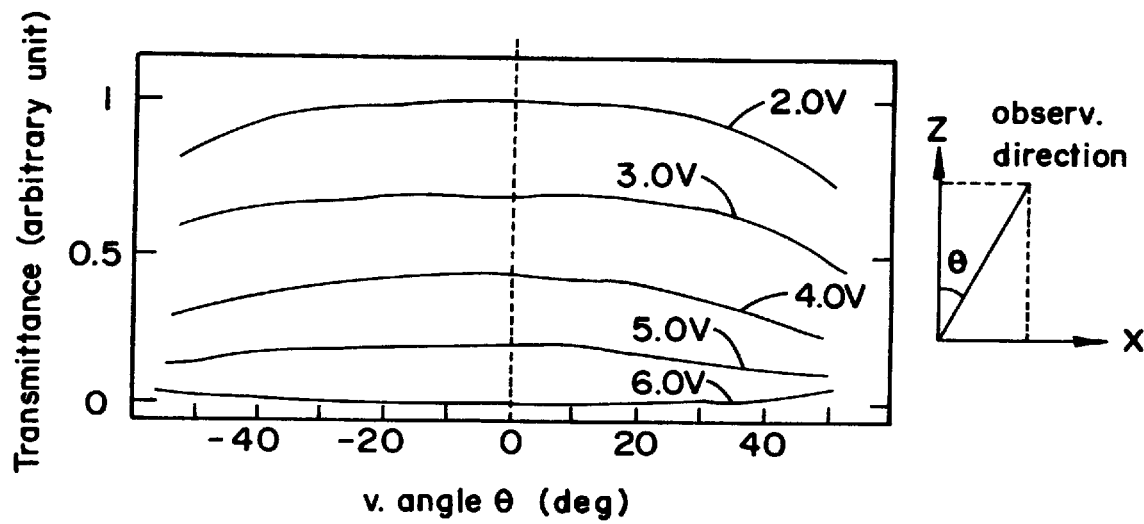
FIG. 17 is a graph showing measurement results of viewing angle dependence of transmittance obtained in Example 6.
Figure 17B:
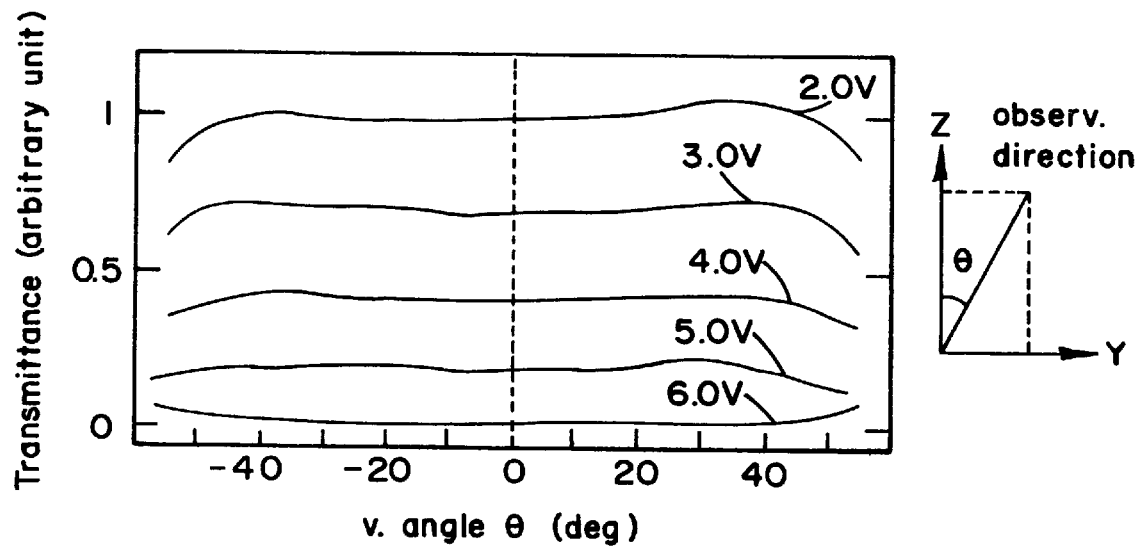
Figure 18:
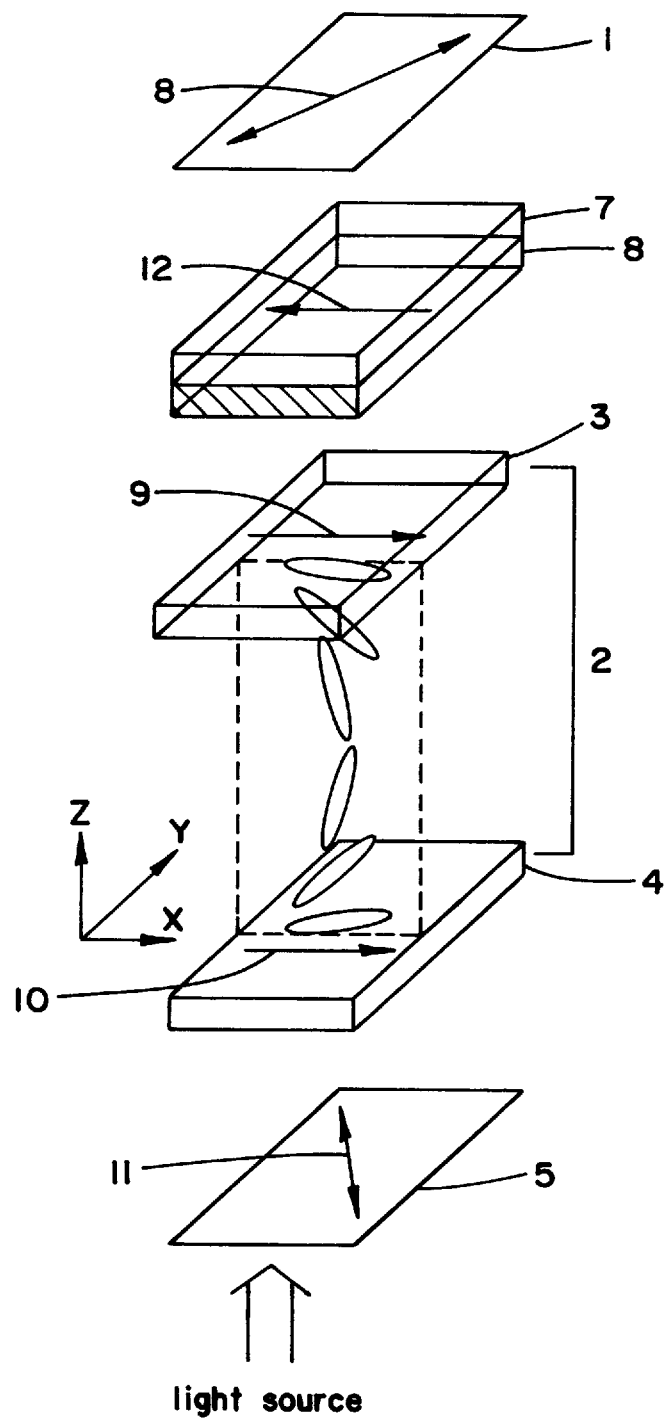
FIG. 18 is a perspective view of the liquid crystal display used in Example 7.
Figure 19A:
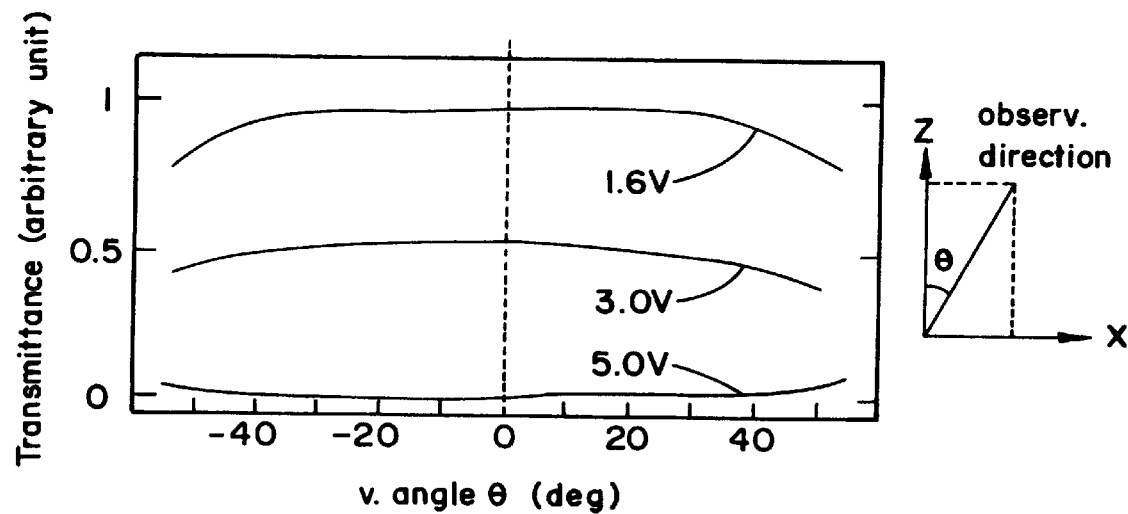
FIG. 19 is a graph showing measurement results of vewing angle dependence of transmittance obtained in Example 7.
Figure 19B:
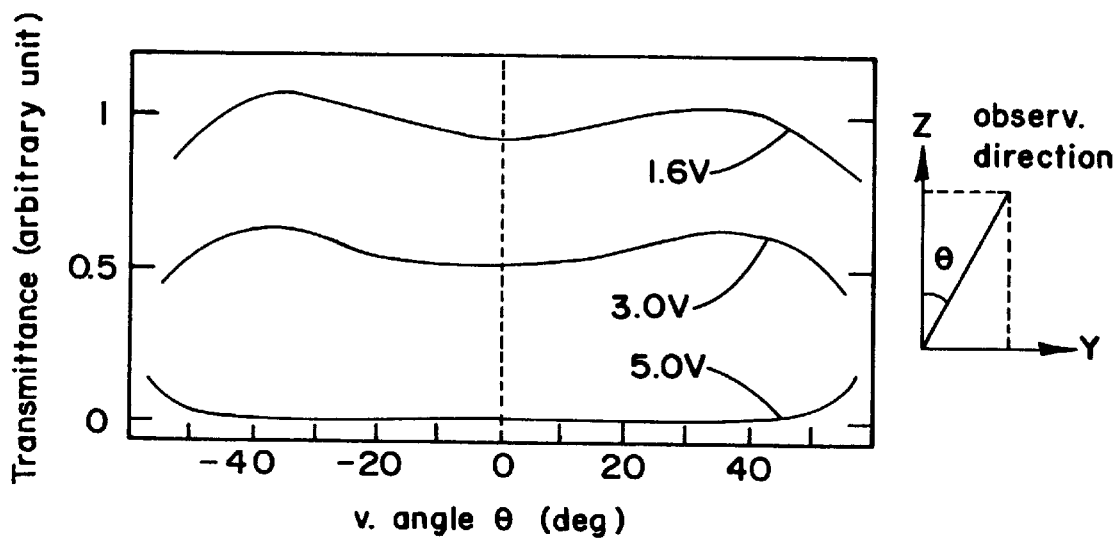

We claim:

1. A compensating element comprising a substrate not having an alignment film and a compensating film, said compensating film being a discotic liquid crystalline material havina a fixed orientation form of a discotic liquid crystal, said compensating film being disposed between a drivina liquid crystal cell and a pair of upper and lower polarizing plates, wherein said fixed orientation is a hybrid orientation in which the angle between the discotic liquid crystal directors near the upper interface of the film is different from that near the lower interface of the film.

2. The compensating element as set forth in claim 1 wherein said hybrid orientation of said compensating film is such that on one side of the film discotic liquid crystal directors are at an angle of between 60° and 90° relative to the film plane, while on the other side of the film, discotic liquid crystal directors are at an angle of between 0° and 50° relative to the film plane.

3. The compensating element of claim 1 wherein the substrate not having an alignment film is glass or a plastic selected from the group consisting of polymethacylate, polystyrene, polycarbonate, polyether sulfone, polyphenylene sulfide, polycrylate, amorphous polyolefin, triacetyl cellulose and epoxy resin films.

4. The compensating element of claim 1 wherein the substrate not having an alignment film is a retardation film or polarizing film.

5. The compensating element of claim 1 wherein the substrate not having an alignment film and the compensating film are affixed to each other through an adhesive or pressure sensitive adhesive prepared from acrylic resin, epoxy resin, ethylenevinyl acetate copolymer, rubber, urethane resin or a mixture thereof.

6. An OCB mode liquid crystal display including said compensating element of claim 1.

* * * * *

UNITED STATES PATENT AND TRADEMARK OFFICE
CERTIFICATE OF CORRECTION

PATENT NO. : 5,883,685

DATED : March 16, 1999

INVENTOR(S) : Hitoshi Mazaki, et al.

It is certified that error appears in the above-identified patent and that said Letters Patent are hereby corrected as shown below:

Column 6, Line 41: "illustratee" should read --illustrated--
Column 7, Line 33: "1" should read --$\ell$--
Column 22, Formula:

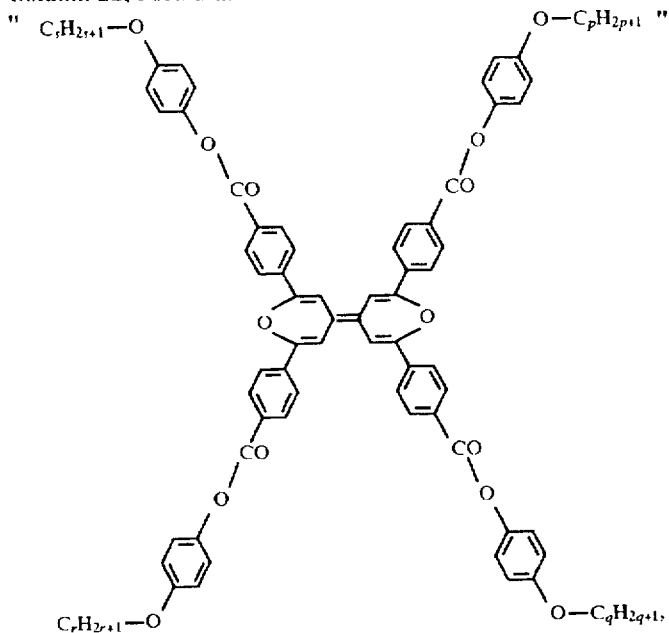

UNITED STATES PATENT AND TRADEMARK OFFICE
CERTIFICATE OF CORRECTION

PATENT NO. : 5,883,685

DATED : March 16, 1999

INVENTOR(S) : Hitoshi Mazaki, et al.

It is certified that error appears in the above-identified patent and that said Letters Patent are hereby corrected as shown below:

Column 22, Formula : (cont'd)
should read

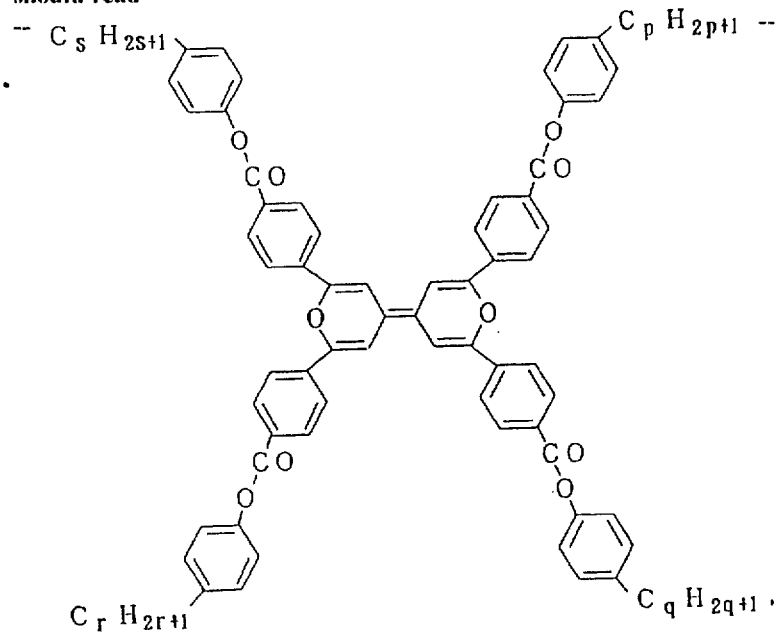

Column 55, Line 25, Formula: "$C_yH_{2y}X_7$" should read --$C_vH_{2v}X_7$--
Column 60, Line 25: "U,V" should read --u,v--

UNITED STATES PATENT AND TRADEMARK OFFICE
CERTIFICATE OF CORRECTION

PATENT NO. : 5,883,685
DATED : March 16, 1999
INVENTOR(S) : Hitoshi Mazakii, et al.

It is certified that error appears in the above-identified patent and that said Letters Patent are hereby corrected as shown below:

Column 65, Line 36, Formula: "$C_rH_{2r}X_3$" should read --O-$C_rH_{2r}X_3$--
Column 66, Line 8, Formula: "$C_rH_{2r+1}$" should read --O-$C_rH_{2r+1}$--
Column 75, Line 13: "$R_6$" should read --$R_5$--
Column 77, Line 4: "OC" should read --O-C--
Column 80, Line 58: "perfetably" should read --preferably--
Column 83, 2nd Formula: "$X_5$" should read --$t_{+1}$--
Column 85, 1st Formula: "$X_5$" should read --$t_{+1}$--
Column 86, Line 64: "H-,F-,Cl,$C_lH_{2l+1}$," should read --H-,F-,Cl-,Br-,$C_lH_{2l+1}$--
Column 121, 2nd Figure: "$C_pH_{2p+1}$" should read --$C_bH_{2a+1}$--
Column 123 & 124, Formula: "$C_+H_{2++1}$" should read --$C_aH_{2a+1}$--
Column 123, Line 65: "U,V" should read --u,v--
Column 154, Line 29: "H-NMR" should read -- H-NMR--
Column 158, Line 56: "inplane" should read --in-plane--
Column 160, Line 20: "display." should read --display of...--
Column 161, Line 4: "inplane" should read --in-plane--
Column 164, Line 28: "vewing" should read --viewing--
Column 164, Line 34: "havina" should read --having a--
Column 164, Line 36: "drivina" should read --driving--

Signed and Sealed this

Tenth Day of April, 2001

Attest:

NICHOLAS P. GODICI

Attesting Officer     Acting Director of the United States Patent and Trademark Office